United States Patent
Stephens et al.

(10) Patent No.: US 9,781,577 B2
(45) Date of Patent: *Oct. 3, 2017

(54) METHOD AND APPARATUS FOR USING METADATA TO PROVIDE LOCATION INFORMATION

(71) Applicant: QUALCOMM Incorporated, San Diego, CA (US)

(72) Inventors: Arthur Stephens, Georgetown, TX (US); Michaela Vanderveen, Tracy, CA (US); Vincent Douglas Park, Budd Lake, NJ (US)

(73) Assignee: QUALCOMM Incorporated, San Diego, CA (US)

(*) Notice: Subject to any disclaimer, the term of this patent is extended or adjusted under 35 U.S.C. 154(b) by 64 days.

This patent is subject to a terminal disclaimer.

(21) Appl. No.: 14/853,966

(22) Filed: Sep. 14, 2015

(65) Prior Publication Data

US 2016/0088446 A1 Mar. 24, 2016

Related U.S. Application Data

(60) Provisional application No. 62/052,419, filed on Sep. 18, 2014.

(51) Int. Cl.
*H04W 4/06* (2009.01)
*H04W 4/02* (2009.01)
(Continued)

(52) U.S. Cl.
CPC .......... *H04W 4/06* (2013.01); *G06F 21/6209* (2013.01); *H04L 63/104* (2013.01); *H04W 4/005* (2013.01);
(Continued)

(58) Field of Classification Search
CPC ....... H04W 4/005; H04W 4/008; H04W 4/02; H04W 4/06; H04W 8/005; H04W 64/00;
(Continued)

(56) References Cited

U.S. PATENT DOCUMENTS 9,380,549 B2* 6/2016 Kiss ................... H04L 65/1006
9,380,623 B2* 6/2016 Kim ................... H04W 40/246
(Continued)

OTHER PUBLICATIONS

Huawei, et al., "Architecture Consideration for Proximity Services with Infrastructure", 3GPP Draft, S2-130122, 3rd Generation Partnership Project (3GPP), Mobile Competence Centre, 650, Route Des Lucioles, F-06921 Sophia-Antipolis Cedex, France, vol. SA WG2, No. Prague, Czech Republic, 20130128-20130201, Jan. 22, 2013 (Jan. 22, 2013), pp. 1-4, XP050684684; Retrieved from the Internet: URL: http://www.3gpp.org/ftp/tsg_sa/WG2_Arch/TSGS2_95_Prague/Docs/ [retrieved on Jan. 22, 2013].
(Continued)

*Primary Examiner* — Tri H Phan
(74) *Attorney, Agent, or Firm* — Arent Fox, LLP

(57) ABSTRACT

A method, an apparatus, and a computer program product for wireless communication are provided. In an aspect, method operations for broadcasting a first signal comprising a first expression code in association with availability of location information of a UE; determining the location information associated with the UE; determining a second expression code associated with the location information; and broadcasting a second signal comprising the second expression code and the location information, independent of the first signal. In another aspect, a method includes the operations of receiving, from a second UE, a first signal comprising a first expression code associated with the second UE; determining a second expression code based on the received first signal; receiving a second signal from the second UE, the second signal comprising the second expres-
(Continued)

sion code; and determining a location of the second UE based on the received second signal and the determined second expression code.

14 Claims, 43 Drawing Sheets

(51) Int. Cl.
*H04W 4/00* (2009.01)
*H04W 8/00* (2009.01)
*H04W 64/00* (2009.01)
*H04W 68/00* (2009.01)
*H04W 76/02* (2009.01)
*H04L 29/06* (2006.01)
*G06F 21/62* (2013.01)
*H04W 92/18* (2009.01)

(52) U.S. Cl.
CPC ............ *H04W 4/008* (2013.01); *H04W 4/02* (2013.01); *H04W 8/005* (2013.01); *H04W 64/00* (2013.01); *H04W 68/005* (2013.01); *H04W 76/023* (2013.01); *G06F 2221/2111* (2013.01); *G06F 2221/2141* (2013.01); *H04W 92/18* (2013.01)

(58) Field of Classification Search
CPC . H04W 68/005; H04W 76/023; H04W 92/18; H04W 40/246; H04W 48/08; H04W 48/14; H04W 72/04; H04W 76/02; H04W 84/18; H04W 88/08; H04L 63/104; H04L 67/16; G06F 21/6209; G06F 2221/2111; G06F 2221/2141
See application file for complete search history.

(56) References Cited

U.S. PATENT DOCUMENTS

| | | | | |
|---|---|---|---|---|
| 9,426,624 | B2* | 8/2016 | Stephens | H04W 4/025 |
| 9,479,905 | B2* | 10/2016 | Stephens | H04W 4/06 |
| 9,496,971 | B2* | 11/2016 | Edge | H04W 8/005 |
| 9,538,491 | B2* | 1/2017 | Kiss | H04L 65/1006 |
| 9,538,497 | B2* | 1/2017 | Liao | H04W 64/00 |
| 2013/0281121 | A1 | 10/2013 | Poppleton et al. | |
| 2014/0192739 | A1* | 7/2014 | Liao | H04W 8/22 370/329 |
| 2014/0341121 | A1* | 11/2014 | Chang | H04W 40/246 370/329 |
| 2014/0342735 | A1* | 11/2014 | Liao | H04W 8/04 455/435.1 |
| 2014/0348081 | A1* | 11/2014 | Liao | H04W 76/023 370/329 |
| 2015/0282108 | A1* | 10/2015 | Kiss | H04L 65/1006 455/435.1 |
| 2015/0334550 | A1* | 11/2015 | Klatt | H04W 8/005 455/434 |
| 2016/0088583 | A1* | 3/2016 | Stephens | H04W 4/06 455/456.6 |

OTHER PUBLICATIONS

International Search Report and Written Opinion—PCT/US2015/050487—ISA/EPO—Jan. 5, 2016.

* cited by examiner

Device-to-Device
Communications System

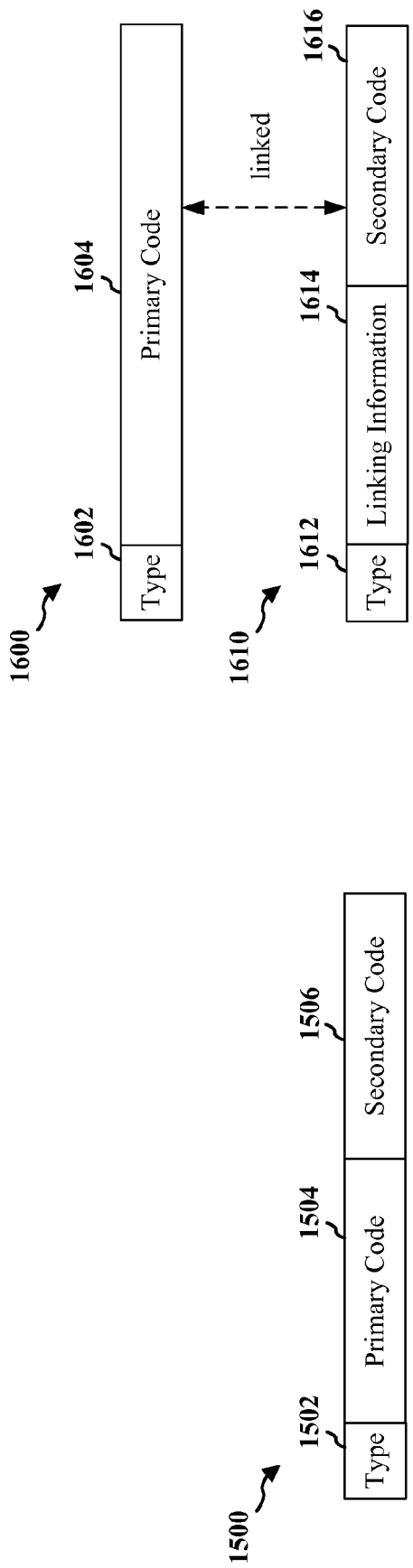

METHOD AND APPARATUS FOR USING METADATA TO PROVIDE LOCATION INFORMATION

CROSS-REFERENCE TO RELATED APPLICATION(S)

This application claims the benefit of U.S. Provisional Application Ser. No. 62/052,419, entitled "USING PUSH NOTIFICATIONS TO TRIGGER AN ANNOUNCING UE TO UPDATE LOCATION INFO IN LTE DIRECT," and filed on Sep. 18, 2014, which is expressly incorporated by reference herein in its entirety.

BACKGROUND

Field

The present disclosure relates generally to communication systems, and more particularly, to methods and apparatuses for using metadata to provide location information.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. In an aspect, an apparatus is broadcast a first signal including a first expression code in association with availability of location information of a UE. The apparatus is to determine the location information associated with the UE. The apparatus is to determine a second expression code associated with the location information. The apparatus is to broadcast a second signal including the second expression code and the location information, independent of the first signal. In an aspect, the apparatus may be a user equipment.

In an aspect of the disclosure, a method, a computer program product, and an apparatus are provided. In an aspect, the apparatus is to receive, from a second UE, a first signal including a first expression code associated with the second UE. The apparatus is to determine a second expression code based on the received first signal. The apparatus is to receive a second signal from the second UE, the second signal including the second expression code. The apparatus is to determine a location of the second UE based on the received second signal and the determined second expression code. In an aspect, the apparatus may be a user equipment.

BRIEF DESCRIPTION OF THE DRAWINGS

FIG. 15 is a diagram illustrating a format for transmission of multiple ProSe application codes by a device in a single discovery resource.

FIG. 16 is a diagram illustrating code linking in accordance with various aspects of the disclosure.

DETAILED DESCRIPTION

Figure 1:
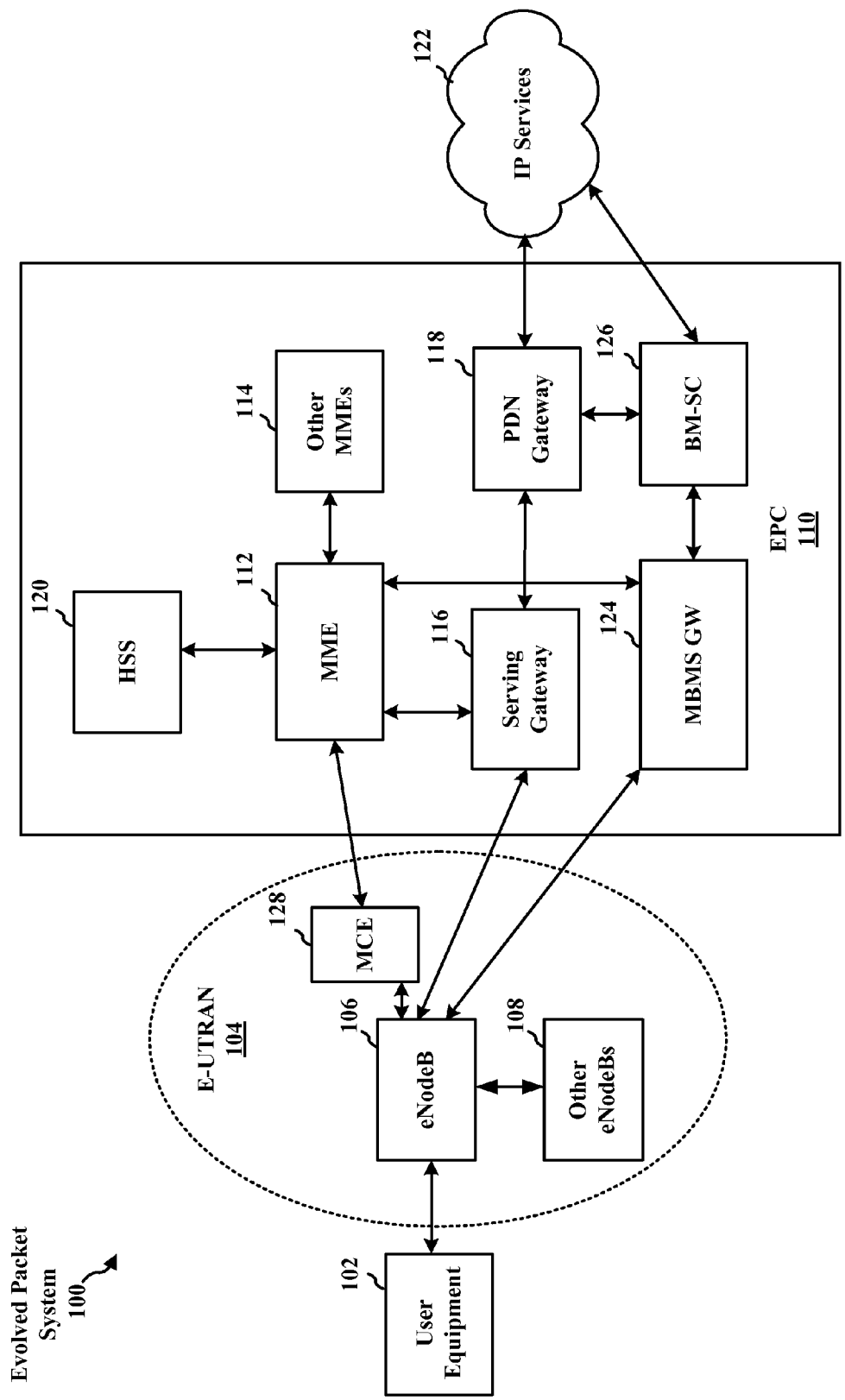
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, operations, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
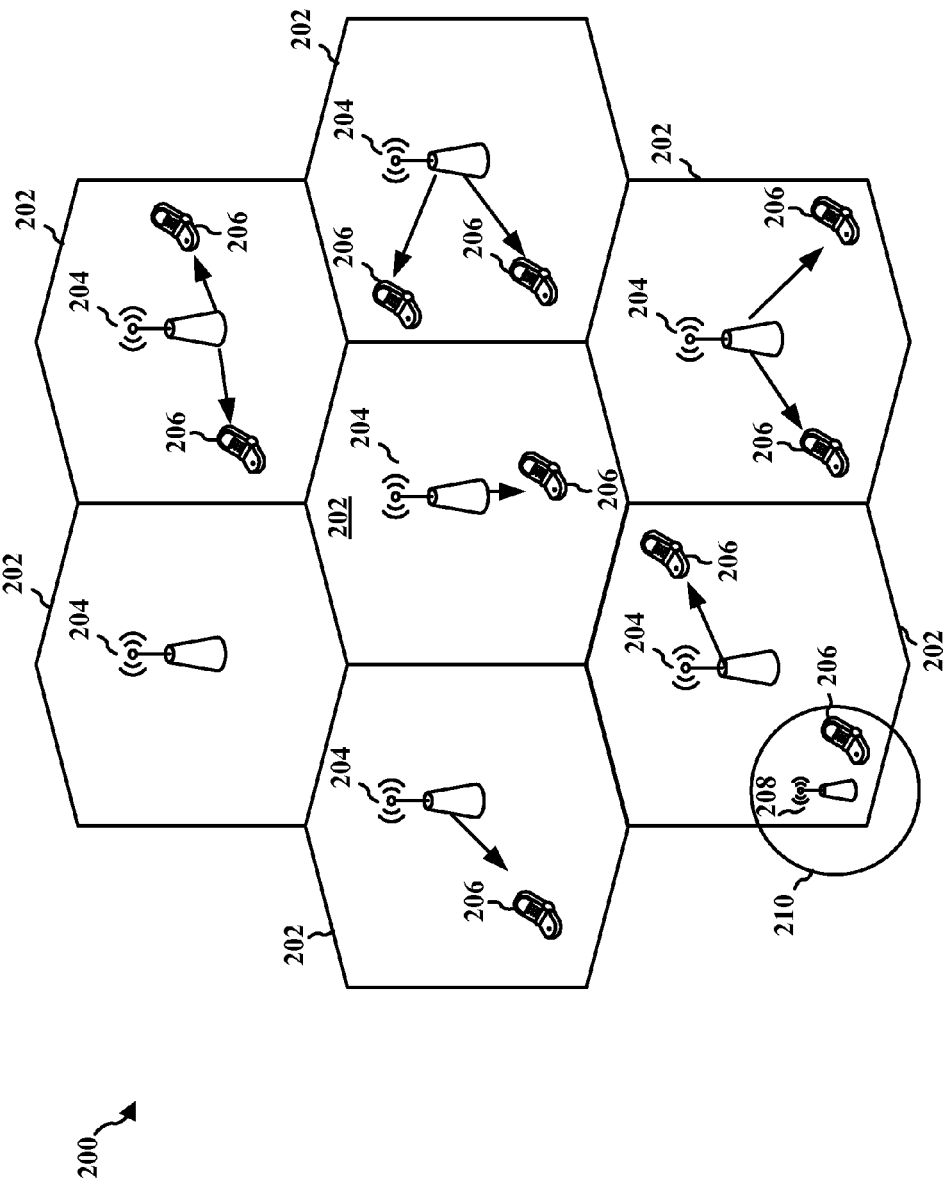
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
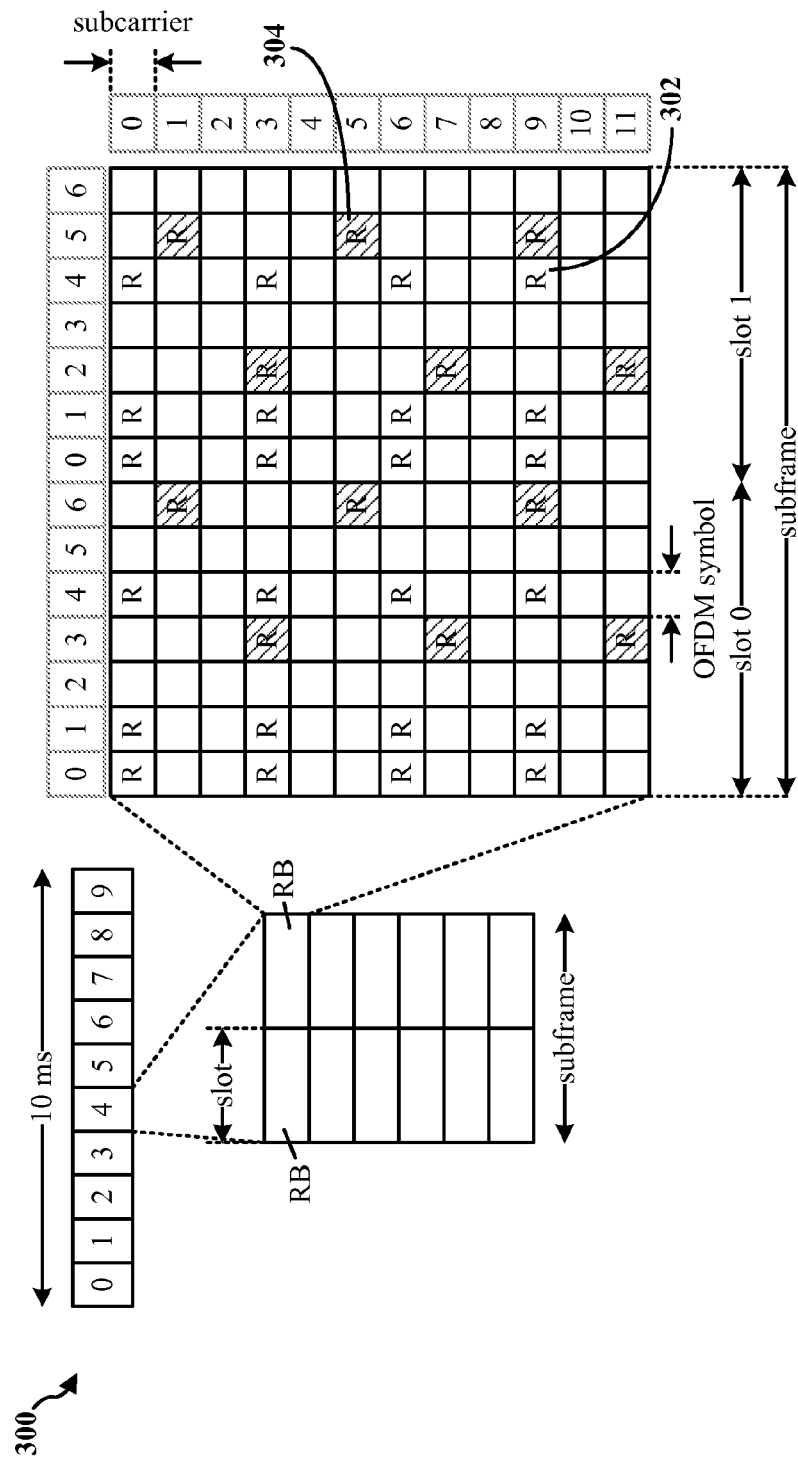
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
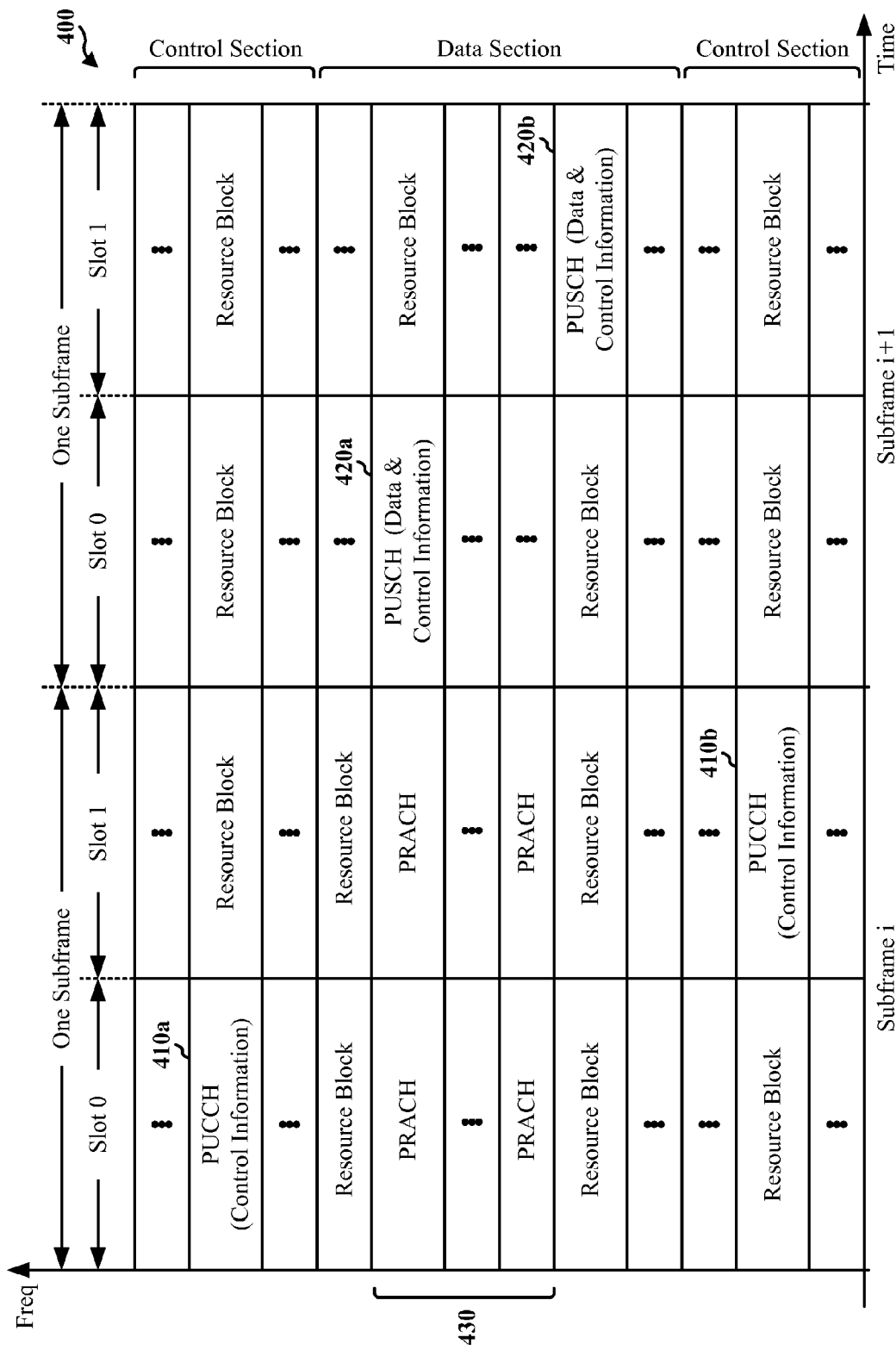
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
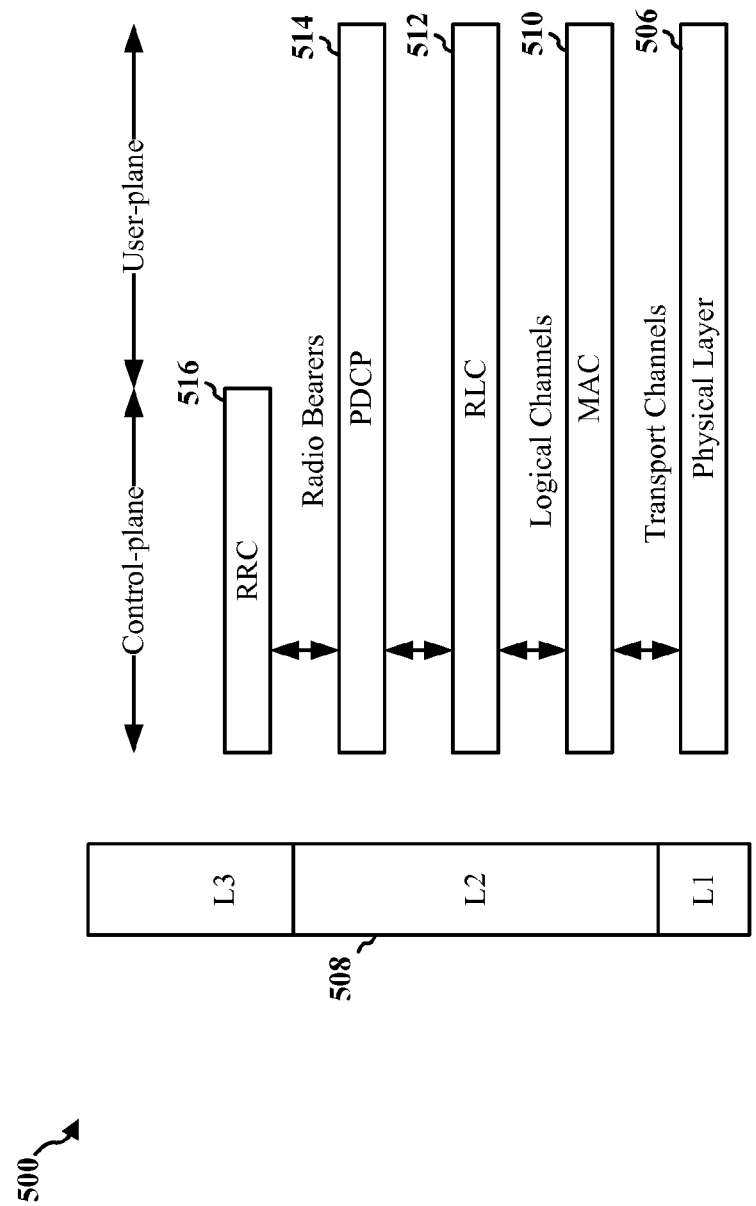
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
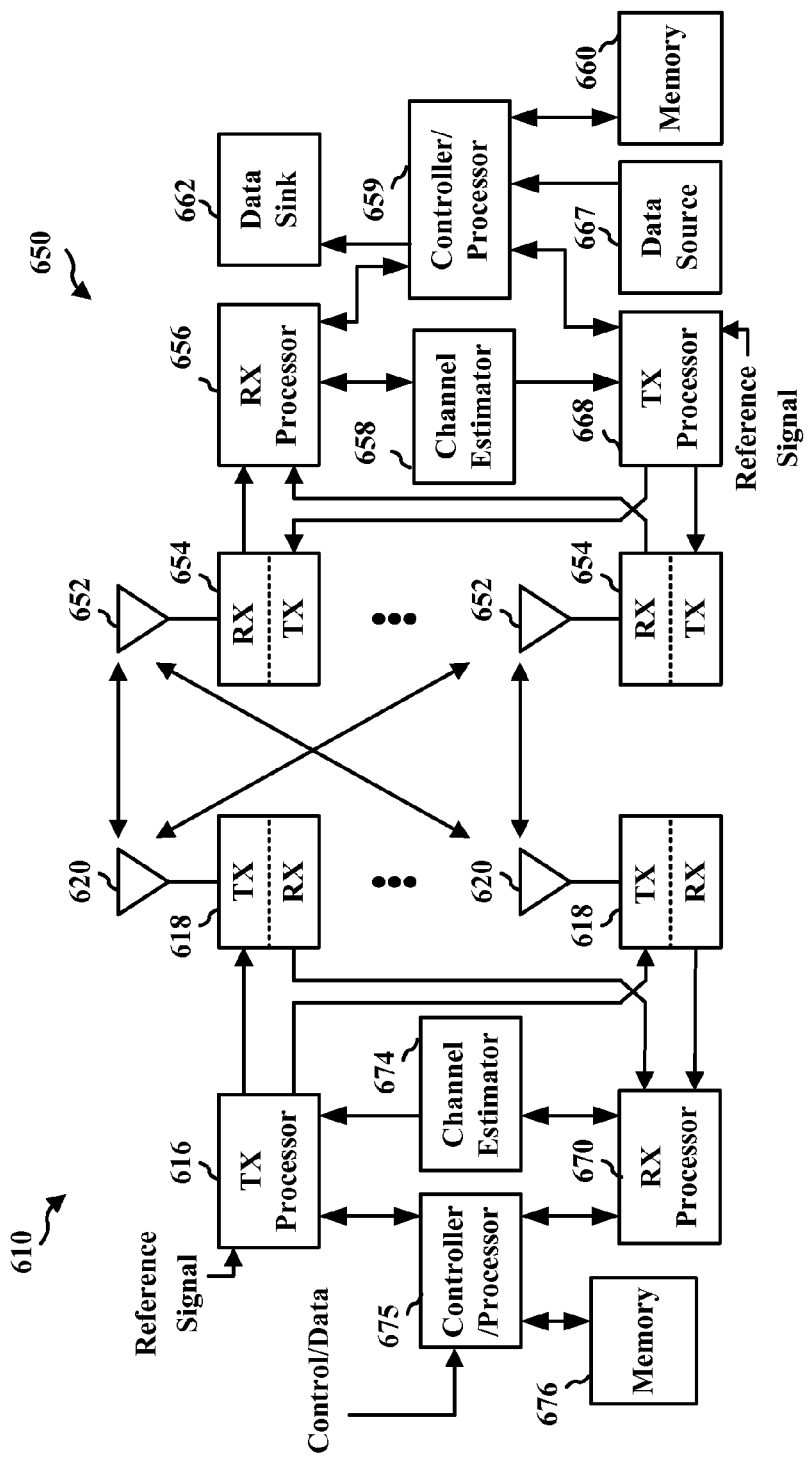
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
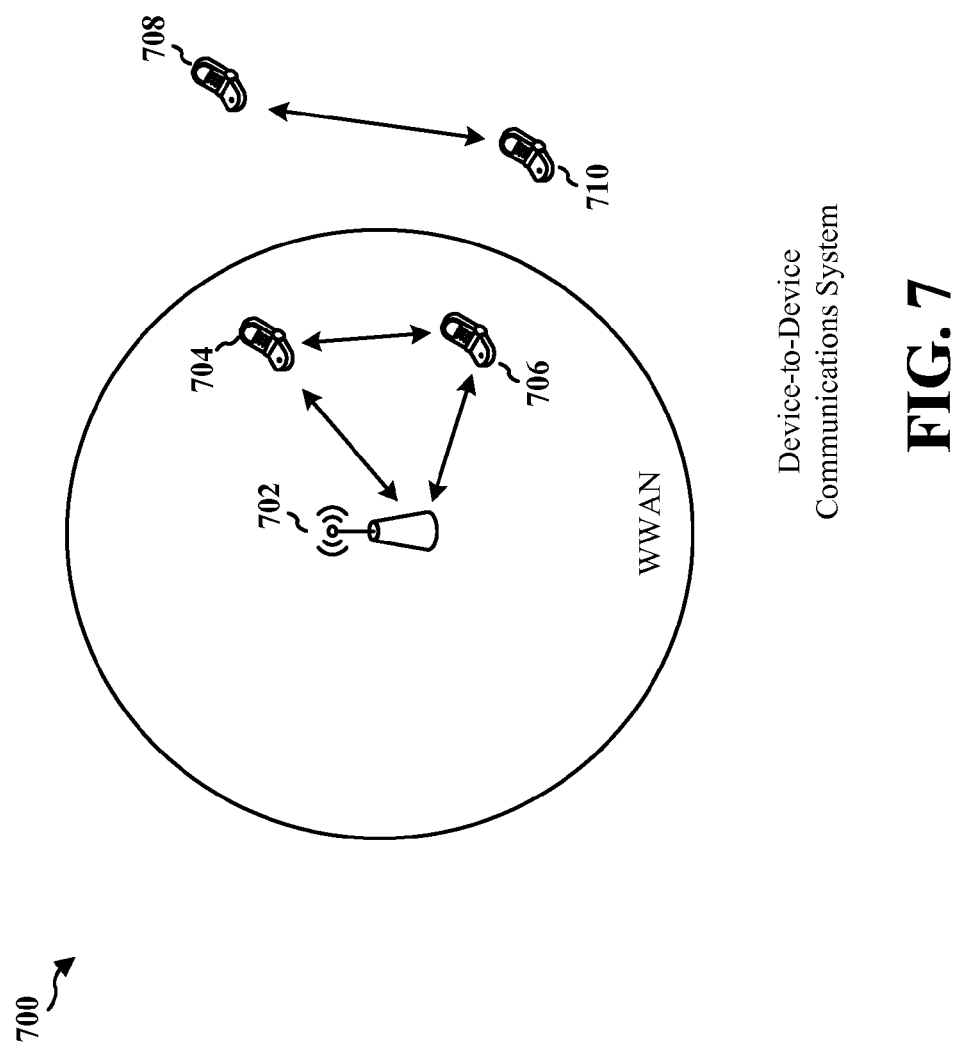
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

LTE-Direct or proximity service (ProSe) discovery is a process by which mobile devices periodically broadcast short bit strings (e.g., referred to as "ProSe application codes," or simply "expressions codes") over-the-air, while other mobile devices in proximity attempt to detect the codes in an efficient manner. For example, the other mobile devices may monitor for codes and filter only the codes that are of interest to the applications operating in those mobile devices. A ProSe code is associated with an application-layer (e.g., human-readable) name referred to as a ProSe Application Name. The ProSe Application Name may be a component of a ProSe Application Identifier (PAI). An application publishing a ProSe Application Name results in the modem announcing the corresponding code, while an application subscribing to a (set of) ProSe Application Name(s) results in the modem monitoring for the corresponding code(s). Conventional LTE-Direct discovery procedures, while battery-efficient and privacy-sensitive, do not provide an accurate location of a discovered mobile device. For example, a mobile device may discover another mobile device and only know that the discovered mobile device is somewhere in proximity, which may be within a 500$m$ radius. It should be noted that discovery is uni-directional, such that the discovered mobile device does not know whether or when it has been discovered by one or more mobile devices in proximity.

For mobile devices that wish to make their location known, one option is to always (or at least always when moving) broadcast some succinct location information along with a code or expression used by other mobile devices for discovery. However, this approach may waste resources (e.g., over-the-air discovery resources) if there is no other mobile device in proximity actually interested in that location information.

Figure 8:
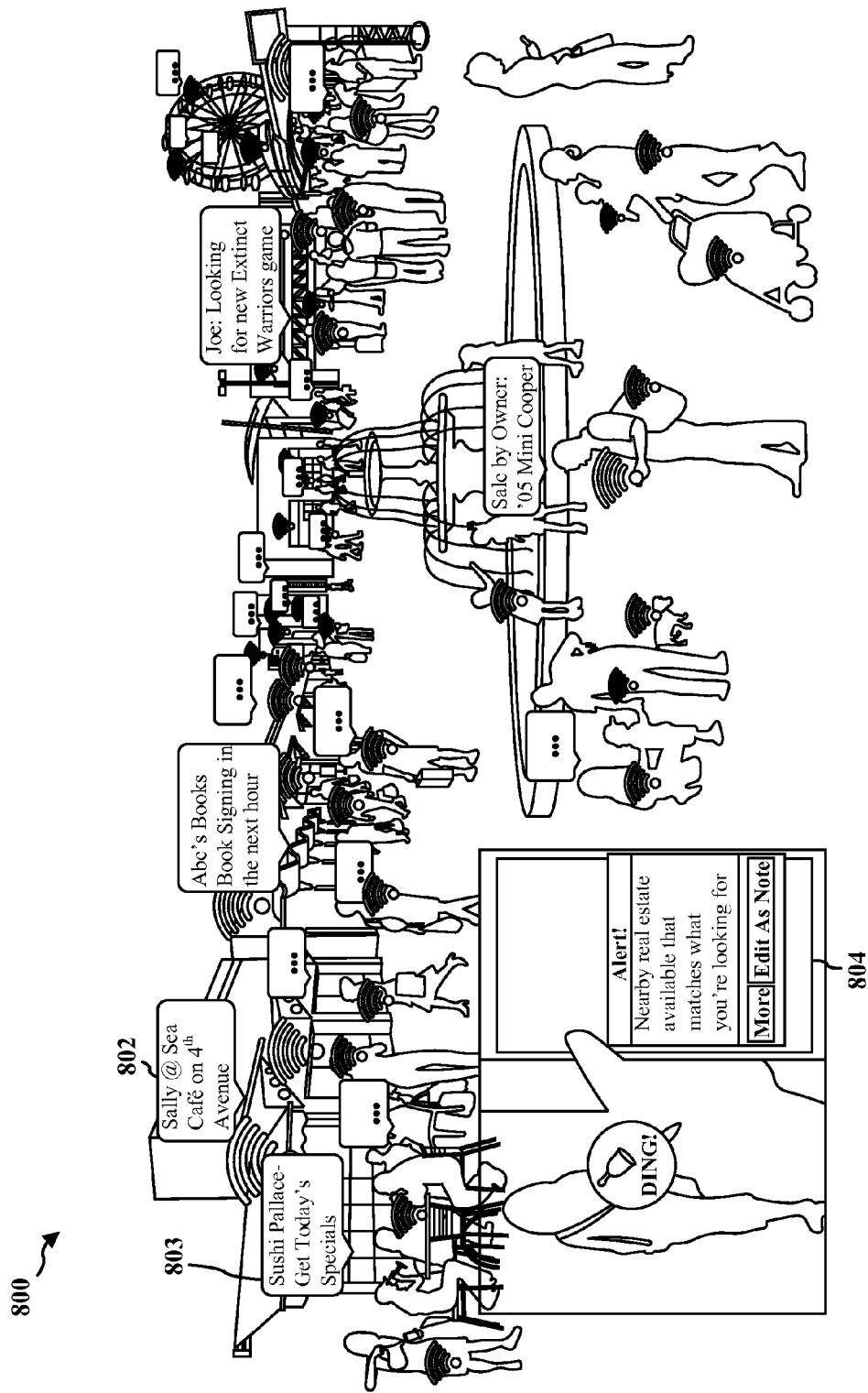
FIG. 8 is a diagram illustrating a mobile network.

FIG. 8 is a diagram illustrating a mobile network 800. In an aspect, the mobile network 800 includes a number of users with proximity service enabled mobile devices. For example, one or more mobile devices in FIG. 8 may periodically broadcast an announcement (e.g., announcement 802 or announcement 803) that enables discovery by another mobile device (e.g., mobile device 804). In such example, the mobile device 804 may discover another mobile device in proximity and which offers a service or content of interest. However, the mobile device 804 performing discovery may not be able to accurately determine the locations of the discovered mobile devices.

Figure 9:
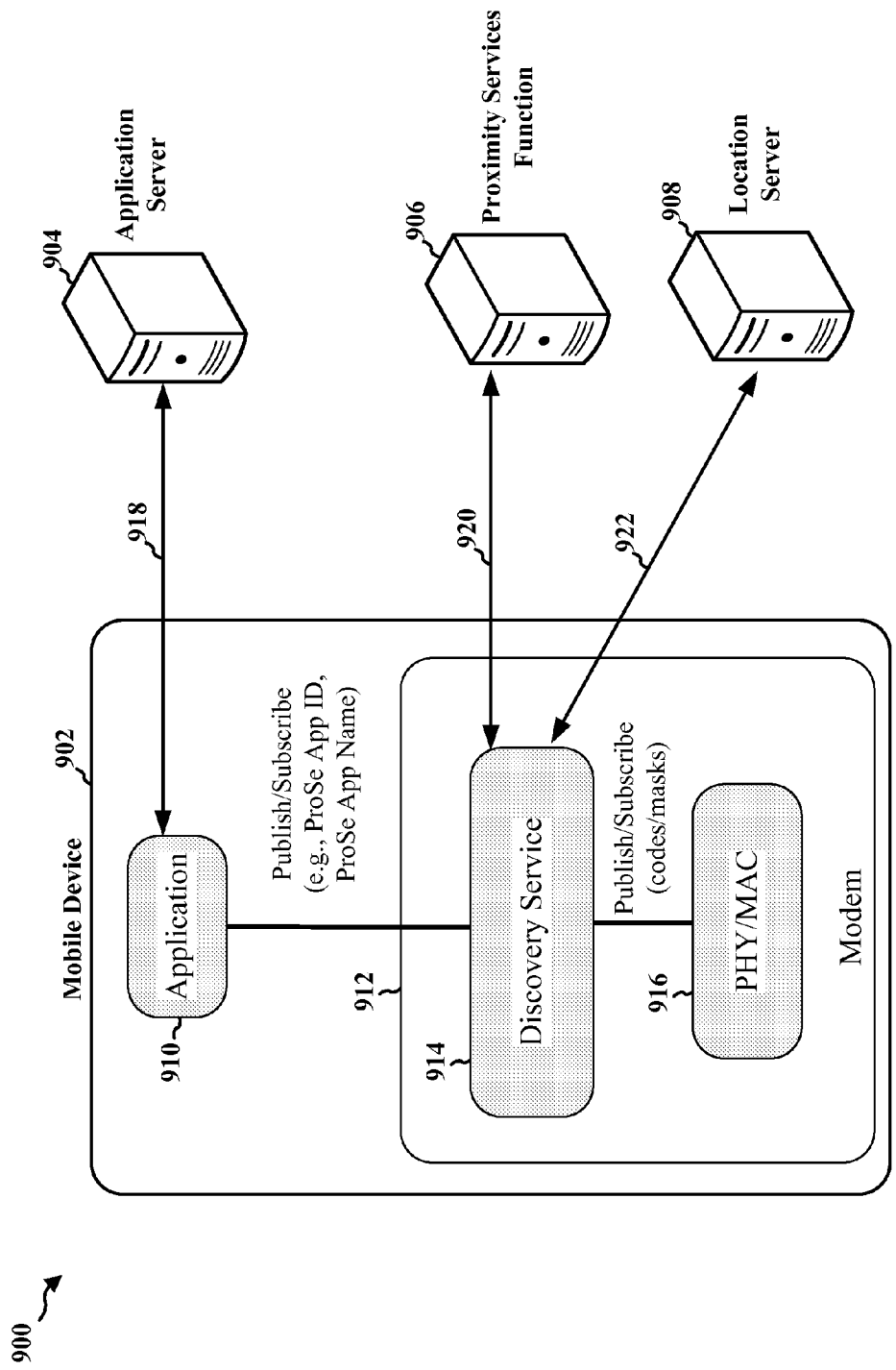
FIG. 9 is a diagram illustrating a mobile network.

FIG. 9 is a diagram illustrating a mobile network 900. As shown in FIG. 9, mobile network 900 includes a mobile device 902, an application server 904, a ProSe Function 906, and a location server 908. As further shown in FIG. 9, the mobile device 902 includes an application 910 and a modem 912. In the present disclosure, the term ProSe Function may refer to a logical function for proximity services implemented by a server or other network entity.

In an aspect, the application server 904 may configure applications with ProSe application names and/or may store the metadata (e.g., a set of auxiliary information) for each ProSe application name. The ProSe Function 906 may be configured to allocate ProSe application codes, to look up ProSe application codes, and/or to store metadata for each ProSe application code. The metadata is associated with both the ProSe application name and the allocated ProSe application code. The location server 908 may be configured to determine accurate location information for each mobile device.

In an aspect, as shown in FIG. 9, when the mobile device 902 is operating as a device discoverer, the discovery service layer 914 may send a ProSe application code received from a discovered mobile device to the ProSe Function 906 via data path 920. The ProSe Function 906 may look up the ProSe application code to determine the ProSe application name that corresponds to that code. The ProSe Function 906 may then send the ProSe application name to the mobile device 902 via data path 920. When the mobile device 902 is operating as an announcer/discoveree, the discovery service layer 914 may place accurate location information of the mobile device 902 into the location server 908 via data path 922. In general, depending on the role of the mobile device 902, as further shown in FIG. 9, the application 910 may communicate with application server 904 via data path 918 to receive configuration information to subscribe to ProSe Application names of interest or to publish ProSe Application Names. These operations result in mobile devices either broadcasting a code or monitoring for a set of codes. When a mobile device finds some codes that match its interest, the mobile device may send those codes to the network to obtain the associated ProSe Application Names.

Figure 10:
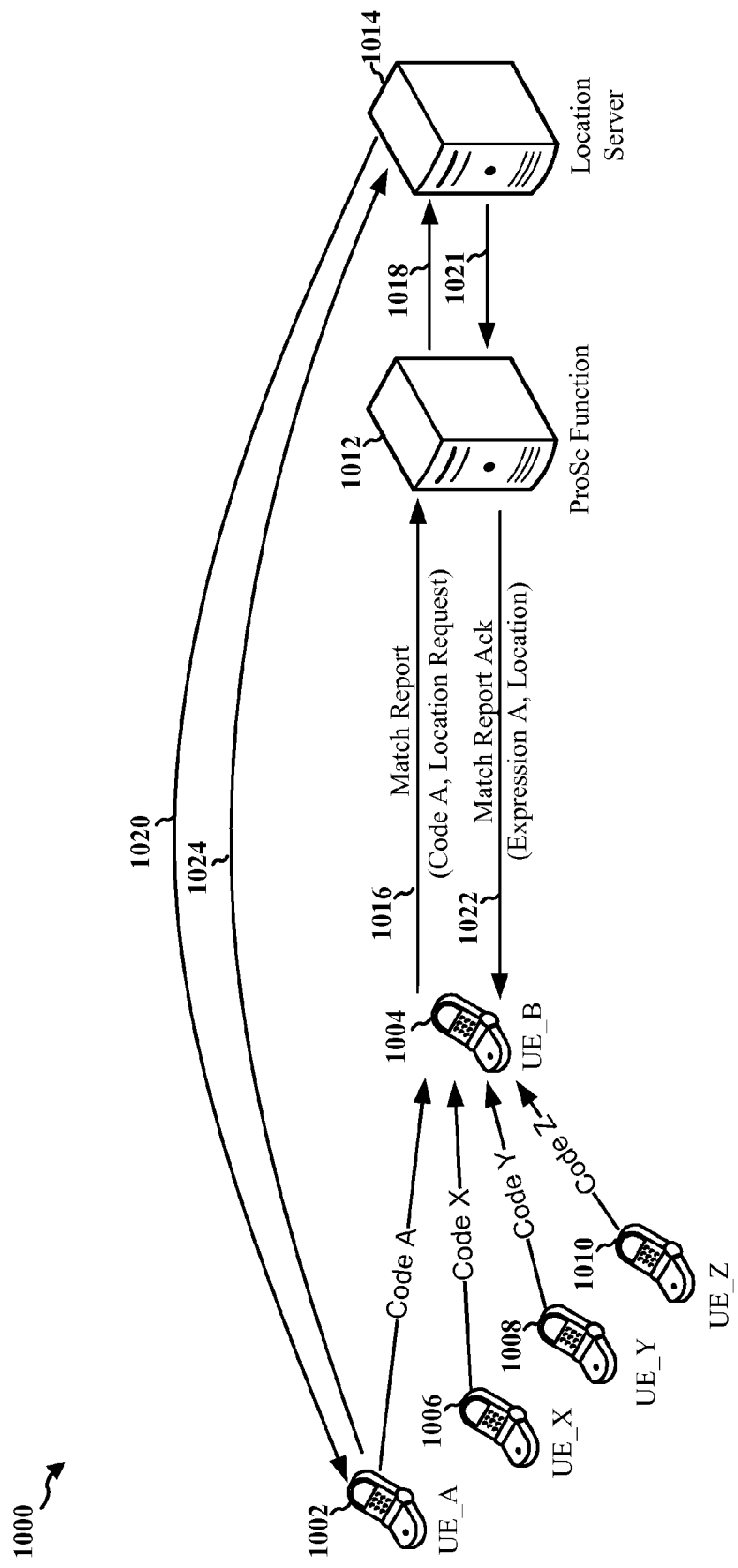
FIG. 10 is diagram illustrating an open location discovery procedure in a network.

FIG. 10 is diagram illustrating an open location discovery procedure in a network 1000. Network 1000 includes UE_A 1002, UE_B 1004, UE_X 1006, UE_Y 1008, UE_Z 1010, ProSe Function 1012, and location server 1014.

As shown in FIG. 10, UE_A 1002, UE_X 1006, UE_Y 1008, and/or UE_Z 1010 may each periodically broadcast a unique code (e.g., a short bit string) over-the-air. In an aspect, the unique code may be a ProSe application code associated with a UE. For example, as shown in FIG. 10, UE_A 1002, UE_X 1006, UE_Y 1008, and UE_Z 1010 may respectively broadcast ProSe application codes "Code A," "Code X," "Code Y," and "Code Z." UE_B 1004 may discover UEs of interest by listening to the broadcasted ProSe application codes and filtering the ProSe application codes of interest to the UE_B 1004. For example, UE_B 1004 may determine that Code A is of interest to the UE_B 1004. In such example, UE_A 1002 may be a mobile dog grooming service looking for business and may be configured to provide its accurate location to any interested UE.

In an aspect, the UE_B 1004 may send a message 1016 to the ProSe Function 1012. In such aspect, the message 1016 may include a request for information associated with Code A and a request for location information associated with the UE (e.g., UE_A 1002) that broadcasted Code A. In an aspect, the message 1016 may be a match report message that may be sent by a UE (e.g., UE_B 1004) to a ProSe Function in order for the UE to obtain the application-layer meaning (e.g., a ProSe Application Name) of the discovered code (e.g., Code A). The ProSe Function 1012 may determine whether UE_B 1004 is authorized to receive ProSe services and/or the requested location information. If UE_B 1004 is authorized, the ProSe Function 1012 may trigger the UE_A 1002 to take location measurements and to report the measurements to the ProSe Function 1012. For example, the ProSe Function 1012 may trigger the UE_A 1002 by sending a request 1018 to the location server 1014 for the requested location information. In an aspect, the location server 1014 may be an LTE location server. The location server 1014 may then send a message 1020 to the UE_A 1002 using LTE protocols for location information, such as SUPL (Secure User Plane Location). The UE_A 1002 may upload the requested location information 1024 to the location server 1014 in response to the message 1020. For example, the message 1020 may be a push notification.

In an aspect, if the UE (e.g., UE_A 1002) discovered by the UE_B 1004 is no longer of interest to the UE_B 1004, the UE_B 1004 may send a message to the ProSe Function 1012 indicating that the discovered UE (e.g., UE_A 1002) is no longer of interest to the UE_B 1004. The ProSe Function 1012 may forward the message to the location server 1014. The location server 1014 may then send a message (e.g., a push notification) to the UE_A 1002 that causes the UE_A 1002 to no longer upload the location information to the location server 1014. However, it should be understood that the UE_A 1002 may still continue to upload its location information for other UEs (e.g., UEs different from UE_B 1004) that have discovered UE_A 1002 and which are interested in the location of UE_A 1002.

In another aspect, a UE (e.g., UE_A 1002) discovered by the UE_B 1004 may implement a timer such that the UE uploads its location information to the location server 1014 while the timer is running. If the UE_B 1004 does not renew its interest in the location of the discovered UE prior to expiration of the timer, the discovered UE may no longer upload the location information to the location server 1014. It should be understood, however, that the UE (e.g., UE_A 1002) discovered by UE_B 1004 may still continue to upload its location information for other UEs (e.g., UEs different from UE_B 1004) that have discovered the UE and which are interested in the location of UE if the UE_B 1004 has not renewed its interest in the location of the discovered UE prior to expiration of the timer.

The location server 1014 may send a message 1021 that includes the location information to the ProSe Function 1012. The ProSe Function 1012 may then send a message 1022 to UE_B 1004 including information associated with Code A (e.g., a ProSe Application Name, such as "Expression A") and the location information (e.g., LTE-based location) associated with UE_A 1002. In an aspect, the message 1022 may be a match report acknowledgment message.

Figure 11:
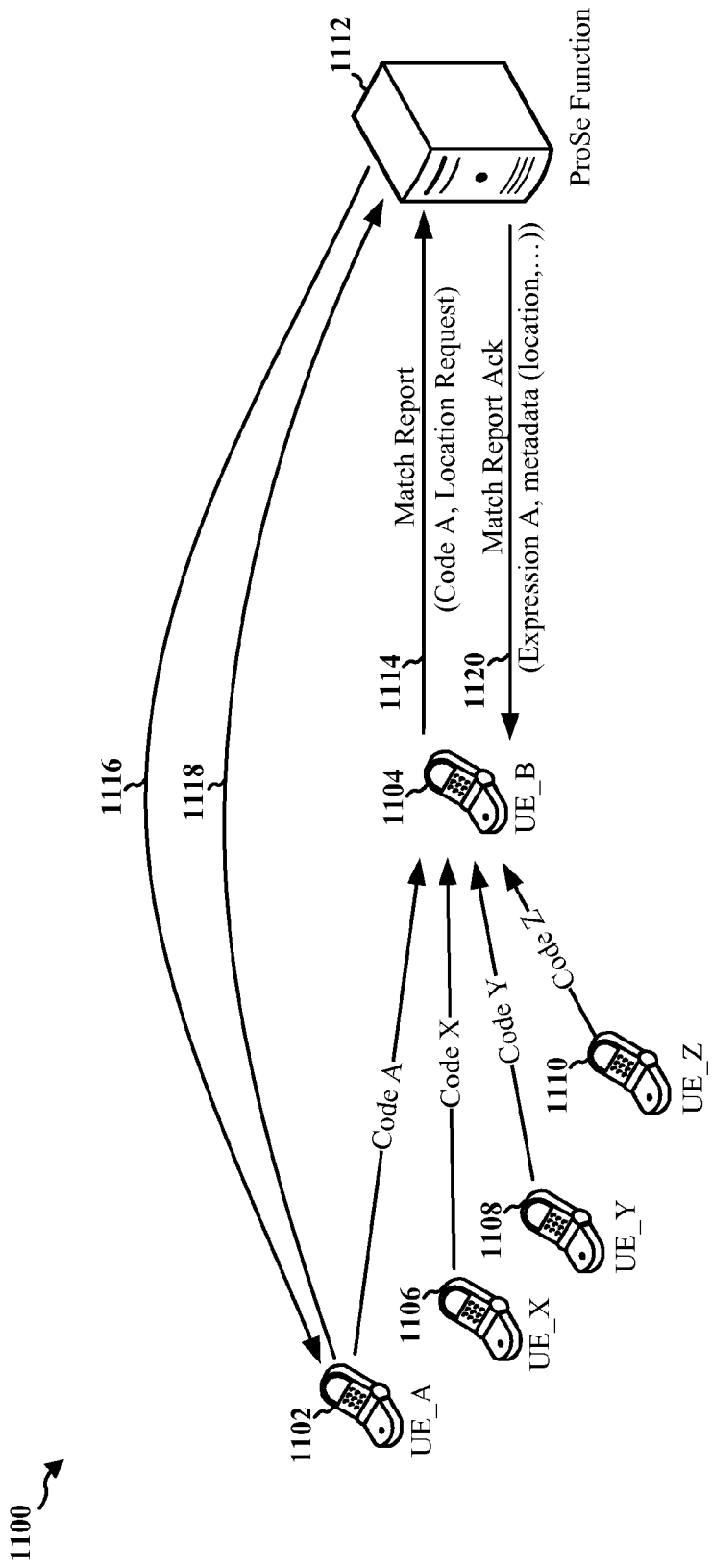
FIG. 11 is diagram illustrating an open location discovery procedure in a network.

FIG. 11 is diagram illustrating an open location discovery procedure in a network 1100. Network 1100 includes UE_A 1102, UE_B 1104, UE_X 1106, UE_Y 1108, UE_Z 1110, and ProSe Function 1112.

As shown in FIG. 11, UE_A 1102, UE_X 1106, UE_Y 1108, and/or UE_Z 1110 may each periodically broadcast a unique code (e.g., a short bit string) over-the-air. In an aspect, the unique code may be a ProSe application code associated with a UE. For example, as shown in FIG. 11, UE_A 1102, UE_X 1106, UE_Y 1108, and UE_Z 1110 may respectively broadcast ProSe application codes "Code A," "Code X," "Code Y," and "Code Z." The UE_B 1104 may discover UEs of interest by listening to the broadcasted ProSe application codes and filtering the ProSe application codes of interest to the UE_B 1104. For example, UE_B 1104 may determine that Code A is of interest to the UE_B 1104. In such example, UE_A 1102 may be a mobile dog grooming service looking for business and may be configured to provide its accurate location to any interested UE.

In an aspect, the UE_B 1104 may send a message 1114 to the ProSe Function 1112. In such aspect, the message 1114 may include a request for information associated with Code A and a request for location information associated with the UE (e.g., UE_A 1002) that broadcasted Code A. In an aspect, the message 1114 may be a match report message that may be sent by a UE (e.g., UE_B 1104) to a ProSe Function in order for the UE to obtain the application-layer meaning (e.g., a ProSe Application Name) of the discovered code (e.g., Code A). The ProSe Function 1112 may determine whether UE_B 1104 is authorized to receive ProSe services and/or the requested location information. If UE_B 1104 is authorized, the ProSe Function 1112 may trigger the UE_A 1102 to include location information in its metadata or to update its metadata with location information. For example, the ProSe Function 1112 may trigger the UE_A 1102 by sending a message 1116 to the UE_A 1102 using LTE protocols requesting the UE_A 1102 to update metadata of the UE_A 1102 with current location information. For example, the message 1116 may be a push notification. In an aspect, the UE_A 1102 may determine its location information via an operating system (e.g., Android) making use of a location obtaining feature based on a Global Positioning System (GPS) (or GLONASS, or Beidou, or WiFi) receiver.

In an aspect, the UE_A 1102 may send updated metadata 1118 to the ProSe Function 1112. Yet in another aspect, the UE_A 1102 may send updated metadata 1118 to the ProSe Function via an Application Server as in FIG. 9. After the ProSe Function 1112 obtains the metadata, the ProSe Function 1112 may send a message 1120 to UE_B 1004 including information associated with Code A (e.g., a ProSe Application Name, such as "Expression A") and metadata from the UE_A 1102. In an aspect, the metadata in the message 1120 may include the location information (e.g., GPS data or coordinates) associated with UE_A 1102. In another aspect, the metadata in the message 1120 may not include the location information associated with UE_A 1102 and may include an indication that a trigger has been sent to UE_A 1102 for publishing/broadcasting the location information over the air. In such aspect, the UE_B 1104 may listen for the location information of the UE_A 1102 along with the codes (e.g., Code A) announced by UE_A 1102. In an aspect, the message 1120 may be a match report acknowledgment message. In an aspect, the match report message may contain location information, or, if the match report is too long to delay the match report acknowledgment, the match report acknowledgement without any location information. In an aspect, the ProSe Function 1112 may send a proximity alert message to the UE_B 1104, indicating that UE_A 1102 is interested in the services of the UE_B 1104 and is located in proximity.

Figure 12:
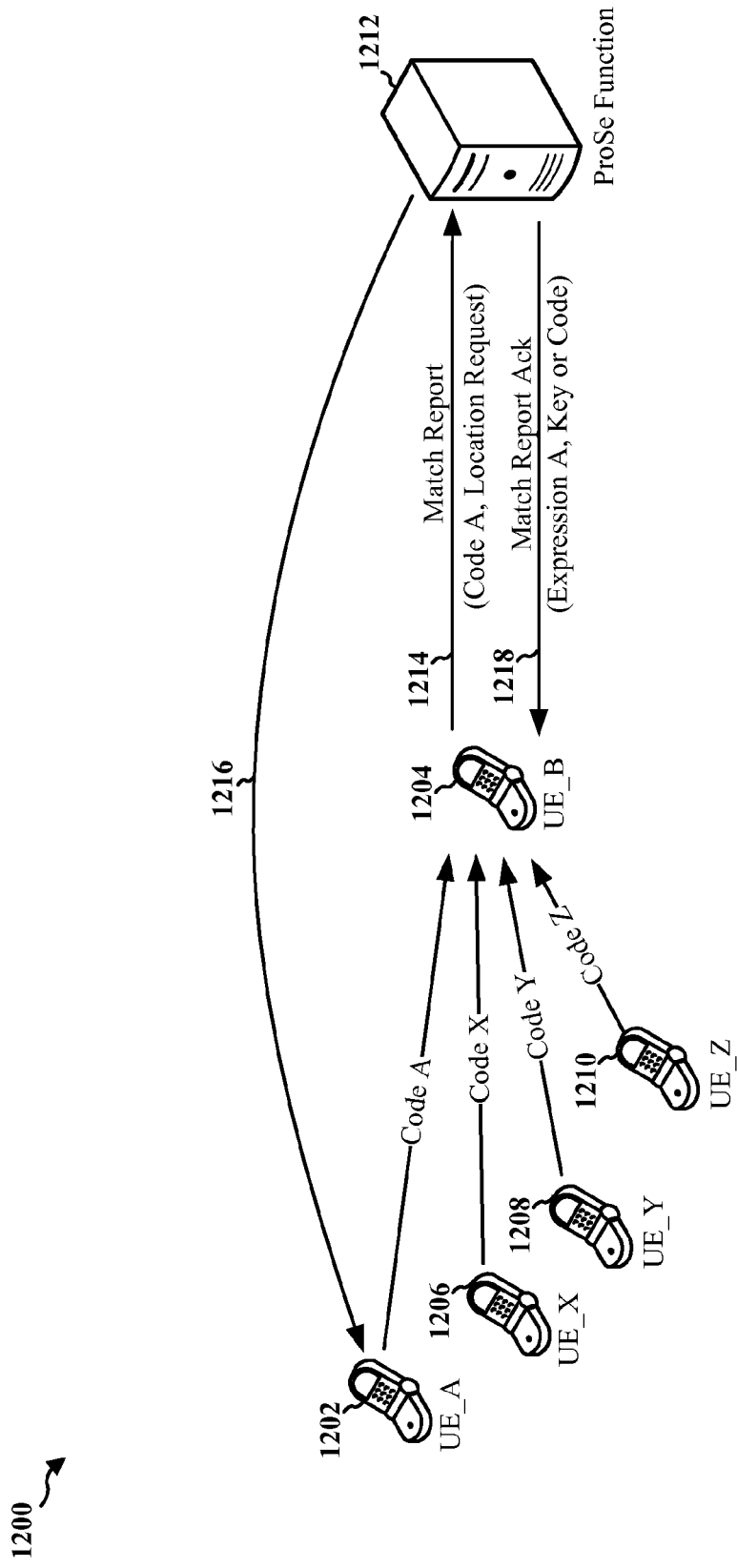
FIG. 12 is diagram illustrating a restricted location discovery procedure in a network.

FIG. 12 is a diagram illustrating a restricted location discovery procedure in a network 1200. Network 1200 includes UE_A 1202, UE_B 1204, UE_X 1206, UE_Y 1208, UE_Z 1210, and ProSe Function 1212.

As shown in FIG. 12, UE_A 1202, UE_X 1206, UE_Y 1208, and/or UE_Z 1210 may each periodically broadcast a unique code (e.g., a short bit string) over-the-air. In an aspect, the unique code may be a ProSe application code associated with a UE. For example, as shown in FIG. 12, UE_A 1202, UE_X 1206, UE_Y 1208, and UE_Z 1210 may respectively broadcast ProSe application codes "Code A," "Code X," "Code Y," and "Code Z." The UE_B 1204 may discover UEs of interest by listening to the broadcasted ProSe application codes and filtering the ProSe application codes of interest to the UE_B 1204. For example, UE_B 1204 may determine that Code A is of interest to the UE_B 1204. In such example, UE_A 1202 may be a private person with a social networking identifier, and may be configured to provide its accurate location to only a restricted set of pre-selected UEs (e.g., close friends and selected family members).

In an aspect, the UE_B 1204 may send a message 1214 to the ProSe Function 1212. In such aspect, the message 1214 may include a request for information associated with Code A and a request for location information associated with the UE (e.g., UE_A 1202) that broadcasted Code A. In an aspect, the message 1214 may be a match report message that may be sent by a UE (e.g., UE_B 1204) to a ProSe Function in order for the UE to obtain the application-layer meaning (e.g., a ProSe Application Name) of the discovered code (e.g., Code A). The ProSe Function 1212 may determine whether UE_B 1204 is authorized to receive ProSe services and/or the requested location information (i.e., whether UE_B 1204 is in the set of pre-selected UEs that UE_A 1202 authorized to get its accurate location information). If UE_B 1204 is authorized, the ProSe Function 1212 may trigger the UE_A 1202 to determine its current location and to report the location information over-the-air such that only the authorized UEs may obtain the location information, or to update its metadata. For example, the ProSe Function 1212 may trigger the UE_A 1202 by sending a message 1216 to the UE_A 1202 including a request to report location information of the UE_A 1202 and/or update metadata of the UE_A 1202 with the location information. For example, the message 1216 may be a push notification.

If the UE_A 1202 chooses to update the metadata of UE_A 1202, the UE_A 1202 obtains the location of UE_A 1202 using standard non-LTE techniques (e.g., obtaining location information via a high level operating system (e.g., Android) using a GPS receiver as previously described) and sends the location information to the ProSe Function 1212. In such aspect, the ProSe Function 1212 may send a message 1218 to the authorized UE_B 1204 including information associated with Code A (e.g., a ProSe Application Name, such as "Expression A" in FIG. 12) with the metadata containing the location information. For example, the ProSe Application Name may be configured to describe a restaurant. In such example, the ProSe Application Name may be "ProSeApp.Food.Restaurants.Italian." In an aspect, the ProSe Application Name may be preceded by a PLMN ID. In an aspect, the message 1218 may be a match report acknowledgment message. In an aspect, the match report acknowledgement may be delayed and only sent when the LTE location is available at a LTE location server.

If the UE_A 1202 chooses to report its location information over-the-air, the UE_A 1202 may start announcing its location information along with Code A. In an aspect, the location information announced by the UE_A 1202 may be protected (e.g., encrypted) with a security key. In such aspect, the ProSe Function 1212 may include the security key in the message 1218 sent to the authorized UE_B 1204. The UE_B 1204 may use the security key to determine the obfuscated location information received from the UE_A 1202. In another aspect, the location information announced by the UE_A 1202 may not be protected with a security key. In such aspect, the UE_A 1202 may announce location information of the UE_A 1202 along with a separate location-carrying code. In such aspect, the ProSe Function 1212 may include the location-carrying code in the message 1218 sent to the authorized UE_B 1204. The UE_B 1204 may monitor for this code and once found, use this code to retrieve the location information associated with the UE_A 1202.

Therefore, in the aspects described supra, a mobile device (e.g., mobile device UE_A 1002) may efficiently report its location information (e.g., announce its location information in a broadcast or update its metadata to include location information) only when needed (e.g., when requested by other devices duly authorized). Furthermore, it should be noted that the aspects described supra take into account any permissions for accurate location much like permissions for discovery. For example, some mobile devices may not care about the identities of other mobile devices requesting their location information and, therefore, no permission checking may be required. As another example, some mobile devices may wish to grant permission for accessing accurate current location to only certain other mobile devices (e.g., to mobile devices in a subset smaller than the subset of mobile devices permitted to discover in the first place). For example, the ProSe Function may be configured to enforce such permissions based on input from an application server (ultimately from the user).

Figure 13:
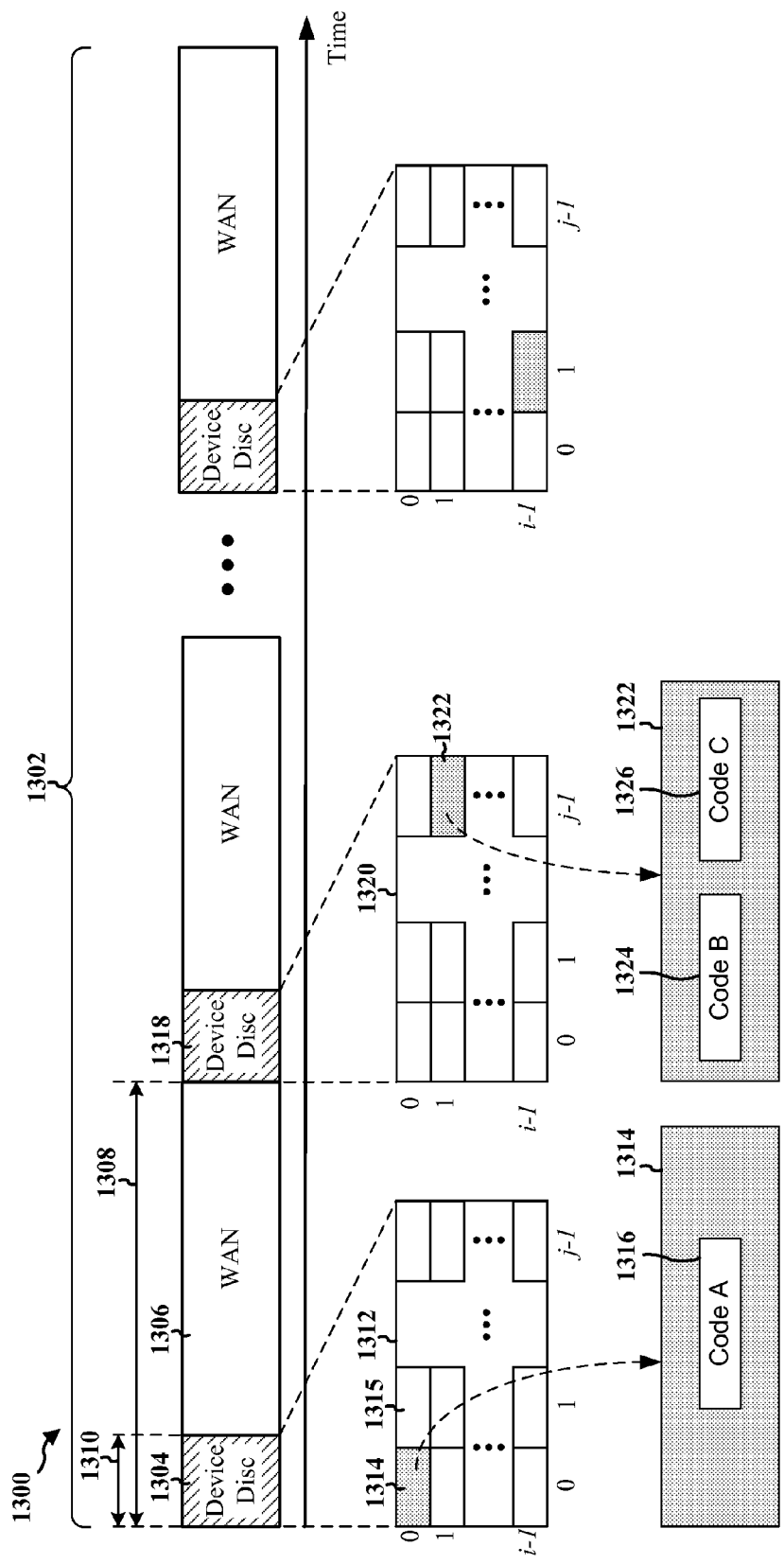
FIG. 13 is a diagram illustrating an exemplary over-the-air resource allocation scheme.

FIG. 13 is a diagram 1300 illustrating an exemplary over-the-air resource allocation scheme. FIG. 13 includes a set of resources 1302 which are periodically allocated for device discovery and for a WAN. For example, during period 1308, device discovery period 1304 of the set of resources 1302 is allocated for device discovery and a portion 1306 of the set of resources 1302 is allocated for a WAN. For example, the duration of period 1308 may be 10 seconds and the duration 1310 of the device discovery period 1304 allocated for device discovery may be 64 ms. As shown in FIG. 13, each portion of the set of resources 1302 allocated for device discovery may include a subset of resources. For example, device discovery period 1304 allocated for device discovery may include subset of resources 1312. The subset of resources 1312 includes j subframes, where each of the j subframes includes i sets of subcarriers. In one example, subset of resources 1312 may include 64 subframes (e.g., j=64), where each subframe includes 88 sets of subcarriers (i=88). In such example, each set of subcarriers may include 12 contiguous subcarriers. In an aspect, a set of subcarriers in a subframe may be defined as a single discovery resource, such as discovery resource 1314.

In one example, and as shown FIG. 13, a device may use the discovery resource 1314 in the subset of resources 1312 to transmit one ProSe application code (e.g., Code A 1316). In the present disclosure, the term ProSe application code may also be referred to as an expression code. As another example, and as shown FIG. 13, the device may use a single discovery resource 1322 in subset of resources 1320 of device discovery period 1318 to transmit two ProSe application codes (e.g., Code B 1324 and Code C 1326). In an aspect, there may be no association between the single discovery resources (e.g., single discovery resources 1314 and 1322) in FIG. 13. In an aspect, multiple ProSe application codes transmitted by a device in a single discovery resource may be linked by virtue of the shared single discovery resource. For example, the ProSe application codes Code B 1324 and Code C 1326 transmitted in discovery resource 1322 may be linked.

In an aspect, a device may be allocated a single discovery resource (e.g., discovery resource 1314) for transmissions associated with device discovery. Although illustrated as allocated a single resource block, a device may be allocated a plurality of resource blocks in association with device discovery. For example, a device may be allocated discovery resources 1314, 1315 in association with device discovery. Accordingly, a device may use a plurality of resources 1314, 1315 to transmit a ProSe application code, an expression code, or another code of the present disclosure associated with device discovery.

Figure 14:
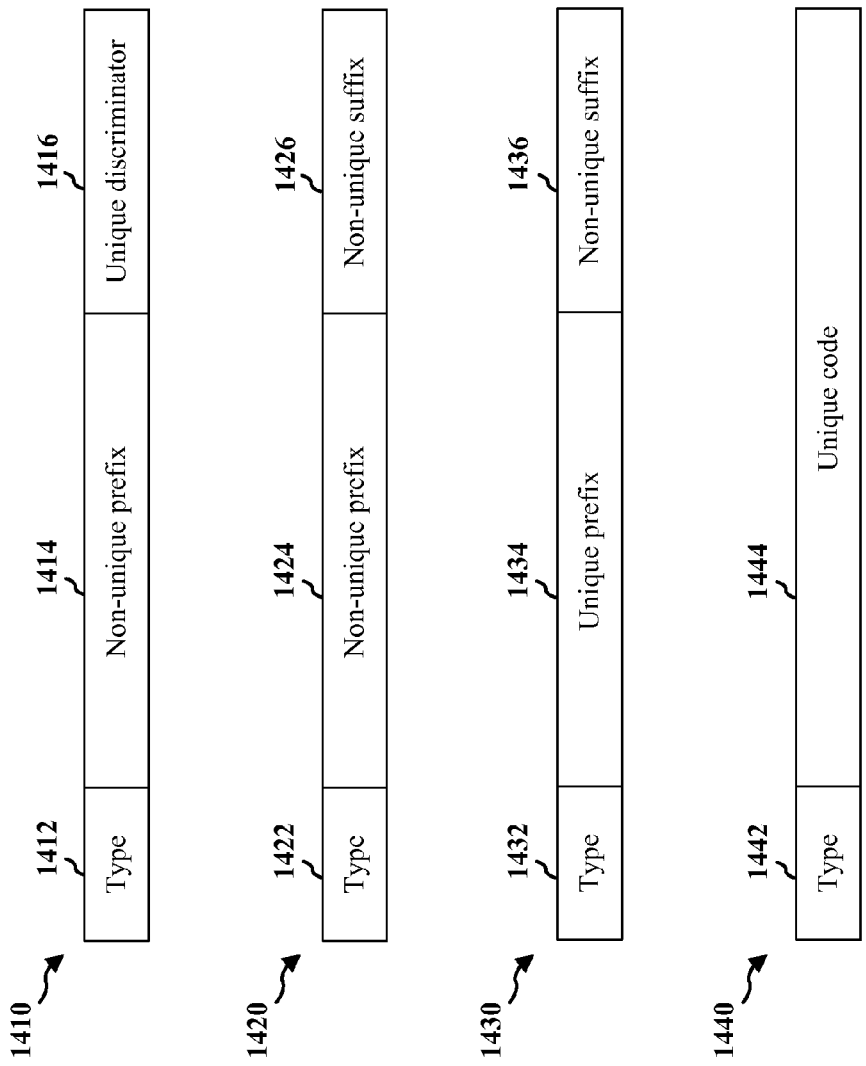
FIG. 14 is a diagram illustrating ProSe application code formats.

FIG. 14 is a diagram illustrating ProSe application code formats. As shown in FIG. 14, exemplary format 1410 includes a type 1412, a non-unique prefix 1414, and a unique discriminator 1416. In an aspect the type 1412 may be an open discovery type (also referred to as public discovery type), non-unique prefix 1414 may be a commercial branch category or subcategory, and unique discriminator 1416 may be a store identifier (ID). For example, the non-unique prefix 1414 and the unique discriminator 1416 may be a total of 160 bits. Exemplary format 1420 includes a type 1422, a non-unique prefix 1424, and a non-unique suffix 1426. In an aspect the type 1422 may be a restricted discovery type (also referred to as private discovery type), non-unique prefix 1424 may be an obfuscated identifier of an application, and non-unique suffix 1426 may be application specific information. For example, the non-unique prefix 1424 and the non-unique suffix 1426 may be a total of 160 bits. Exemplary format 1430 includes a type 1432, a unique prefix 1434, and a non-unique suffix 1436. In an aspect, the type 1432 may be a restricted discovery type, unique prefix 1434 may be an obfuscated identifier of a user, and non-unique suffix 1436 may be application specific information. For example, the unique prefix 1434 and the non-unique suffix 1436 may be a total of 160 bits. Exemplary format 1440 includes a type 1442 and a unique code 1444. For example, the unique code 1444 may be 160 bits.

FIG. 15 is a diagram illustrating a format 1500 for transmission of multiple ProSe application codes by a device. As shown in FIG. 15, format 1500 includes type 1502, primary code 1504, and secondary code 1506. For example, with reference to FIG. 13, primary code 1504 may be code B 1324 and the secondary code 1506 may be code C 1326. In such example, the primary code 1504 and the secondary code 1506 may be transmitted in a single discovery resource, such as discovery resource 1322. Therefore, in the aspect of FIG. 15, primary code 1504 and the secondary code 1506 may be linked by virtue of the shared single discovery resource used for the transmission of the primary code 1504 and the secondary code 1506.

In one scenario, a single discovery resource may not be able to accommodate transmission of multiple codes (e.g., ProSe application codes) by a device (e.g., when the total size of the multiple codes is too large for transmission using a single discovery resource). In such scenario, the multiple codes may need to be transmitted using multiple discovery resources. In an aspect, the multiple codes transmitted using multiple discovery resources may be configured to be associated (e.g., linked) to one another. For example, and as described infra with respect to FIG. 16, a primary code may be transmitted by a device in one discovery resource and may be linked to a secondary code that is transmitted by the device in another discovery resource. For example, with reference to FIG. 13, primary code 1504 may be code A 1316 and the secondary code 1506 may be code C 1326.

FIG. 16 is a diagram illustrating code linking in accordance with various aspects of the disclosure. As shown in FIG. 16, format 1600 includes a type 1602 and primary code 1604. For example, the primary code 1604 may be a first ProSe application code and may be 160 bits in length. As another example, the primary code 1604 may be less than 160 bits in length (e.g., 80 bits). In FIG. 16, format 1600 may be used by a UE to transmit the type 1602 and primary code 1604 in a first discovery resource. As further shown in FIG. 16, format 1610 includes a type 1612, linking information 1614, and secondary code 1616. For example, the secondary code 1616 may be a second ProSe application code. For example, linking information 1614 and the secondary code 1616 may be a total of 160 bits. In such example, the secondary code 1616 linked to the primary code 1604 is less than 160 bits. In FIG. 16, format 1610 may be used by the UE to transmit the type 1612, the linking information 1614, and the secondary code 1616 in a second discovery resource, where the first discovery resource is different from the second discovery resource. In an aspect, the linking information 1614 indicates that the secondary code 1616 is linked to the primary code 1604 (meaning, for example, that both of these codes are being broadcasted by the same device). For example, the linking information 1614 may be a code and/or key information sufficient to match and decode a private expression. As another example, the linking information 1614 may be the ProSe application name that would be used to uniquely match the secondary expression code.

In an aspect, a first UE (also referred to as a monitoring device or discovering device) may receive a primary code that is transmitted by a second UE (also referred to as a transmitting device) using a first discovery resource. The first UE may then determine whether the primary code is associated with any secondary codes and/or secondary expressions.

Figure 17:
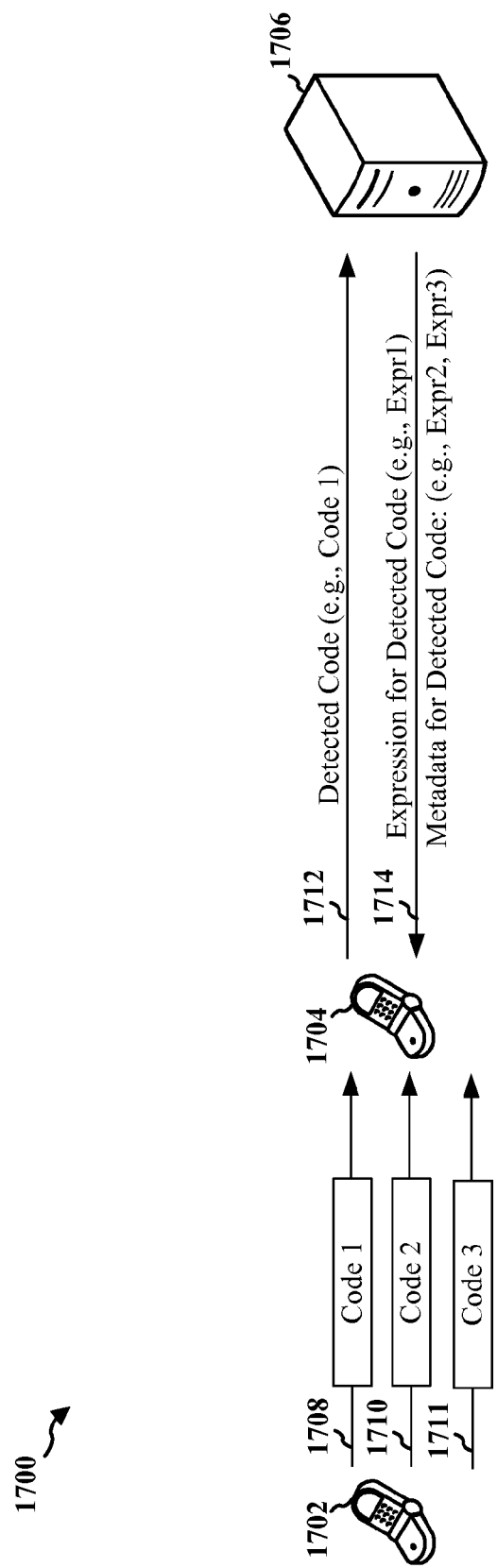
FIG. 17 is a diagram illustrating device discovery in a network in accordance with various aspects of the present disclosure.

In one aspect, and as described infra with respect to FIG. 17, the first UE may send a request for information associated with a discovered second UE to a network device. The network device may then send a message that includes metadata associated with the primary code and a list of secondary codes and/or secondary expressions that the second UE is authorized to publish.

FIG. 17 is a diagram illustrating device discovery and code resolution in a network 1700 in accordance with various aspects of the present disclosure. As shown in FIG. 17, network 1700 includes first UE 1704, second UE 1702, and a network device 1706. In an aspect, network device 1706 may be a ProSe Function. The second UE 1702 may transmit code 1 1708, code 2 1710, and code 3 1711. In the present disclosure, the term code is also referred to as an expression code or ProSe Application code. In FIG. 17, code 1 1708 may be associated with a first expression (e.g., Expression 1), code 2 1710 may be associated with a second expression (e.g., Expression 2), and code 3 1711 may be associated with a third expression (e.g., Expression 3). For example, each expression may be a different ProSe application name. In the aspect of FIG. 17, the first UE 1704 may receive and decode the code 1 1708 (e.g., the primary code). The first UE 1704 may find code 1 1708 of interest (e.g., code 1 1708 may match some criteria of the first UE 1704). The first UE 1704 may successfully receive code 2 1710 and code 3 1711, but may not be able to immediately decode code 2 1710 and code 3 1711. Consequently, the first UE 1704 may not find code 2 1710 and code 3 1711 (e.g., the secondary codes) to be of interest. The first UE 1704 may send a message 1712 that includes a request for information associated with the code of interest (e.g., code 1 1708) to the network device 1706. In an aspect, the message 1712 may be a match report message that may be sent by a UE (e.g., the first UE 1704) to a ProSe Function in order for the UE to obtain the application-layer meaning (e.g., a ProSe Application Name) of the discovered code (e.g., code 1 1708), unless already known from a previous match report. The network device 1706 may send a message 1714 that includes an expression associated with code 1 1708 (e.g., Expression 1) and metadata associated with code 1 1708. For example, the metadata may include one or more expressions associated with code 1 1714, such as expression 2 and expression 3. In an aspect, the message 1714 may be a match report acknowledgment message. Since expression 2 and expression 3 are received as metadata for code 1 1708, the first UE 1704 determines that expression 2 and expression 3 are also associated with the second UE 1702 that transmitted code 1 1708. Therefore, the first UE 1704 may receive one or more secondary expressions (e.g., expression 2 and expression 3) of the second UE 1702 using a primary expression code (e.g., code 1 1708). In other words, the first UE 1704 may determine one or more secondary expressions (e.g., expression 2 and expression 3) of the second UE 1702 without decoding the expression codes (e.g., code 2 1710 and code 3 1711) associated with the secondary expressions.

Figure 18A:
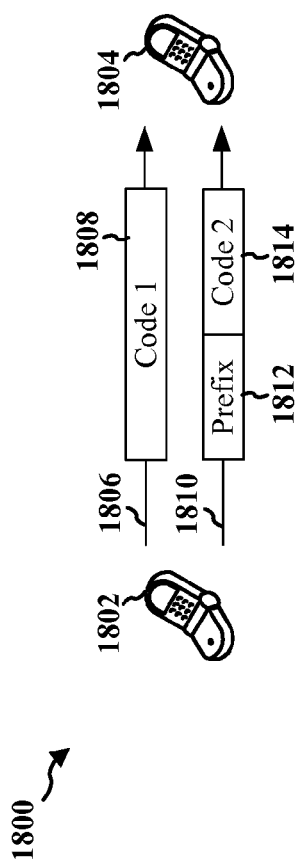
FIGS. 18A and 18B are diagrams illustrating device discovery in a network in accordance with various aspects of the present disclosure.
Figure 18B:
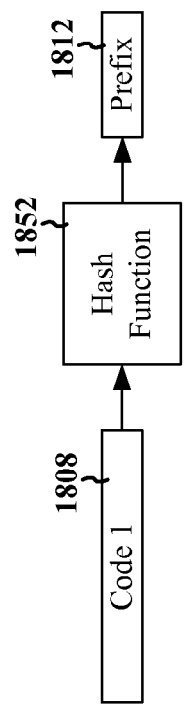

In another aspect, and as described infra with respect to FIGS. 18A and 18B, the first UE 1804 may receive a primary expression code from a second UE 1802 and may determine a protected secondary expression code transmitted from the second UE 1802 using the primary expression code.

FIGS. 18A and 18B are diagrams illustrating device discovery in a network 1800 in accordance with various aspects of the present disclosure. As shown in FIG. 18A, network 1800 includes first UE 1804 and second UE 1802. Second UE 1802 may transmit a signal 1806 that includes code 1 1808 (e.g., a primary expression code) and may transmit a signal 1810 that includes code 2 1814 (e.g., a secondary expression code) and a prefix 1812. In an aspect, the prefix 1812 may be an arbitrary subset of the expression code bits. For example, the prefix 1812 may be configured to precede or may be configured to follow code 2 1814. Therefore, it should be understood that the arrangement of the code 2 1814 and prefix 1812 in signal 1810 may be different than shown in FIG. 18A in other aspects. The first UE 1804 may receive signal 1806 and may successfully extract code 1 1808 from signal 1806. The first UE 1804 may further receive the signal 1810, however, the first UE 1804 may not be able to immediately extract code 2 1814 from signal 1810 without knowledge of the prefix 1812. In FIG. 18A, code 1 1808 may be associated with a first expression of the second UE 1802 and code 2 1814 may be associated with a second expression of the second UE 1802. For example, the first and second expressions may be different ProSe application names.

In an aspect, the first UE 1804 may determine the prefix 1812 by applying a function to the code 1 1808. For example, with reference to FIG. 18B, the first UE 1804 may apply a prescribed hash function 1852 to the code 1 1808 to generate the prefix 1812. The first UE 1804 may identify any received signals that include the prefix 1812. For example, the first UE 1804 may identify that the received signal 1810 includes the prefix 1812. The first UE 1804 may then extract code 2 1814 using the prefix 1812. Therefore, since the first UE 1804 generated the prefix 1812 using code 1 1808 from the second UE 1802, the first UE 1804 determines that the code 2 1814 extracted using prefix 1812 is also associated with the second UE 1802. Naturally, the exact same processing may be used by the second UE 1802 to convey to any recipients that both code 1 and code 2 are linked or from the same device. In an aspect, the first UE 1804 may send a message that includes a request for information associated with the code 2 1814 to a network device. In an aspect, the message may be a match report message that may be sent by a UE (e.g., first UE 1804) to a ProSe Function in order for the UE to obtain the application-layer meaning (e.g., a ProSe Application Name) of the discovered code (e.g., code 2 1814). The network device may send a message that includes an expression associated with code 2 1814 and metadata associated with code 2 1814. For example, the metadata may include one or more expressions associated with code 2 1814.

Figure 19:
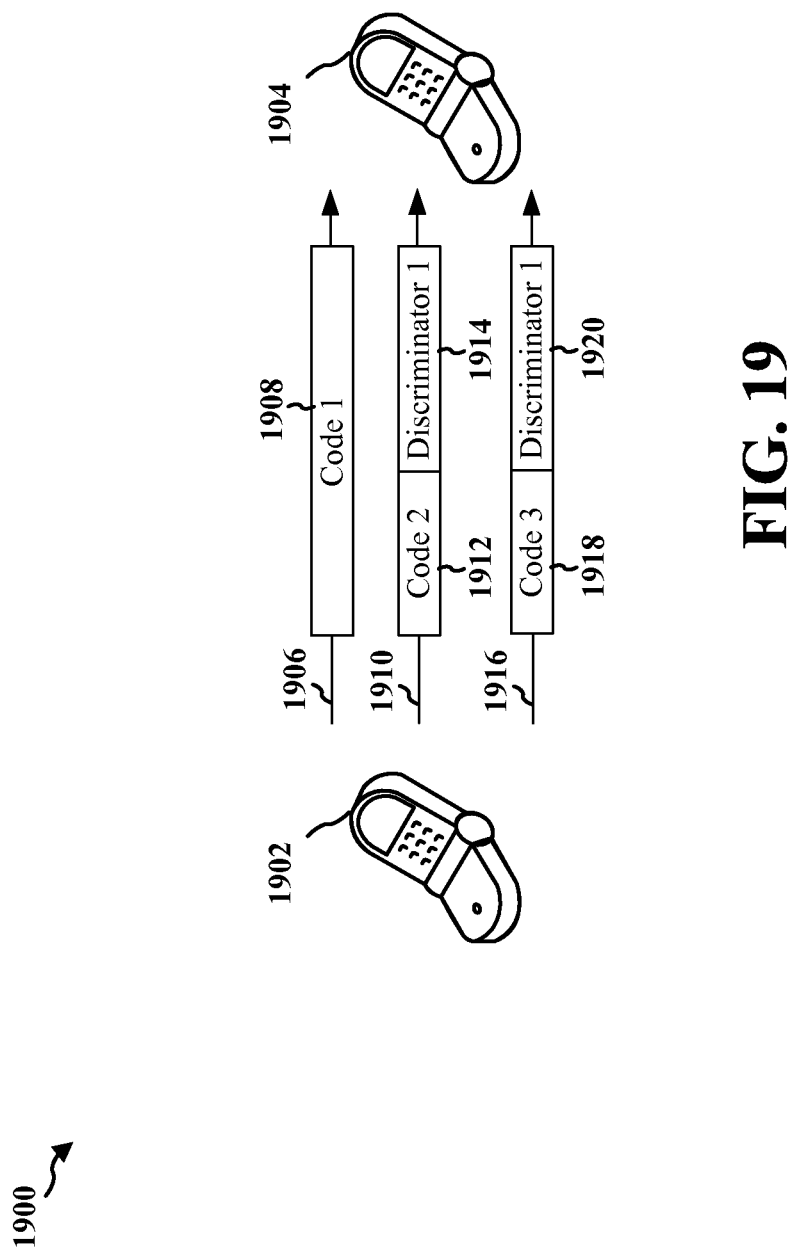
FIG. 19 is a diagram illustrating device discovery in a network in accordance with various aspects of the present disclosure.

In an aspect, and as described infra with respect to FIG. 19, a UE may derive a discriminator for a public expression (e.g., an expression discoverable by any UE without special permission) and may determine whether any of the expression codes detected by the UE contain the derived discriminator. In this way, the UE can determine all expression codes that are linked by virtue of the same discriminator.

FIG. 19 is a diagram illustrating device discovery in a network 1900 in accordance with various aspects of the present disclosure. As shown in FIG. 19, network 1900 includes first UE 1904 and second UE 1902. Second UE 1902 may transmit a signal 1906 that includes code 1 1908 (e.g., a primary expression code), a signal 1910 that includes code 2 1912 (e.g., a secondary expression code) and a discriminator 1 1914, and a signal 1916 that includes code 3 1918 (e.g., a secondary expression code) and a discriminator 1 1920. It should be understood that the arrangement of the code 2 1912 and discriminator 1 1914 in signal 1910 may be different than shown in FIG. 19 in other aspects (e.g., discriminator 1 1914 may precede the code 2 1912). It should also be understood that the arrangement of the code 3 1918 and discriminator 1 1920 in signal 1916 may be different than shown in FIG. 19 in other aspects (e.g., discriminator 1 1920 may precede the code 2 1912).

The first UE 1904 may decode code 1 1908. In an aspect, the first UE 1904 may derive a discriminator for a public expression that is discoverable by any UE without special permission. For example, the first UE 1904 may derive the discriminator (e.g., "discriminator 1") using code 1 1908. The first UE 1904 may then determine whether the signal 1910 and/or signal 1916 include the derived discriminator (e.g., "discriminator 1"). As shown in FIG. 19, since the signal 1910 includes the discriminator 1 1914 and since the signal 1916 includes the discriminator 1 1920, the first UE 1904 may determine that code 2 1912 and code 3 1918 are both linked to code 1 1908 by virtue of the same discriminator derived from code 1 1908. Therefore, in the aspect of FIG. 19, the first UE 1904 may determine secondary expression codes (e.g., code 2 1912 and code 3 1918) that are linked to a primary expression code (code 1 1908) by virtue of having the same discriminator (e.g., "discriminator 1").

Figure 20:
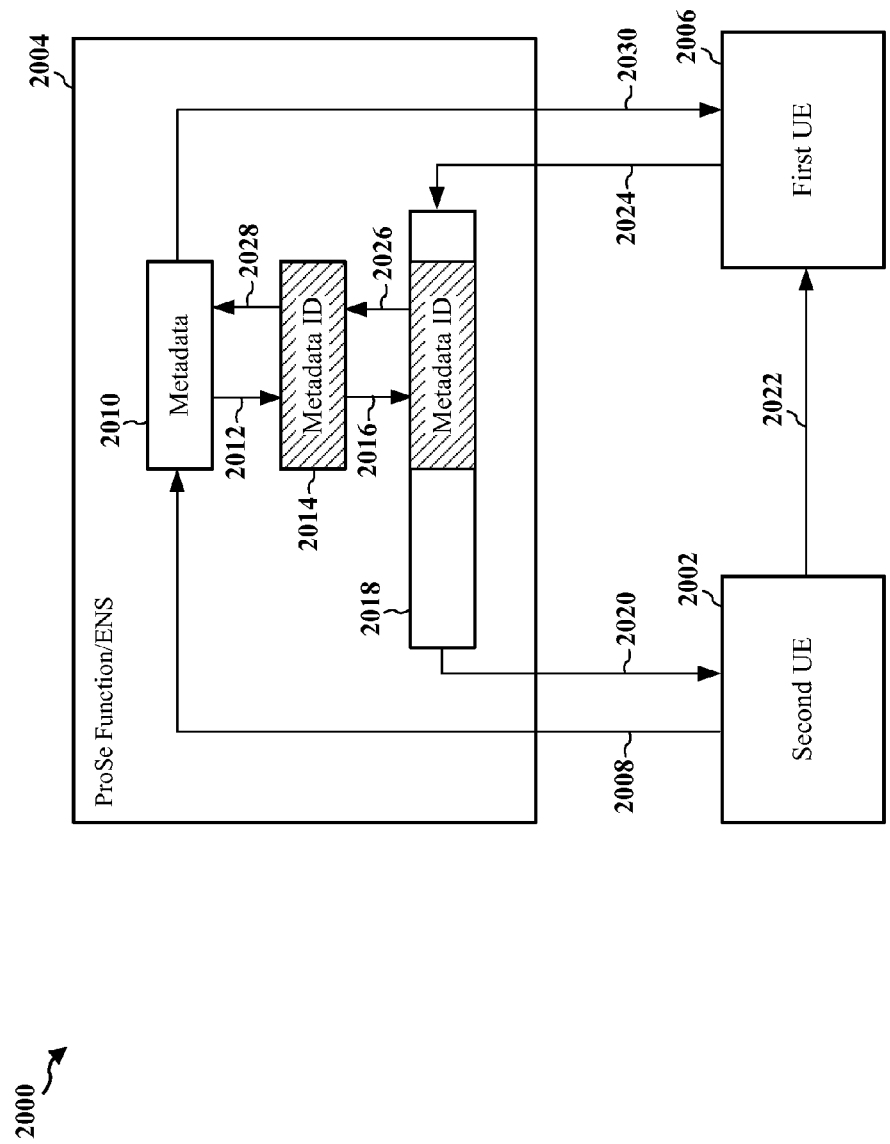
FIG. 20 is a diagram illustrating metadata management in accordance with various aspects of the disclosure.

FIG. 20 is a diagram 2000 illustrating metadata management in accordance with various aspects of the disclosure. FIG. 20 includes a first UE 2006, a ProSe Function/Expression Name Server (ENS) 2004, and a second UE 2002. In an aspect, the ProSe Function/ENS 2004 is a ProSe Function that is configured to support a metadata update operation initiated by an announcing UE (e.g., second UE 2002). As shown in FIG. 20, the second UE 2002 sends an announcement message 2008. In an aspect, the announcement message 2008 includes a ProSe Application Name and metadata associated with the ProSe Application Name. The ProSe Function/ENS 2004 receives the announcement message 2008 and converts the ProSe Application Name in the announcement message 2008 into a bit string (e.g., a sequence of bits) suitable for an over-the-air transmission. For example, the bit string may be configured to enable one or more monitoring UEs (e.g., first UE 2006) to determine whether an announcement from the second UE 2002 is of interest to the one or more monitoring UEs. The ProSe Function/ENS 2004 may store the metadata 2010 included in the announcement message 2008 in a memory and may perform a function 2012 to generate an ID associated with the metadata, such as metadata ID 2014. The ProSe Function/ENS 2104 may then perform a function 2016 to configure the bit string and the metadata ID 2014 in an expression code, such as expression code 2018. As further shown in FIG. 20, the ProSe Function/ENS 2004 sends a message 2020 that includes expression code 2018 to the second UE 2002. The second UE 2002 then broadcasts an announcement message 2022 that includes the expression code 2018. The first UE 2006 receives the announcement message 2022 and determines that the expression code 2018 in the announcement message 2022 is of interest to the first UE 2006. The first UE 2006 sends a message 2024 that includes the expression code 2018. In an aspect, the message 2024 may be a match report message. The ProSe Function/ENS 2004 receives the message 2024 and identifies the expression code 2018 in the message 2024. The ProSe Function/ENS 2004 performs a function 2026 to extract a metadata ID (e.g., metadata ID 2014) included in the expression code 2018. The ProSe Function/ENS 2004 performs a function 2028 to identify metadata (e.g., metadata 2010) corresponding to the extracted metadata ID (e.g., metadata ID 2014). The ProSe Function/ENS 2004 then sends a message 2030 that includes the metadata (e.g., metadata 2010) to the first UE 2006.

Therefore, in the aspect of FIG. 20, an announcing UE (e.g., second UE 2002) may include metadata (e.g., metadata 2010) in a message (e.g., message 2008) announced by the announcing UE, where the metadata is stored in a ProSe Function/ENS (e.g., ProSe Function/ENS 2004). A monitoring UE (e.g., first UE 2006) may then receive the metadata from the ProSe Function/ENS.

Figure 21:
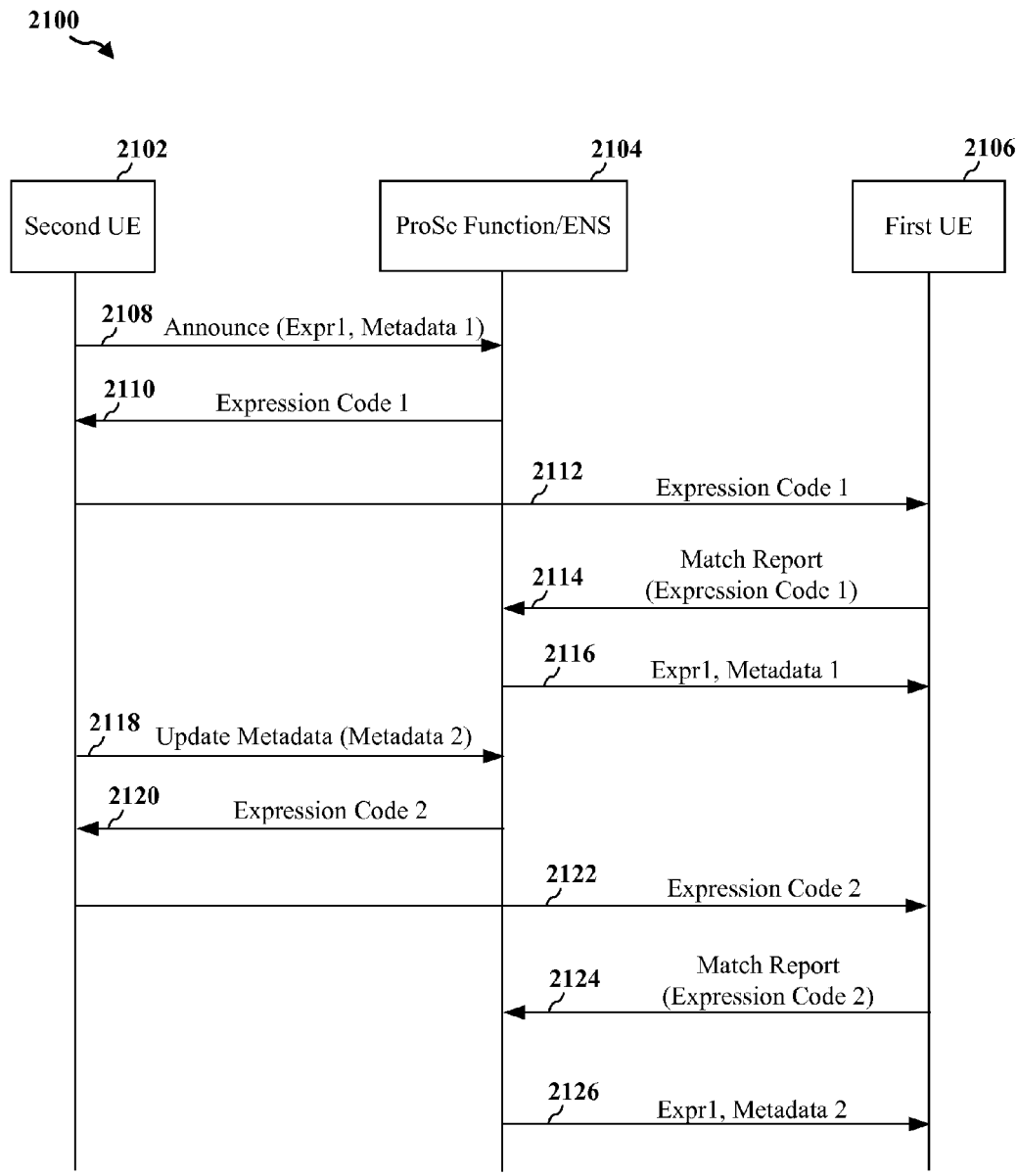
FIG. 21 is a diagram illustrating a communication flow in accordance with various aspects of the disclosure.

FIG. 21 is a diagram 2100 illustrating a communication flow in accordance with various aspects of the disclosure. FIG. 21 includes a first UE 2106, a ProSe Function/ENS 2104, and a second UE 2102. As shown in FIG. 21, the second UE 2102 sends an announcement message 2108 to the Prose Function/ENS 2104. In an aspect, the announcement message 2108 includes a ProSe Application Name (e.g., Expression 1 (Expr1)) and metadata (e.g., Metadata 1) associated with the ProSe Application Name. For example, the ProSe Application Name may be a description of an application that is to be announced by the second UE 2102, where the description is used by one or more monitoring UEs (e.g., first UE 2106) to determine whether the application of the second UE 2102 is of interest to the one or more monitoring UEs. The ProSe Function/ENS 2104 receives the announcement message 2108 and converts the ProSe Application Name in the announcement message 2108 into a bit string (e.g., a sequence of bits) suitable for an over-the-air transmission. For example, the bit string may be configured to enable one or more monitoring UEs (e.g., first UE 2106) to determine whether the announcement from the second UE 2102 is of interest to the one or more monitoring UEs. The ProSe Function/ENS 2104 may store the metadata included in the announcement message 2108 in a memory and may generate an ID associated with the metadata. The ProSe Function/ENS 2104 may then configure the bit string and the ID associated with the metadata in a first expression code (e.g., Expression Code 1). As shown in FIG. 21, the ProSe Function/ENS 2104 sends a message 2110 that includes the first expression code (e.g., Expression Code 1) to the second UE 2102.

As shown in FIG. 21, the second UE 2102 announces (e.g., broadcasts over-the-air) message 2112 that includes Expression Code 1. The first UE 2106 receives the message 2112 and determines that the Expression Code 1 in message 2112 is of interest to the first UE 2106. For example, the first UE 2106 may make the determination based on one or more criteria configured by a user of the first UE 2106. The first UE 2106 sends a Match Report message 2114 that includes the Expression Code 1 to the ProSe Function/ENS 2104. The ProSe Function/ENS 2104 extracts the bit string and the ID associated with the metadata (e.g., Metadata 1) from the Expression Code 1 included in the match report message 2114. The ProSe Function/ENS 2104 then identifies the ProSe Application Name (e.g., Expr1) associated with the bit string and the metadata associated with the ID. The ProSe Function/ENS 2104 then sends a message 2116 that includes the ProSe Application Name and the metadata (e.g., Metadata 1). The first UE 2106 receives the message 2116 and determines that Expression Code 1 corresponds to the ProSe Application Name (e.g., Expr1) and the metadata (e.g., Metadata 1) received via message 2116.

As shown in FIG. 21, the second UE 2102 may update the metadata (e.g., Metadata 1) stored by ProSe Function/ENS 2104 by sending message 2118 that includes updated metadata (e.g., Metadata 2). In an aspect, the message 2118 may include an instruction to update the metadata. The ProSe Function/ENS 2104 may generate an updated ID associated with the updated metadata. The ProSe Function/ENS 2104 may then configure the bit string associated with the ProSe Application Name and the updated ID associated with the updated metadata in a second expression code (e.g., Expression Code 2). As shown in FIG. 21, the ProSe Function/ENS 2104 sends a message 2120 that includes the second expression code (e.g., Expression Code 2) to the second UE 2102.

As shown in FIG. 21, the second UE 2102 announces (e.g., broadcasts over-the-air) message 2122 that includes Expression Code 2. The first UE 2106 receives the message 2122 and determines that Expression Code 2 in message 2122 is of interest to the first UE 2106. For example, the first UE 2106 may make the determination based on one or more criteria configured by the user of the first UE 2106. The first UE 2106 sends a Match Report message 2124 that includes the Expression Code 2 to the ProSe Function/ENS 2104. The ProSe Function/ENS 2104 extracts the bit string and the updated ID associated with the updated metadata (e.g., Metadata 2) from the Expression Code 2 included in the Match Report message 2124. The ProSe Function/ENS 2104 then identifies the ProSe Application Name (e.g., Expr1) associated with the bit string and the updated metadata associated with the updated ID. The ProSe Function/ENS 2104 then sends a message 2126 that includes the ProSe Application Name (e.g., Expr1) and the updated metadata (e.g., Metadata 2). The first UE 2106 receives the message 2126 and determines that Expression Code 2 corresponds to the ProSe Application Name (e.g., Expr1) and the updated metadata (e.g., Metadata 2) received via message 2126. Therefore, in the aspect of FIG. 21, the second UE 2102 may update the metadata associated with the ProSe Application Name and the first UE 2106 may retrieve the updated metadata from the ProSe Function/ENS 2104, without requiring the ProSe Function/ENS 2104 to execute a push function to notify one or more monitoring UEs of the updated metadata.

Figure 22:
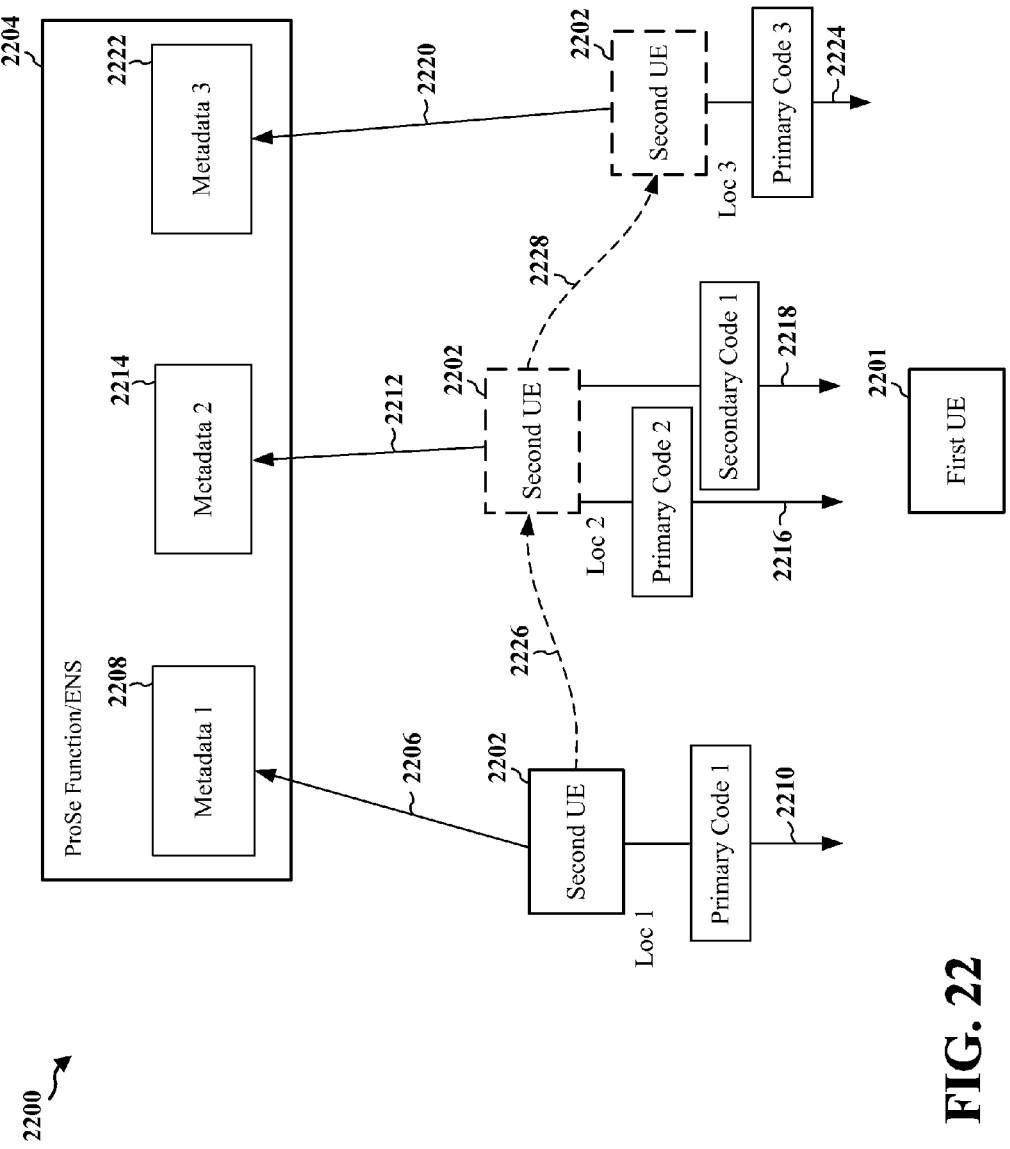
FIG. 22 is a diagram illustrating an exemplary network.

FIG. 22 is a diagram illustrating an exemplary network 2200. As shown in FIG. 22, network 2200 includes first UE 2201, second UE 2202, and ProSe Function/ENS 2204. As shown in FIG. 22, the first UE 2201 in network 2200 may be monitoring expression codes transmitted (e.g., broadcasted) by one or more announcing UEs, such as second UE 2202. In an aspect, second UE 2202 may be located at a first location (indicated as "Loc 1" in FIG. 22) and may remain stationary at location 1. The second UE 2202 may determine the location of second UE 2202 and may send an announcement 2206 that includes a ProSe Application Name and/or metadata (e.g., Metadata 1 2208). In an aspect, the metadata may include the stationary location information (e.g., "Loc 1") of the second UE 2202. For example, the stationary location information may be geographic coordinates (e.g., GPS coordinates or GPS data) indicating the location of the second UE 2202 remaining stationary at the first location. The ProSe Function/ENS 2204 may store the metadata (e.g., Metadata 1 2208) in a memory and may provide the second UE 2202 a primary expression code (e.g., Primary Code 1) associated with the ProSe Application Name and/or the metadata (e.g., Metadata 1 2208). The second UE 2202 may transmit a message 2210 that includes the primary expression code (e.g., Primary Code 1).

As shown in FIG. 22, the second UE 2202 may no longer remain stationary and may move along exemplary path 2226 to a second location (indicated as "Loc 2"). The second UE 2202 may determine the location of second UE 2202 and may send an update message 2212 that includes the ProSe Application Name and/or updated metadata (e.g., Metadata 2 2214). In an aspect, the updated metadata may include information for identifying a secondary expression code (e.g., Secondary Code 1) that includes the current location (e.g., "Loc 2") of the moving second UE 2202. The ProSe Function/ENS 2204 may store the updated metadata (e.g., Metadata 2 2214) in a memory and may provide the second UE 2202 a second primary expression code (e.g., Primary Code 2) associated with the ProSe Application Name and/or the updated metadata (e.g., Metadata 2 2214). The second UE 2202 may transmit a message 2216 that includes the second primary expression code (e.g., Primary Code 2) and a message 2218 that includes the secondary expression code (e.g., Secondary Code 1).

As shown in FIG. 22, the second UE 2202 may continue moving along exemplary path 2228 and may arrive at a third location (indicated as "Loc 3" in FIG. 22) and may remain stationary at the third location. The second UE 2202 may determine the location of second UE 2202 and may send an update message 2220 that includes a ProSe Application Name and/or updated metadata (e.g., Metadata 3 2222). In an aspect, the updated metadata (e.g., Metadata 3 2222) may include the stationary location information (e.g., "Loc 3") of the second UE 2202. For example, the stationary location information may be geographic coordinates (e.g., GPS coordinates or GPS data) indicating the location of the second UE 2202 remaining stationary at the third location. The ProSe Function/ENS 2204 may store the updated metadata (e.g., e.g., Metadata 3 2222) in a memory and may provide the second UE 2202 a third primary expression code (e.g., Primary Code 3) associated with the ProSe Application Name and/or the updated metadata (e.g., Metadata 3 2222). The second UE 2202 may transmit a message 2224 that includes the third primary expression code (e.g., Primary Code 3).

Figure 23:
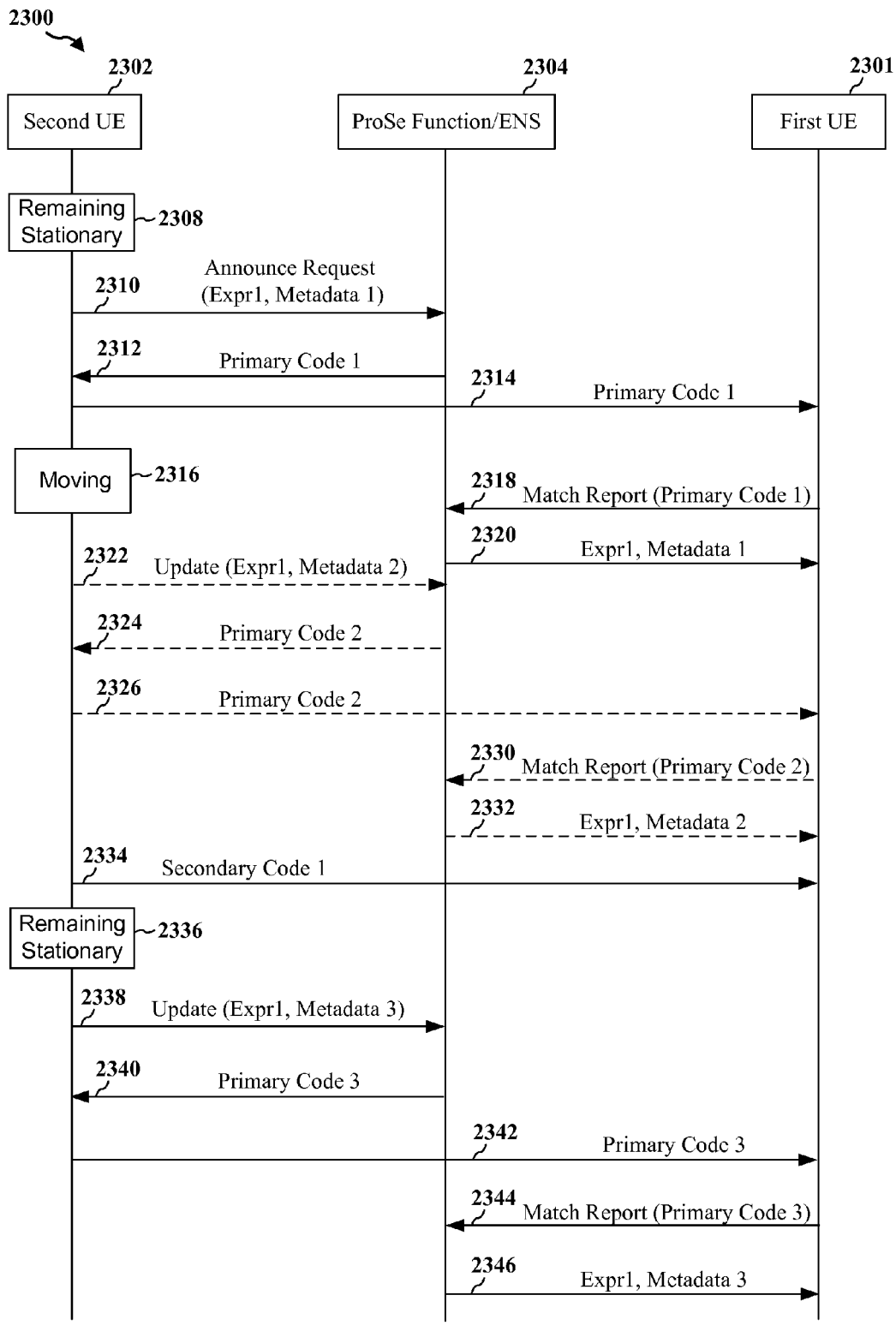
FIG. 23 is a diagram illustrating a communication flow in accordance with various aspects of the disclosure.

FIG. 23 is a diagram 2300 illustrating a communication flow in accordance with various aspects of the disclosure. It should be understood that the transmissions indicated with dotted lines in FIG. 23 represent optional transmissions for illustrating various aspects of the disclosure. In an aspect, the first UE 2301, second UE 2302, and the ProSe Function/ENS 2304 in FIG. 23 may respectively correspond to the first UE 2201, second UE 2202, and the ProSe Function/ENS 2204 in FIG. 22.

As shown in FIG. 23, a second UE 2302 remains stationary 2308 at a first location (e.g., "Loc 1"). The second UE 2302 may determine the location of the second UE 2302 and may send an Announce Request message 2310 that includes a ProSe Application Name (e.g., Expr1) and metadata (e.g., Metadata 1) associated with the ProSe Application Name. For example, the second UE 2302 may determine the location of second UE 2302 by receiving GPS data from a satellite or by receiving location information from a network (e.g., via WiFi™ network scanning) In an aspect, the Metadata 1 may include the stationary location information (e.g., "Loc 1") of the second UE 2202. For example, the stationary location information may be geographic coordinates (e.g., GPS coordinates or GPS data) indicating the location of the stationary second UE 2302. For example, the ProSe Application Name may be a description of an application that is to be announced by the second UE 2302, where the description is used by one or more monitoring UEs (e.g., first UE 2301) to determine whether the application of the second UE 2302 is of interest to the one or more monitoring UEs. The ProSe Function/ENS 2304 receives the Announce Request message 2310 and may configure the ProSe Application Name (e.g., Expr1) and the Metadata 1 (or information associated with the Metadata 1, such as a metadata ID) into a first expression code (e.g., Primary Code 1). For example, and as described supra, an expression code may be a sequence of bits suitable for an over-the-air transmission and may be configured to enable one or more monitoring UEs (e.g., first UE 2301) to determine whether the announcement from the second UE 2302 is of interest to the one or more monitoring UEs. As shown in FIG. 23, the ProSe Function/ENS 2304 sends a message 2312 that includes the first primary expression code (e.g., Primary Code 1) to the second UE 2302.

As shown in FIG. 23, the second UE 2302 announces (e.g., broadcasts over-the-air) message 2314 that includes Primary Code 1. The first UE 2301 receives the message 2314 and determines that the Primary Code 1 in message 2314 is of interest to the first UE 2301. For example, the first UE 2301 may make the determination based on one or more criteria configured by a user of the first UE 2301. The first UE 2301 sends a Match Report message 2318 that includes the Primary Code 1 to the ProSe Function/ENS 2304. The ProSe Function/ENS 2304 matches the Primary Code 1 to the ProSe Application Name and the Metadata 1. The ProSe Function/ENS 2104 then sends a message 2320 that includes the ProSe Application Name and Metadata 1. The first UE 2301 receives the message 2320 and determines the stationary location (e.g., "Loc 1") of the second UE 2302 based on Metadata 1. As shown in FIG. 23, the second UE 2302 may no longer remain stationary and may begin moving 2316 to a second location (e.g., "Loc 2"). The second UE 2302 may determine the location (e.g., "Loc 2") of the second UE 2302 when the second UE 2302 has moved from the stationary location (e.g., "Loc 1"). For example, the second UE 2302 may determine the location of second UE 2302 by receiving GPS data from a satellite or by receiving location information from a network.

In an aspect, when the second UE 2302 has started moving 2316, the second UE 2302 may transmit a message 2334 that includes a secondary expression code (e.g., Secondary Code 1). For example, the secondary expression code may be a sequence of bits suitable for an over-the-air transmission (e.g., broadcast) to one or more monitoring UEs. The secondary expression code may further enable a monitoring UE (e.g., the first UE 2301) to determine the current location of the second UE 2302 when the second UE 2302 has started moving 2316. In an aspect, the secondary expression code may have two components. For example, the first component may be information (also referred to as a "dependent code") that links the secondary expression code to a primary expression code (e.g., Primary Code 1 or Primary Code 2 in FIG. 23), and the second component may include information representing the current location (e.g., "Loc 2") of the moving second UE 2302. In an aspect, the second UE 2302 may acquire the dependent code by sending a PAI to the ProSe Function/ENS 2304. In such aspect, the ProSe Function/ENS 2034 may generate and assign the dependent code using the PAI, and may send the dependent code to the second UE 2302. In another aspect, the dependent code may be the output of a private expression code passed through a hash function. In another aspect, the second UE 2302 may acquire the dependent code by sending a private expression name (e.g., Restricted ProSe Application User ID) to the ProSe Function/ENS 2304. In such aspect, the ProSe Function/ENS 2304 may generate and assign the dependent code using the private expression name, and may send the dependent code to the second UE 2302. In another aspect, the second UE 2302 may request the dependent code from the ProSe Function/ENS 2034 and may receive the dependent code from the ProSe Function/ENS 2034 in response to the request. Therefore, it should be understood that the dependent code may be generated independently by the second UE 2302 or acquired via communication with a network device, such as a ProSe Function (e.g., ProSe Function/ENS 2304) or other application server (e.g., third-party social network).

The second UE 2302 may communicate the dependent code to a monitoring UE (e.g., the first UE 2301) in different ways. In one aspect, with reference to FIG. 23, the second UE 2302 may include the dependent code in Metadata 1 that is sent in Announce Request message 2310. In such aspect, the first UE 2301 receives Metadata 1 in the message 2320 and determines the dependent code using Metadata 1. The first UE 2301 then uses the dependent code to identify and/or to decode the Secondary Code 1 in message 2334. In an aspect, the second UE 2302 may transmit a primary expression code (e.g., Primary Code 1 or Primary Code 2) when the second UE 2302 has started moving and may set a flag in the primary expression code that indicates to a monitoring UE (e.g., first UE 2301) that the second UE 2302 has started moving. Upon detecting Primary Code 2 or the flag in the Primary Code 1 or Primary Code 2, the first UE 2301 may monitor for a secondary expression code (e.g., Secondary Code 1) using the dependent code acquired previously in order to determine the current location of the moving second UE 2302.

In another aspect, the second UE 2302 may communicate the dependent code to a monitoring UE (e.g., the first UE 2301) by including the dependent code in the bits of a primary expression code (e.g., Primary Code 1, 2, and/or 3 in FIG. 23). In such aspect, the first UE 2301 may use the dependent code to identify and/or decode any secondary expression codes that include the current location of the moving second UE 2302.

In another aspect, the second UE 2302 may generate the dependent code based on the bits of a primary expression code. For example, the second UE 2302 may apply a hash function to the bits of a primary expression code (e.g., Primary Code 1), where the output of the hash function represents the dependent code. In such example, a monitoring UE (e.g., the first UE 2301) may receive the bits of the primary expression code and may apply the same hash function on the bits of the primary expression code to determine the dependent code.

In another aspect, with reference to FIG. 23, the second UE 2302 may send an update message 2322 that includes the ProSe Application Name (e.g., Expr1) and updated metadata (e.g., Metadata 2), where the updated metadata includes the dependent code. In such aspect, the ProSe Function/ENS 2304 may store Metadata 2 in a memory and may configure the ProSe Application Name (e.g., Expr1) and the Metadata 2 (or information associated with the Metadata 2, such as a metadata ID) into a second primary expression code (e.g., Primary Code 2). As shown in FIG. 23, the ProSe Function/ENS 2304 may send a message 2324 that includes the second primary expression code (e.g., Primary Code 2) to the second UE 2302. As further shown in FIG. 23, the second UE 2302 announces (e.g., broadcasts over-the-air) message 2326 that includes a Primary Code 2.

As shown in FIG. 23, the first UE 2301 receives the message 2326 and determines that the Primary Code 2 in message 2326 is of interest to the first UE 2301. For example, the first UE 2301 may make the determination based on one or more criteria configured by a user of the first UE 2301. As shown in FIG. 23, in one aspect, the first UE 2301 may send a Match Report message 2330 that includes the Primary Code 2 to the ProSe Function/ENS 2304. The ProSe Function/ENS 2304 may match the Primary Code 2 to the ProSe Application Name (e.g., Expr1) and the updated metadata (e.g., Metadata 2). The ProSe Function/ENS 2104 may send a message 2332 that includes the ProSe Application Name and Metadata 2. The first UE 2301 may receive Metadata 2 via message 2332 and may determine the dependent code included in Metadata 2. The first UE 2301 may use the dependent code to identify and/or to decode Secondary Code 1 in message 2334 in order to determine the current location (e.g., "Loc 2") of the moving second UE 2302 included in the Secondary Code 1.

With respect to the aspects described supra, after the second UE 2302 acquires location information indicating the current location (e.g., "Loc 2") of the second UE 2302 and further acquires the dependent code, the second UE 2302 may compress the location information to generate the second component of the secondary expression code (e.g., Secondary Code 1). Therefore, after acquiring the first and second components of the secondary expression code, the second UE 2302 may generate the secondary expression code without additional communication with a network device (e.g., ProSe Function/ENS 2304). In an aspect, the second UE 2302 may compress the location information using a modem or other hardware of the second UE 2302 in order to reduce power consumption in the second UE 2302. In other aspects, if the second UE 2302 is not power constrained, the second UE 2302 may communicate with a network device (e.g., ProSe Function/ENS 2304 or a location server) to obtain new location information from the network device.

With further respect to the aspects described supra, after the first UE 2301 receives the secondary expression code (e.g., Secondary Code 1), the first UE 2301 may determine the location information from the secondary expression code. For example, the first UE 2301 may extract location information (e.g., compressed data bits) representing the current location of the second UE 2302 from the second component of the secondary expression code. The first UE 2301 may then decode the location information to determine the current location of the second UE 2302. Such extraction and decoding of the location information may be performed by the first UE 2301 using a modem or other hardware of the first UE 2301. Therefore, the first UE 2301 may extract and decode the location information to determine the current location of the second UE 2302 without additional communication with a network device (e.g., ProSe Function/ENS 2304). In other aspects, if the first UE 2301 is not power constrained, the first UE 2301 may provide the location information extracted from the secondary expression code to a network device (e.g., ProSe Function/ENS 2304 or location server), which may decode the location information and provide the decoded location information to the first UE 2301.

As shown in FIG. 23, the second UE 2302 remains stationary 2336 at a third location (e.g., "Loc 3"). The second UE 2302 may determine the location of second UE 2302 and may send an update message 2338 that includes a ProSe Application Name (e.g., Expr1) and updated metadata (e.g., Metadata 3) associated with the ProSe Application Name. In an aspect, Metadata 3 may include the stationary location information (e.g., "Loc 3") of the second UE 2302. For example, the stationary location information may be geographic coordinates (e.g., GPS coordinates or GPS data) indicating the location of the stationary second UE 2302. The ProSe Function/ENS 2304 receives the update message 2338 and may configure the ProSe Application Name (e.g., Expr1) and Metadata 3 (or information associated with the Metadata 3, such as a metadata ID) into a third primary expression code (e.g., Primary Code 3). For example, the third primary expression code may be a sequence of bits suitable for an over-the-air transmission and may be configured to enable one or more monitoring UEs (e.g., first UE 2301) to determine whether the announcement from the second UE 2302 is of interest to the one or more monitoring UEs. As shown in FIG. 23, the ProSe Function/ENS 2304 sends a message 2340 that includes the third primary expression code (e.g., Primary Code 3) to the second UE 2302.

As shown in FIG. 23, the second UE 2302 announces (e.g., broadcasts over-the-air) message 2342 that includes Primary Code 3. The first UE 2301 receives the message 2342 and determines that the Primary Code 3 in message 2342 is of interest to the first UE 2301. For example, the first UE 2301 may make the determination based on one or more criteria configured by a user of the first UE 2301. The first UE 2301 sends a Match Report message 2344 that includes the Primary Code 3 to the ProSe Function/ENS 2304. The ProSe Function/ENS 2304 matches the Primary Code 3 to the ProSe Application Name and the Metadata 3. The ProSe Function/ENS 2104 then sends a message 2346 that includes the ProSe Application Name and Metadata 3. The first UE 2301 receives the message 2346 and determines the stationary location (e.g., "Loc 3") of the second UE 2302 based on Metadata 3.

Figure 24:
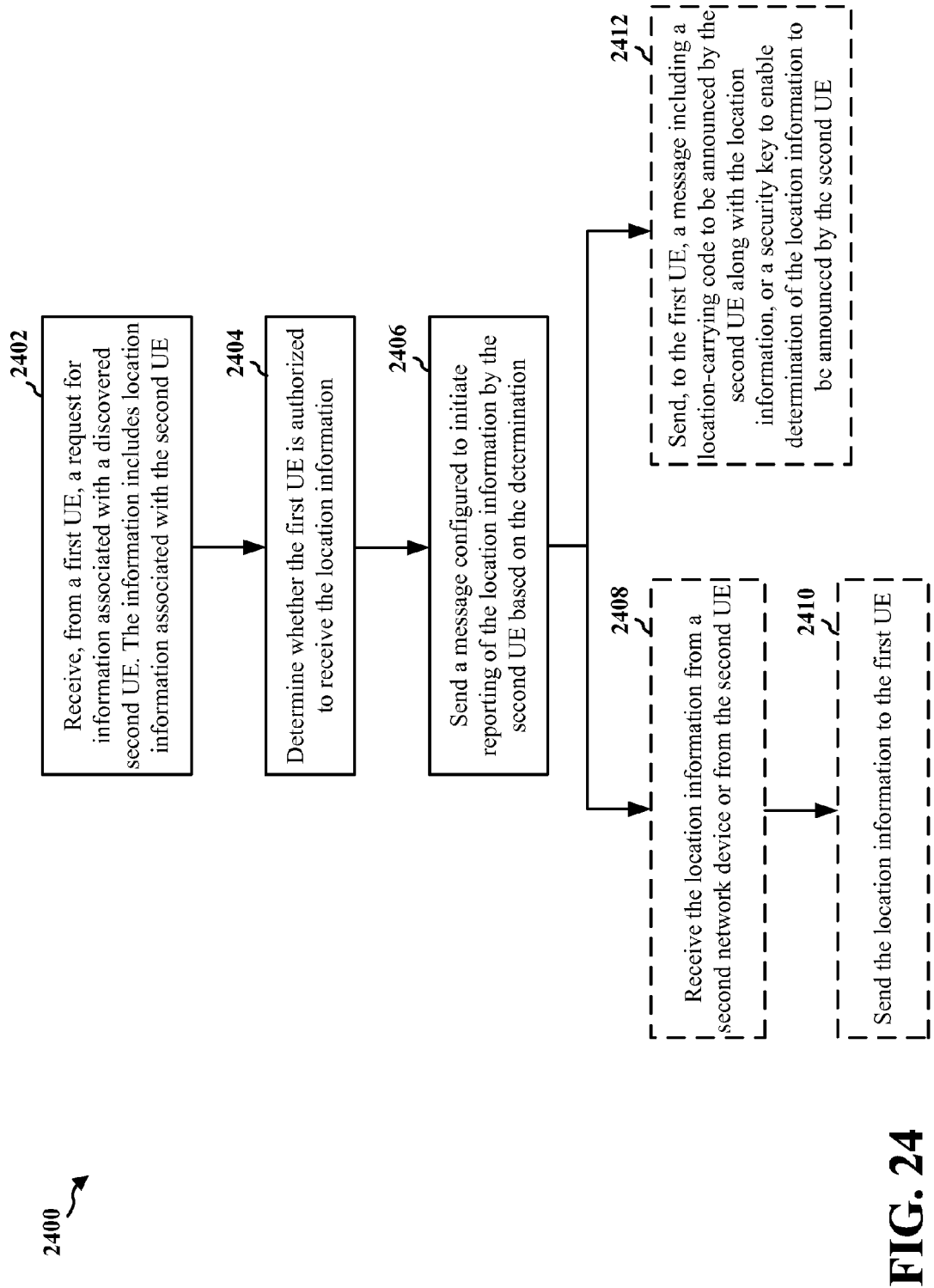
FIG. 24 is a flow chart of a method of communication.

FIG. 24 is a flow chart 2400 of a method of communication. The method may be performed by a network device (e.g., the ProSe Function 1012, 1112, 1212, the apparatus 3002/3002'). It should be understood that the operations represented with dotted lines in FIG. 24 represent optional operations.

At operation 2402, the network device receives, from a first UE, a request for information associated with a discovered second UE. The information includes location information associated with the second UE. For example, with reference to FIG. 10, the ProSe Function 1012 receives message 1016 from UE_B 1004 including a request for location information associated with UE_A 1002. In an aspect, the request for the location information is received in a match report message from the first UE.

At operation 2404, the network device determines whether the first UE is authorized to receive the location information.

At operation 2406, the network device sends a message configured to initiate reporting of the location information by the second UE based on the determination. For example, with reference to FIG. 10, the ProSe Function 1012 initiates the reporting by sending a request 1018 to the location server 1014 for the requested location information. In an aspect, the location server 1014 may send a message 1020 to the UE_A 1002 using LTE protocols requesting the location information. As another example, with reference to FIG. 11, the ProSe Function 1112 initiates the reporting by sending a message 1116 to the UE_A 1102 using LTE protocols requesting the UE_A 1102 to update its metadata with current location information.

At operation 2408, the network device receives the location information from a second network device or from the second UE. In an aspect, the location information received from the second UE is included in metadata associated with the second UE.

At operation 2410, the network device sends the location information to the first UE. In an aspect, the location information is sent to the first UE in a match report acknowledgment message.

Finally, at operation 2412, the network device sends, to the first UE, a message including a location-carrying code to be announced by the second UE along with the location information, or a security key to enable determination of the location information to be announced by the second UE. For example, if the location information announced by the second UE is encrypted using the security key, the security key may be used to decrypt the encrypted location information announced by the second UE. As another example, the security key may be used to perform the inverse of the cryptographic function applied to the location information announced by the second UE to enable determination of the location information.

Figure 25:
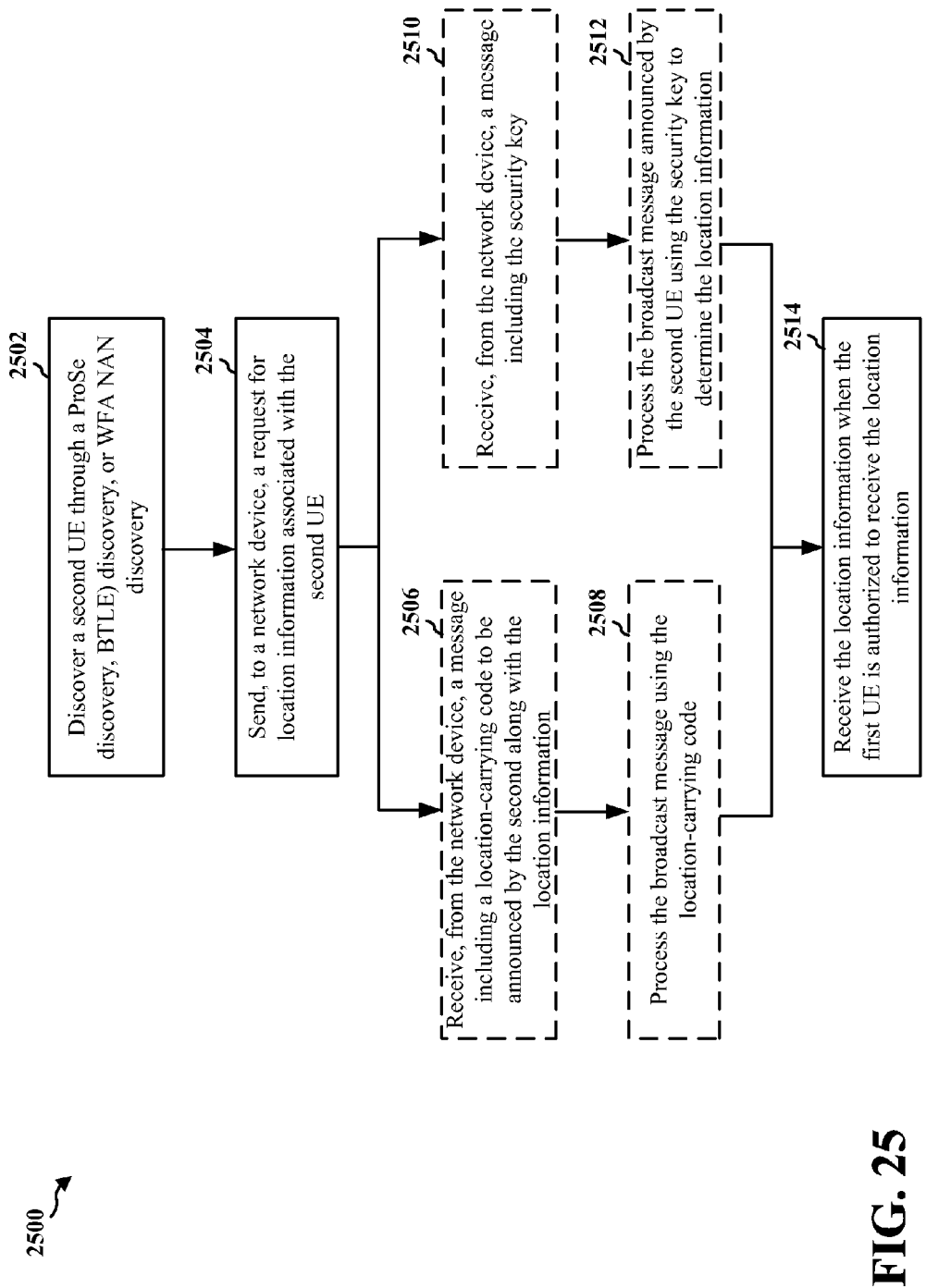
FIG. 25 is a flow chart of a method of wireless communication

FIG. 25 is a flow chart 2500 of a method of wireless communication. The method may be performed by a first UE (e.g., UE_B 1004, 1104, 1204, the apparatus 3202/3202'). It should be understood that the operations represented with dotted lines in FIG. 25 represent optional operations.

At operation 2502, the UE discovers a second UE through a ProSe discovery, BTLE discovery, or WFA NAN discovery.

At operation 2504, the UE sends, to a network device, a request for location information associated with the second UE. In an aspect, the request for the location information is sent to the network device in a match report message. In an aspect, the network device is a ProSe server configured to support ProSe Functions.

At operation 2506, the UE receives, from the network device, a message including a location-carrying code to be announced by the second UE along with the location information. In an aspect, the location information is received from the second UE in a broadcast message.

At operation 2508, the UE processes the broadcast message using the location-carrying code to obtain the location information.

At operation 2510, the UE receives, from the network device, a message including the security key to enable determination of the location information to be announced by the second UE.

At operation 2512, the UE processes the broadcast message using the security key. For example, if the location information announced by the second UE is encrypted using the security key, the UE may use the security key to decrypt the encrypted location information announced by the second UE. As another example, the UE may use the security key to perform the inverse of the cryptographic function applied to the location information announced by the second UE to determine the location information.

At operation 2514, the UE receives the location information when the UE is authorized to receive the location information. In an aspect, the location information is received from the network device in a match report acknowledgment message.

Figure 26:
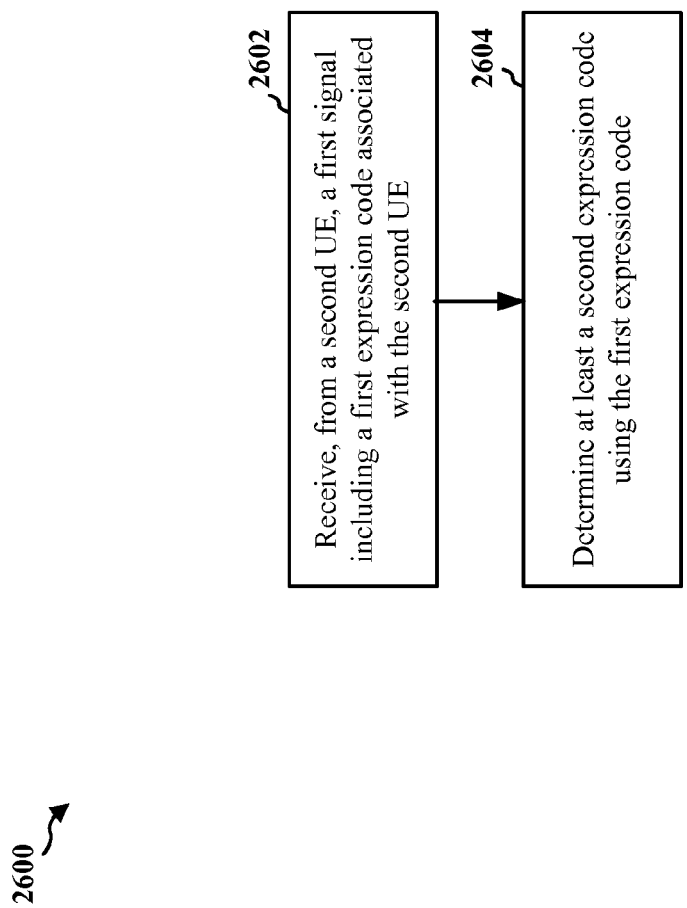
FIG. 26 is a flow chart of a method of wireless communication.

FIG. 26 is a flow chart 2600 of a method of wireless communication. The method may be performed by a first UE (e.g., UE_B 1004, 1104, 1204, the apparatus 3202/3202').

At operation 2602, the first UE receives, from a second UE, a first signal including a first expression code associated with the second UE.

At operation 2604, the first UE determines at least a second expression code using the first expression code, the at least a second expression code associated with the second UE. In an aspect, the first UE determines the at least a second expression code by receiving, from the second UE, a second signal including a first prefix and the at least a second expression code, applying a function to the first expression code to generate a second prefix, comparing the second prefix to the first prefix, determining the at least a second expression code in the second signal when the second prefix matches the first prefix. In an aspect, the first UE determines the at least a second expression code by sending the first expression code to a network device, and receiving the at least a second expression code associated with the second UE from the network device. For example, with reference to FIG. 18A, the first expression code may be code 1 1808, the first prefix may be prefix 1812, and the second expression code may be code 2 1814. In an aspect, the first signal including the first expression code is received in a first discovery resource and the second signal including the at least a second expression code is received in a second discovery resource, wherein the first discovery resource is independent of the second discovery resource. In an aspect, the function is a hash function. In an aspect, the first expression code is sent to the network device in a match report message. In an aspect, the network device is a ProSe Function. In an aspect, the first expression code or the at least a second expression code corresponds to a service of the second UE or an application of the second UE.

Figure 27:
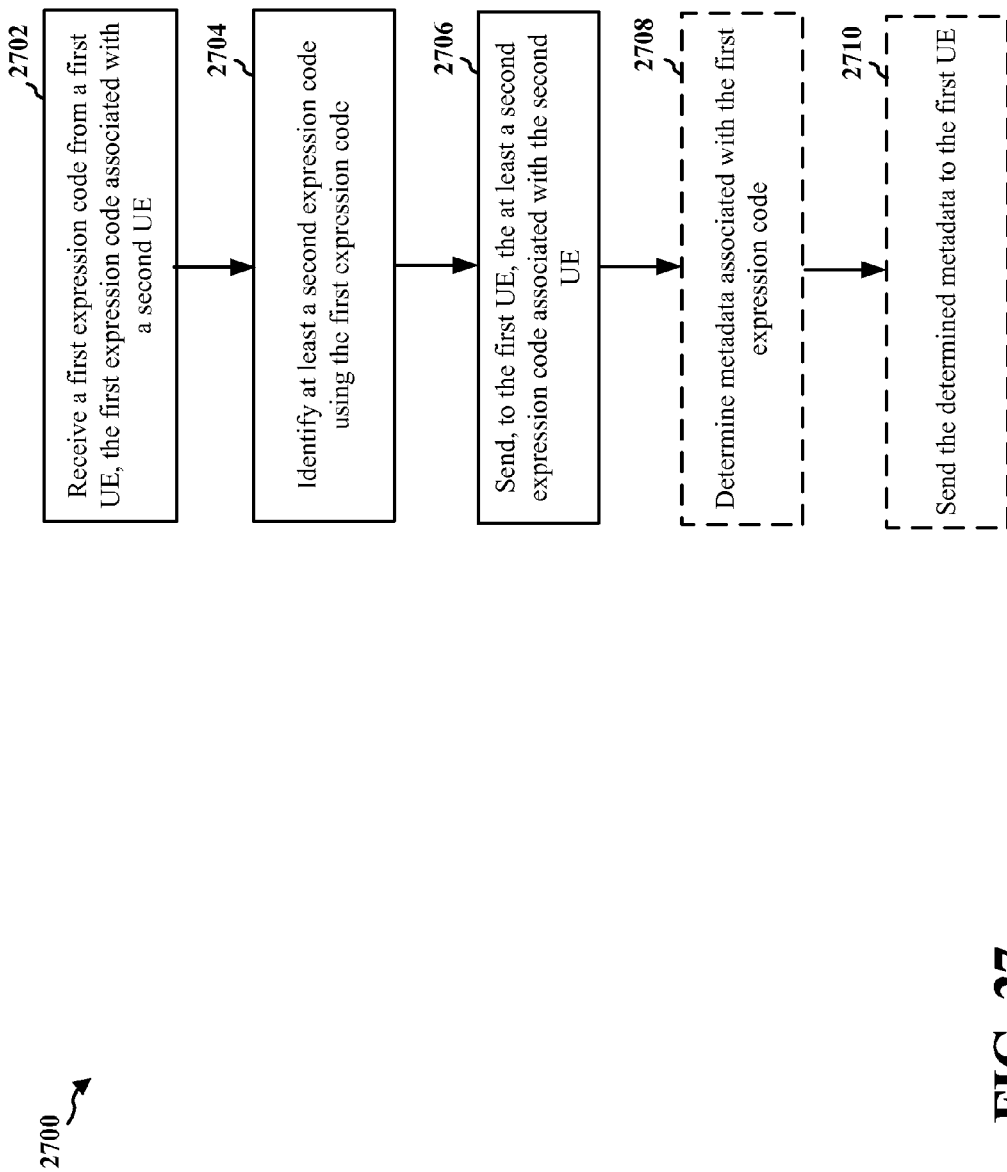
FIG. 27 is a flow chart of a method of wireless communication.

FIG. 27 is a flow chart 2700 of a method of wireless communication. The method may be performed by a network device (e.g., the ProSe Functions 1012, 1112, 1212, the apparatus 3002/3002'). It should be understood that the operations represented with dotted lines in FIG. 27 represent optional operations.

At operation 2702, the network device receives a first expression code from a first UE, the first expression code associated with a second UE. In an aspect, the network device is a ProSe Function. In an aspect, the first expression code is received in a match report message from the first UE.

At operation 2704, the network device identifies at least a second expression code using the first expression code, the at least a second expression code associated with the second UE.

At operation 2706, the network device sends, to the first UE, the at least a second expression code associated with the second UE.

At operation 2708, the network device determines metadata associated with the first expression code.

At operation 2710, the network device sends the determined metadata to the first UE.

Figure 28:
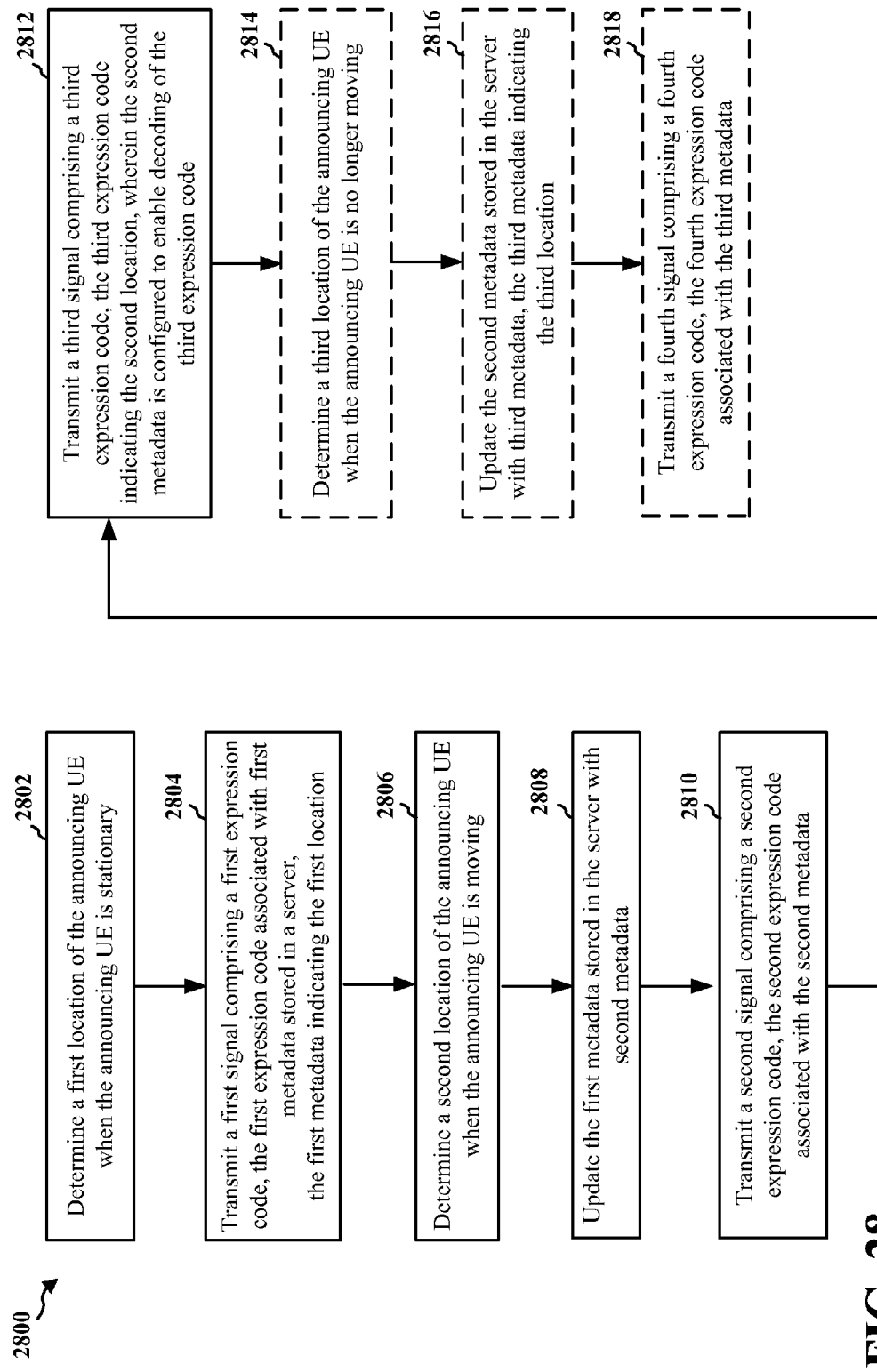
FIG. 28 is a flow chart of a method of wireless communication.

FIG. 28 is a flow chart 2800 of a method of wireless communication. The method may be performed by an announcing UE (e.g., second UE 1702, second UE 1802, second UE 1902, second UE 2202, second UE 2302, the apparatus 3402/3402'). It should be understood that the operations represented with dotted lines in FIG. 28 represent optional operations.

At operation 2802, the announcing UE determines a first location of the announcing UE when the announcing UE is stationary.

At operation 2804, the announcing UE transmits a first signal including a first expression code, the first expression code associated with first metadata stored in a server, the first metadata indicating the first location. For example, with reference to FIG. 23, the second UE 2302 may transmit message 2314 that includes Primary Code 1.

At operation 2806, the announcing UE determines a second location of the announcing UE when the announcing UE is moving.

At operation 2808, the announcing UE updates the first metadata stored in the server with second metadata. For example, with reference to FIG. 23, the second UE 2302 may send update message 2322 that includes updated metadata (e.g., Metadata 2).

At operation 2810, the announcing UE transmits a second signal including a second expression code, the second expression code associated with the second metadata. For example, with reference to FIG. 23, the second UE 2302 may transmit message 2326 that includes Primary Code 2.

At operation 2812, the announcing UE transmits a third signal including a third expression code, the third expression code indicating the second location, wherein the second metadata is configured to enable decoding of the third expression code. For example, with reference to FIG. 23, the second UE 2302 may transmit a message (e.g., message 2334) that includes Secondary Code 1.

At operation 2814, the announcing UE determines a third location of the announcing UE when the announcing UE is no longer moving.

At operation 2816, the announcing UE updates the second metadata stored in the server with third metadata, the third metadata indicating the third location. For example, with reference to FIG. 23, the second UE 2302 may transmit update message 2338 that includes updated metadata (e.g., Metadata 3).

At operation 2818, the announcing UE transmits a fourth signal including a fourth expression code, the fourth expression code associated with the third metadata. For example, with reference to FIG. 23, the second UE 2302 may transmit message 2342 that includes Primary Code 3.

Figure 29:
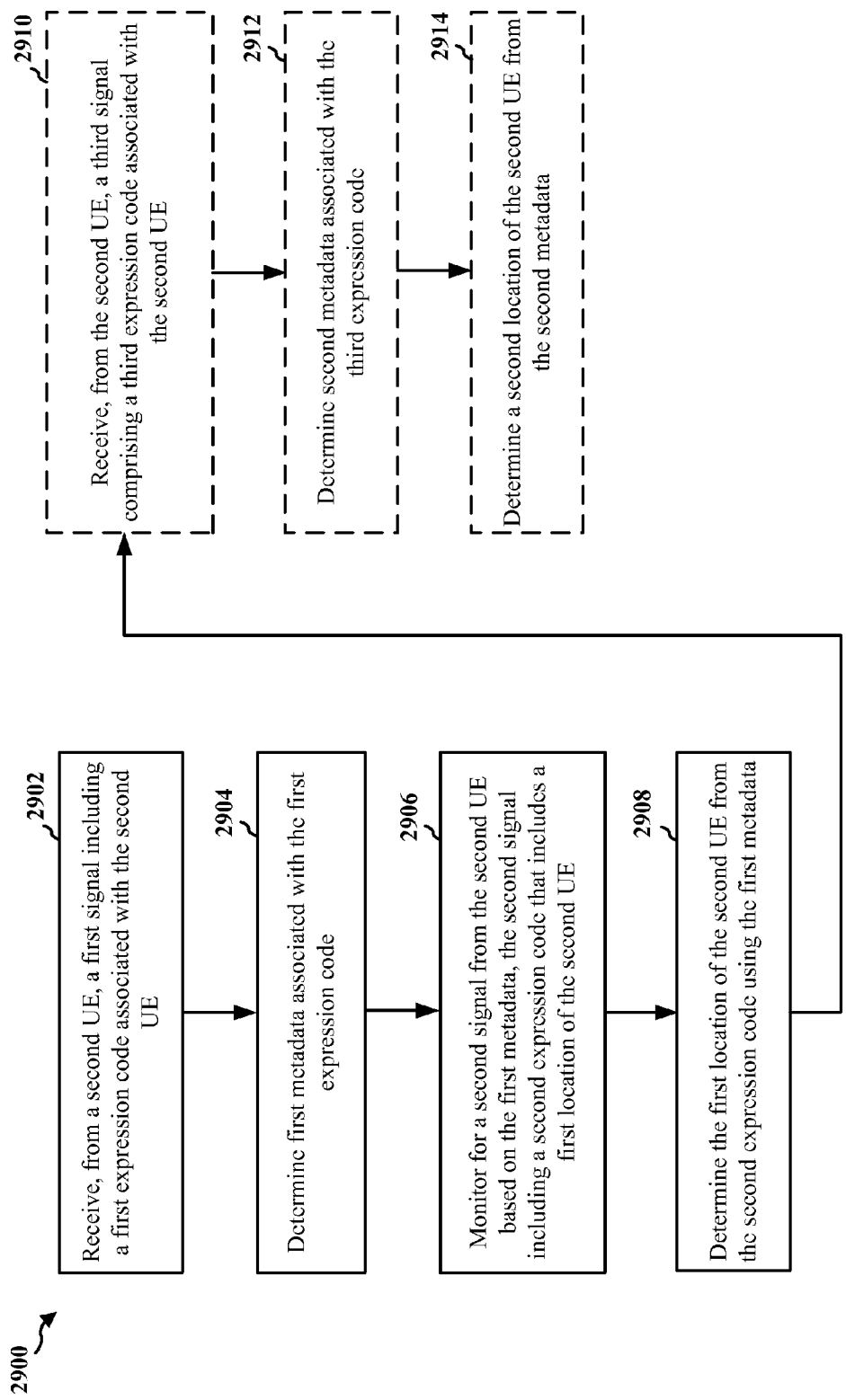
FIG. 29 is a flow chart of a method of wireless communication.

FIG. 29 is a flow chart 2900 of a method of wireless communication. The method may be performed by a first UE (e.g., first UE 1704, first UE 1804, first UE 1904, first UE 2201, first UE 2301, the apparatus 3202/3202'). It should be understood that the operations represented with dotted lines in FIG. 29 represent optional operations.

At operation 2902, the first UE receives, from a second UE, a first signal including a first expression code associated with the second UE. For example, with reference to FIG. 23, the first UE 2301 may receive a message 2326 that includes Primary Code 2.

At operation 2904, the first UE determines first metadata associated with the first expression code. For example, with reference to FIG. 23, the first UE 2301 may determine Metadata 2 by performing a match report operation based on Primary Code 2.

At operation 2906, the first UE monitors for a second signal from the second UE based on the first metadata, the second signal including a second expression code that includes a first location of the second UE. For example, with reference to FIG. 23, the first UE 2301 may monitor for the Secondary Code 1 in message 2334 based on information included in Metadata 2.

At operation 2908, the first UE determines the first location of the second UE from the second expression code using the first metadata. For example, with reference to FIG. 23, the first UE 2301 may decode Secondary Code 1 using Metadata 2 to determine geographic coordinates included in Secondary Code 1.

At operation 2910, the first UE receives, from the second UE, a third signal including a third expression code associated with the second UE. For example, with reference to FIG. 23, the first UE 2301 may receive a message that includes Primary Code 3.

At operation 2912, the first UE determines second metadata associated with the third expression code. For example, with reference to FIG. 23, the first UE 2301 determine Metadata 3 by performing a match report operation based on Primary Code 3.

At operation 2914, the first UE determines a second location of the second UE from the third expression code. For example, with reference to FIG. 23, the first UE 2301 may determine geographic coordinates included in Metadata 3.

Figure 30:
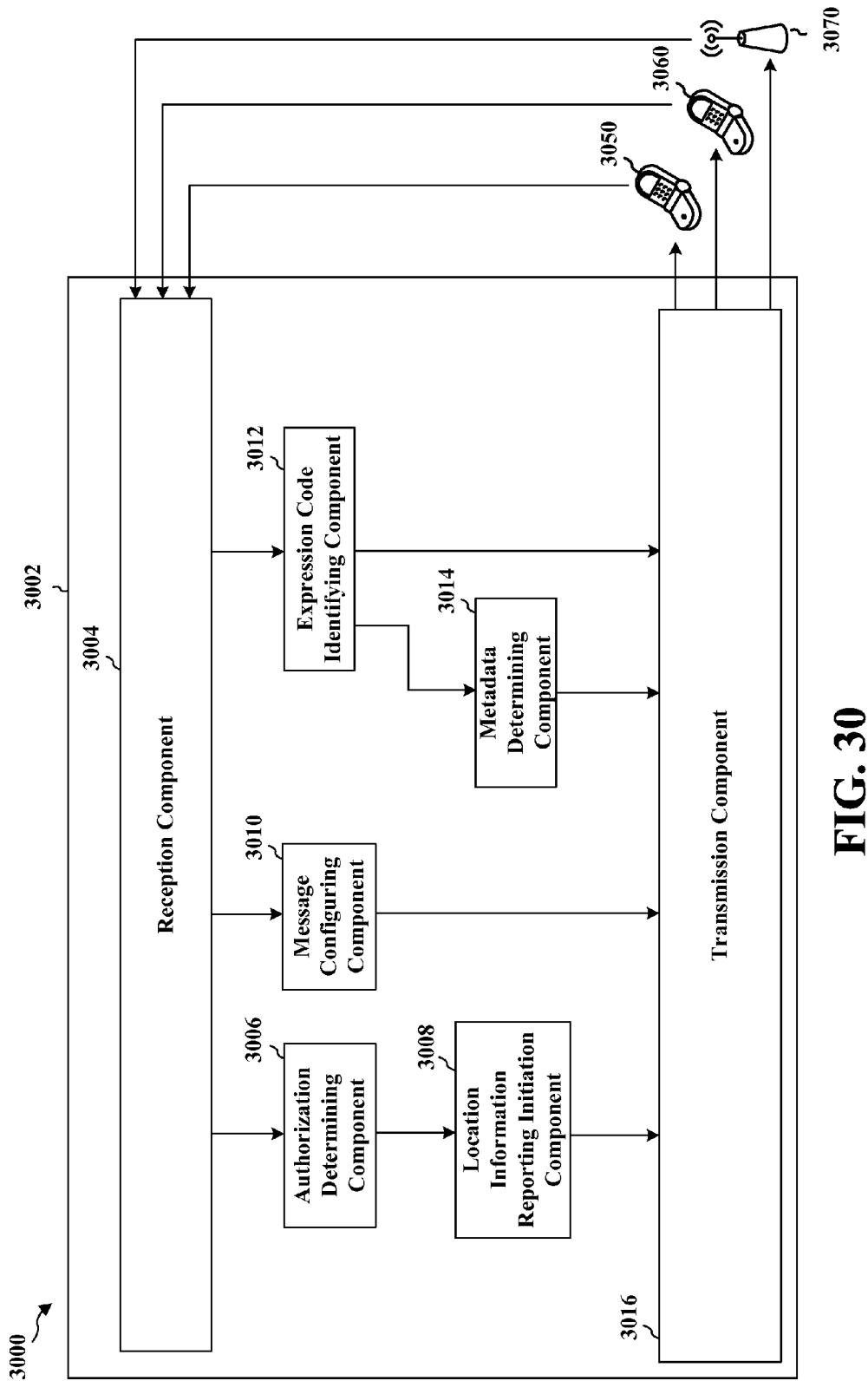
FIG. 30 is a conceptual data flow diagram illustrating the data flow between different modules/means/components in an exemplary apparatus.

FIG. 30 is a conceptual data flow diagram 3000 illustrating the data flow between different modules/means/components in an exemplary apparatus 3002. The apparatus may be a network device (e.g., ProSe Function 1012, 1112, 1212, ProSe Function/ENS 2004, 2104). The apparatus includes a reception component 3004 that receives, from a second UE (e.g., second UE 3060), a message including metadata. The reception component 3004 further receives a metadata update message from the second UE, the metadata update message including updated metadata. The reception component 3004 further receives, from a first UE (e.g., first UE 3050), a request for information associated with a discovered second UE (e.g., second UE 3060), the information including location information associated with the second UE. The reception component 3004 further receives the location information from a second network device (e.g., location server 3070) or from the second UE. The reception component 3004 further receives a first expression code from a first UE, the first expression code associated with a second UE. The apparatus includes authorization determining component 3006 that determines whether the first UE is authorized to receive the location information. The apparatus includes a location information reporting initiation component 3008 that sends (via transmission component 3016) a message configured to initiate reporting of the location information by the second UE based on the determination and sends the location information to the first UE. The apparatus further includes a message configuring component 3010 that sends (via transmission component 3016), to the first UE, a message including a location-carrying code to be announced by the second UE along with the location information, or a security key to enable determination of the location information to be announced by the second UE. The apparatus further includes an expression code identifying component 3012 that identifies at least a second expression code using the first expression code, the at least a second expression code associated with the second UE. The apparatus further includes metadata determining component 3014 that determines metadata associated with the first expression code. The apparatus further includes transmission component 3016 that sends, to the first UE, the at least a second expression code associated with the second UE. The transmission component 3016 further sends the determined metadata to the first UE.

The apparatus may include additional components that perform each of the operations of the algorithm in the aforementioned flow charts of FIGS. 24 and 27. As such, each operation in the aforementioned flow charts of FIGS. 24 and 27 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 31:
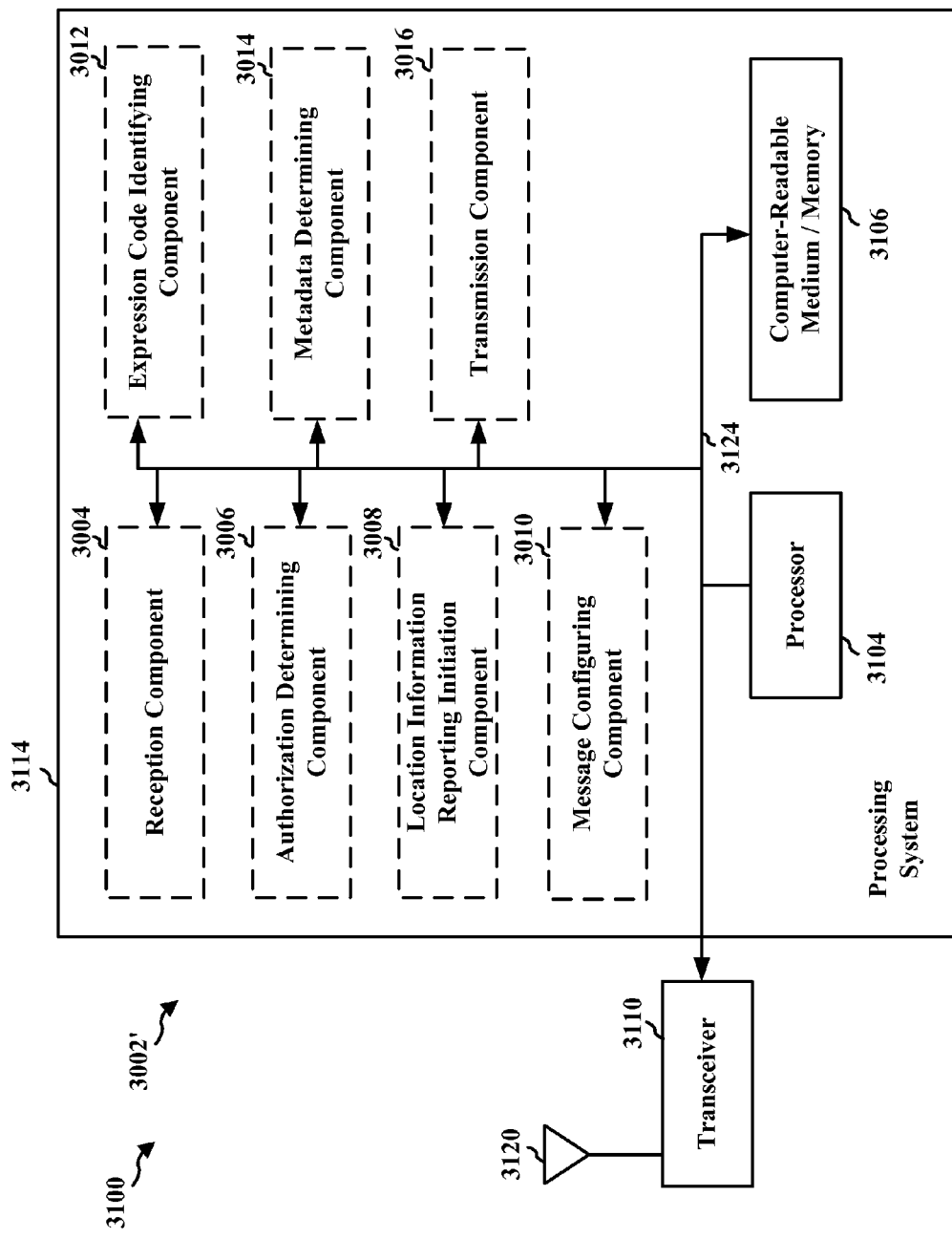
FIG. 31 is a diagram illustrating an example of a hardware implementation for an apparatus employing a processing system.

FIG. 31 is a diagram 3100 illustrating an example of a hardware implementation for an apparatus 3002' employing a processing system 3114. The processing system 3114 may be implemented with a bus architecture, represented generally by the bus 3124. The bus 3124 may include any number of interconnecting buses and bridges depending on the specific application of the processing system 3114 and the overall design constraints. The bus 3124 links together various circuits including one or more processors and/or hardware components, represented by the processor 3104, the components 3004, 3006, 3008, 3010, 3012, 3014, and 3016, and the computer-readable medium/memory 3106. The bus 3124 may also link various other circuits such as timing sources, peripherals, voltage regulators, and power management circuits, which are well known in the art, and therefore, will not be described any further.

The processing system 3114 may be coupled to a transceiver 3110. The transceiver 3110 is coupled to one or more antennas 3120. The transceiver 3110 provides a means for communicating with various other apparatus over a transmission medium. The transceiver 3110 receives a signal from the one or more antennas 3120, extracts information from the received signal, and provides the extracted information to the processing system 3114, specifically the reception component 3004. In addition, the transceiver 3110 receives information from the processing system 3114, specifically the transmission component 3016, and based on the received information, generates a signal to be applied to the one or more antennas 3120. The processing system 3114 includes a processor 3104 coupled to a computer-readable medium/memory 3106. The processor 3104 is responsible for general processing, including the execution of software stored on the computer-readable medium/memory 3106. The software, when executed by the processor 3104, causes the processing system 3114 to perform the various functions described supra for any particular apparatus. The computer-readable medium/memory 3106 may also be used for storing data that is manipulated by the processor 3104 when executing software. The processing system further includes at least one of the components 3004, 3006, 3008, 3010, 3012, 3014, and 3016. The components may be software components running in the processor 3104, resident/stored in the computer-readable medium/memory 3106, one or more hardware components coupled to the processor 3104, or some combination thereof. The processing system 3114 may be a component of the eNB 610 and may include the memory 676 and/or at least one of the TX processor 616, the RX processor 670, and the controller/processor 675.

In one configuration, the apparatus 3002/3002' for wireless communication includes means for receiving a first expression code from a first UE, the first expression code associated with a second UE, means for identifying at least a second expression code using the first expression code, the at least a second expression code associated with the second UE, means for sending, to the first UE, the at least a second expression code associated with the second UE, means for receiving, from a first UE, a request for location information associated with a second UE, means for determining whether the first UE is authorized to receive the location information, means for sending a message configured to initiate reporting of the location information by the second UE based on the determination, means for receiving the location information from a second network device or from the second UE, means for sending the location information to the first UE, means for sending, to the first UE, a message including a location-carrying code to be announced by the second UE along with the location information, or a security key to enable deciphering of the location information to be announced by the second UE, means for determining metadata associated with the first expression code, and means for sending the determined metadata to the first UE. The aforementioned means may be one or more of the aforementioned components of the apparatus 3002 and/or the processing system 3114 of the apparatus 3002' configured to perform the functions recited by the aforementioned means. As described supra, the processing system 3114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 32:
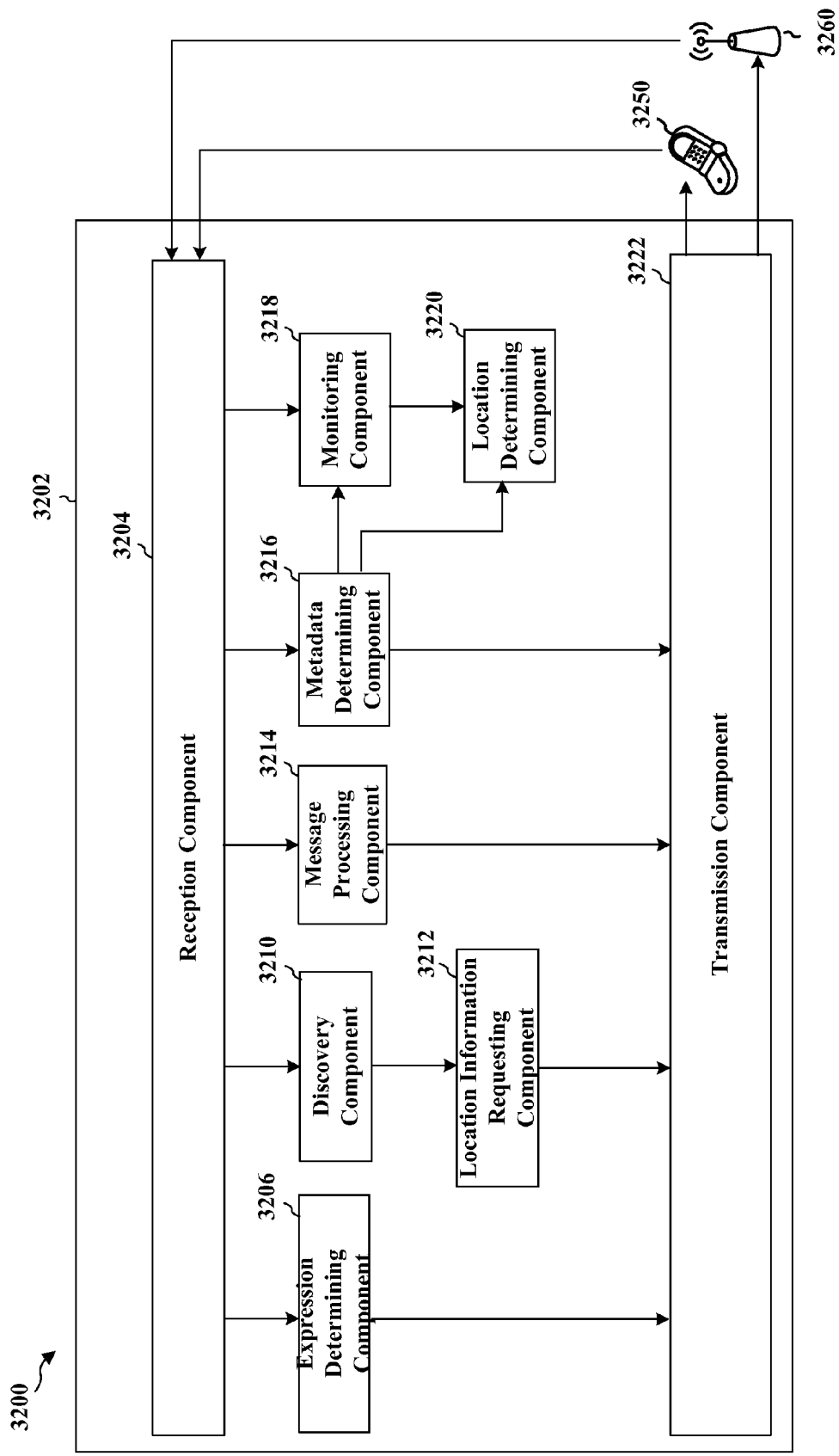
FIG. 32 is a conceptual data flow diagram illustrating the data flow between different modules/means/components in an exemplary apparatus.

FIG. 32 is a conceptual data flow diagram 3200 illustrating the data flow between different modules/means/components in an exemplary apparatus 3202. The apparatus may be a first UE (e.g., UE_B 1004, 1104, 1204, 2106, 2301). The apparatus includes reception component 3204 that receives, from a network device (e.g., ProSe Function 3260), a message including a location-carrying code to be announced by a second UE (e.g., second UE 3250) along with the location information. The reception component 3204 further receives, from the network device, a message including a security key to enable determination of the location information to be announced by the second UE. The reception component 3204 further receives the location information when authorized to receive the location information. The reception component 3204 further receives, from a second UE, a first signal including a first expression code associated with the second UE. The reception component 3204 further receives, from a second UE, a first signal including a first expression code associated with the second UE. The reception component 3204 further receives, from the second UE, a third signal including a third expression code associated with the second UE. The apparatus further includes an expression determining component 3206 that determines at least a second expression code using the first expression code, the at least a second expression code associated with the second UE. The apparatus further includes a discovery component 3210 that discovers the second UE through a ProSe discovery, BTLE discovery, or WFA NAN discovery. The apparatus further includes a location information requesting component 3212 that sends (via transmission component 3222), to the network device, a request for location information associated with the second UE. The apparatus includes a message processing component 3214 that processes the broadcast message using the location-carrying code or using the security key. The apparatus further includes a metadata determining component 3216 that determines first metadata associated with the first expression code and determines second metadata associated with the third expression code. The apparatus further includes a monitoring component 3218 that monitors for a second signal from the second UE based on the first metadata, the second signal containing a second expression code that includes a first location of the second UE. The apparatus further includes a location determining component 3220 that determines the first location of the second UE from the second expression code using the first metadata and that determines a second location of the second UE from the second metadata.

The apparatus may include additional components that perform each of the operations of the algorithm in the aforementioned flow charts of FIGS. 25, 26, and 29. As such, each operation in the aforementioned flow charts of FIGS. 25, 26, and 29 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 33:
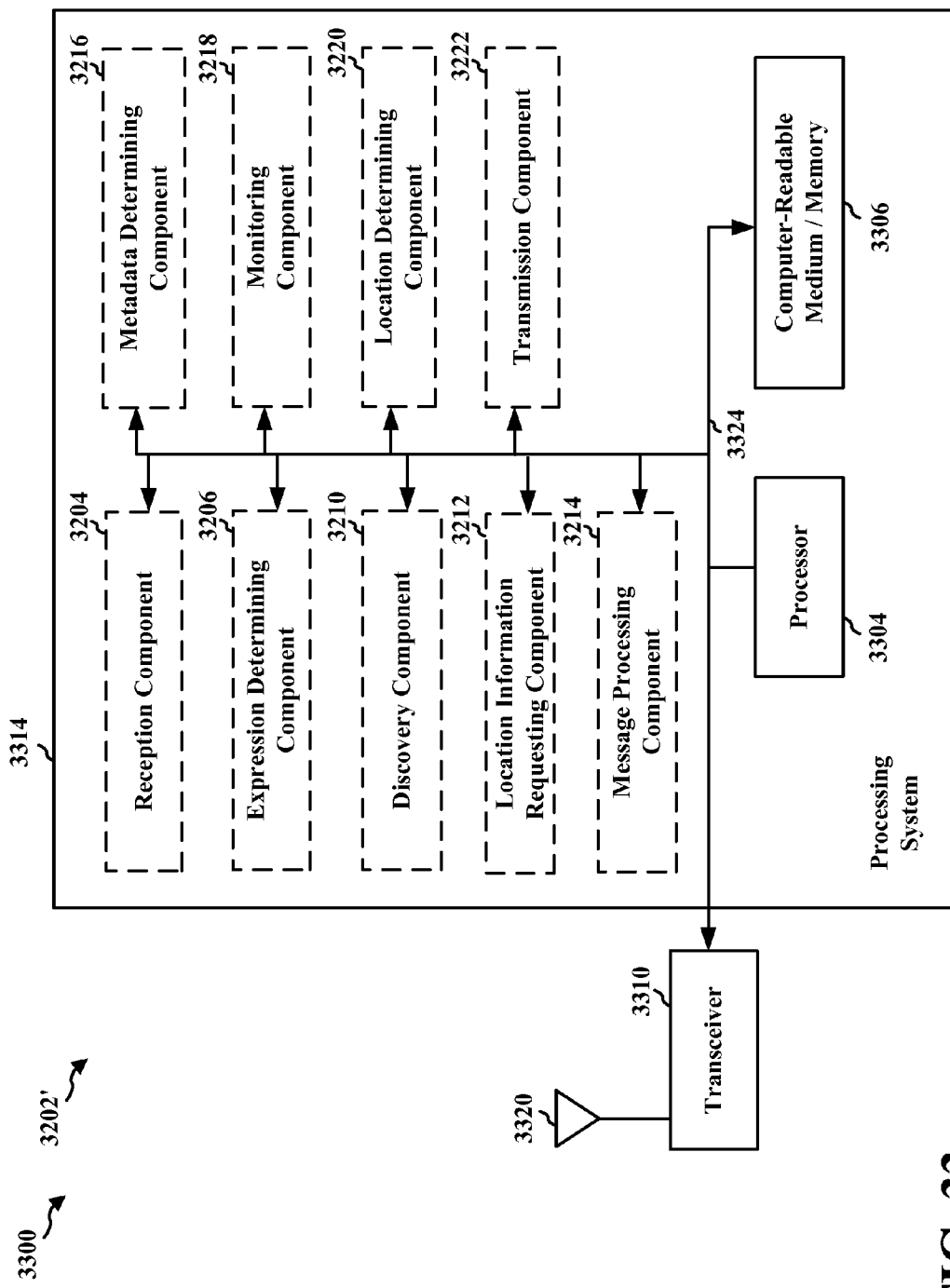
FIG. 33 is a diagram illustrating an example of a hardware implementation for an apparatus employing a processing system.

FIG. 33 is a diagram 3300 illustrating an example of a hardware implementation for an apparatus 3202' employing a processing system 3314. The processing system 3314 may be implemented with a bus architecture, represented generally by the bus 3324. The bus 3324 may include any number of interconnecting buses and bridges depending on the specific application of the processing system 3314 and the overall design constraints. The bus 3324 links together various circuits including one or more processors and/or hardware components, represented by the processor 3304, the components 3204, 3206, 3210, 3212, 3214, 3216, 3218, 3220, 3222, and the computer-readable medium/memory 3306. The bus 3324 may also link various other circuits such as timing sources, peripherals, voltage regulators, and power management circuits, which are well known in the art, and therefore, will not be described any further.

The processing system 3314 may be coupled to a transceiver 3310. The transceiver 3310 is coupled to one or more antennas 3320. The transceiver 3310 provides a means for communicating with various other apparatus over a transmission medium. The transceiver 3310 receives a signal from the one or more antennas 3320, extracts information from the received signal, and provides the extracted information to the processing system 3314, specifically the reception component 3204. In addition, the transceiver 3310 receives information from the processing system 3314, specifically the transmission component 3222, and based on the received information, generates a signal to be applied to the one or more antennas 3320. The processing system 3314 includes a processor 3304 coupled to a computer-readable medium/memory 3306. The processor 3304 is responsible for general processing, including the execution of software stored on the computer-readable medium/memory 3306. The software, when executed by the processor 3304, causes the processing system 3314 to perform the various functions described supra for any particular apparatus. The computer-readable medium/memory 3306 may also be used for storing data that is manipulated by the processor 3304 when executing software. The processing system further includes at least one of the components 3204, 3206, 3210, 3212, 3214, 3216, 3218, 3220, 3222. The components may be software components running in the processor 3304, resident/stored in the computer-readable medium/memory 3306, one or more hardware components coupled to the processor 3304, or some combination thereof. The processing system 3314 may be a component of the UE 650 and may include the memory 660 and/or at least one of the TX processor 668, the RX processor 656, and the controller/processor 659.

In one configuration, the apparatus 3202/3202' for wireless communication includes means for receiving, from a second UE, a first signal including a first expression code associated with the second UE, means for determining at least a second expression code using the first expression code, the at least a second expression code associated with the second UE, means for discovering a second UE through a ProSe discovery, BTLE discovery, or WFA NAN discovery, means for sending, to a network device, a request for location information associated with the second UE, means for receiving the location information when the first UE is authorized to receive the location information, means for receiving, from the network device, a message including a location-carrying code to be announced by the second UE along with the location information, means for processing the broadcast message using the location-carrying code, means for receiving, from the network device, a message including the security key to enable deciphering of the location information to be announced by the second UE, means for processing the broadcast message using the security key, means for receiving, from a second UE, a first signal including a first expression code associated with the second UE, means for determining first metadata associated with the first expression code, means for monitoring for a second signal from the second UE based on the first metadata, the second signal including a second expression code that includes a first location of the second UE, means for determining the first location of the second UE from the second expression code using the first metadata, means for receiving, from the second UE, a third signal including a third expression code associated with the second UE, means for determining second metadata associated with the third expression code, means for determining a second location of the second UE from the second metadata.

The aforementioned means may be one or more of the aforementioned components of the apparatus 3202 and/or the processing system 3314 of the apparatus 3202' configured to perform the functions recited by the aforementioned means. As described supra, the processing system 3314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 34:
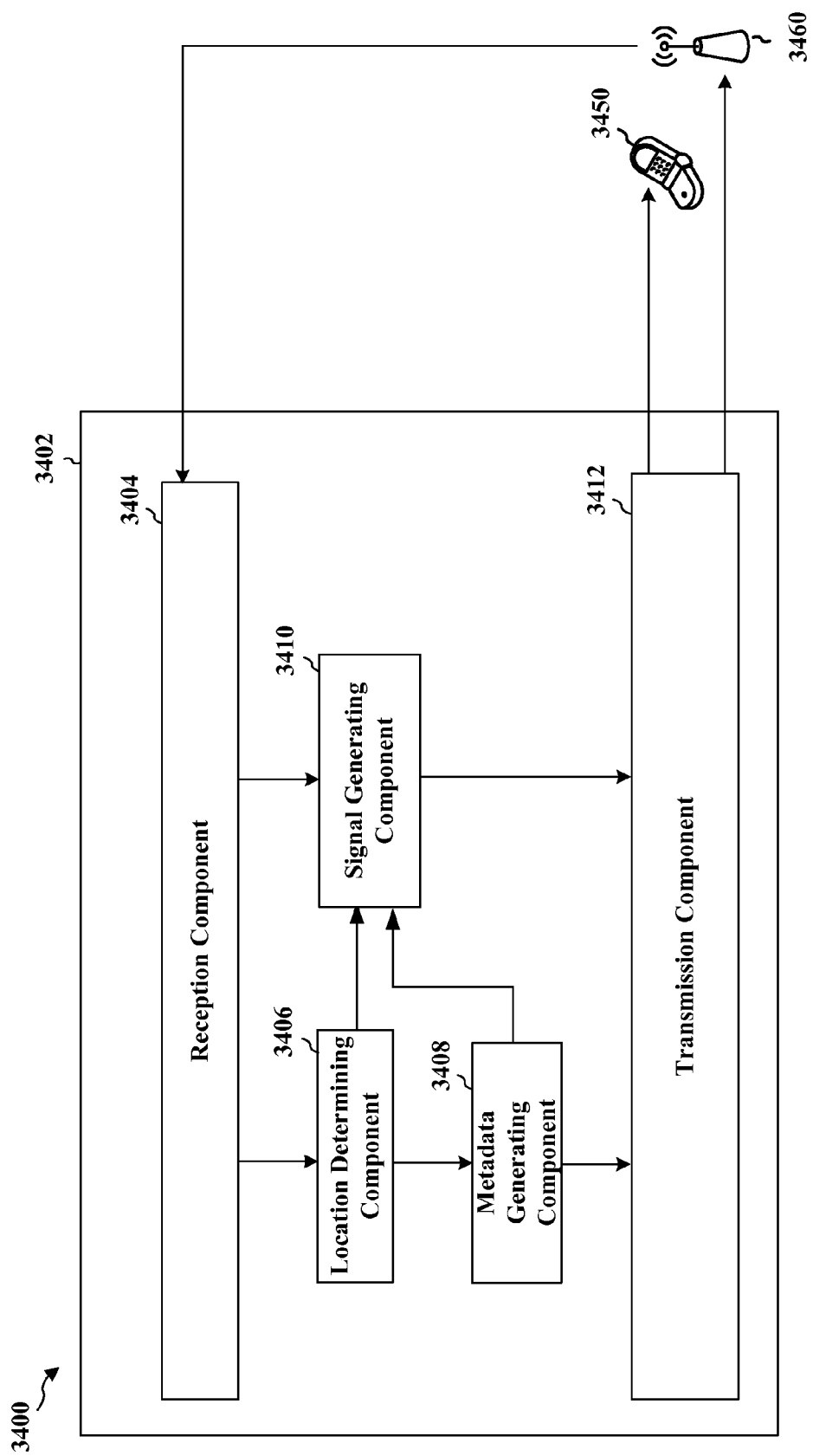
FIG. 34 is a conceptual data flow diagram illustrating the data flow between different modules/means/components in an exemplary apparatus.

FIG. 34 is a conceptual data flow diagram 3400 illustrating the data flow between different components/means/components in an exemplary apparatus 3402. The apparatus may be an announcing UE (e.g., second UE 1702, 1802, 1902, 2102, 2202, 2302). The apparatus includes a component 3404 that receives transmissions from a network device (e.g., network device 3460), a component 3406 that determines a first location of the announcing UE when the announcing UE is stationary, determines a second location of the announcing UE when the announcing UE is moving, and determines a third location of the announcing UE when the announcing UE is no longer moving. A component 3408 that updates the first metadata stored in the server with second metadata, and that updates the second metadata stored in the server with third metadata, the third metadata indicating the third location. A component 3410 that transmits a first signal including a first expression code, the first expression code associated with first metadata stored in a server, the first metadata indicating the first location, transmits a second signal including a second expression code, the second expression code associated with the second metadata, transmits a third signal including a third expression code, the third expression code indicating the second location, where the second metadata is configured to enable decoding of the third expression code, transmits a fourth signal including a fourth expression code, the fourth expression code associated with the third metadata.

The apparatus may include additional components that perform each of the blocks of the algorithm in the aforementioned flow chart of FIG. 28. As such, each block in the aforementioned flow chart of FIG. 28 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 35:
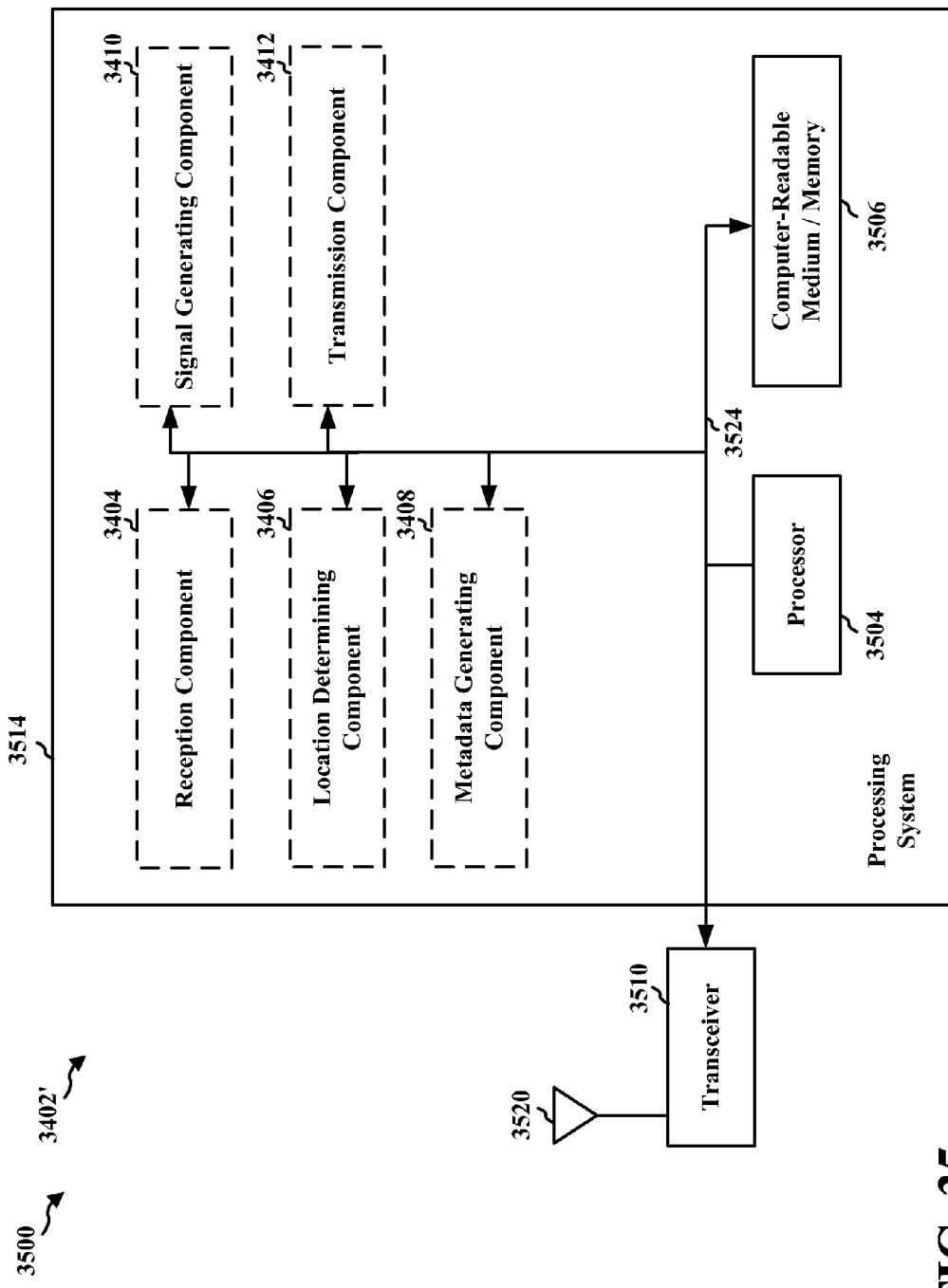
FIG. 35 is a diagram illustrating an example of a hardware implementation for an apparatus employing a processing system.

FIG. 35 is a diagram 3500 illustrating an example of a hardware implementation for an apparatus 3402' employing a processing system 3514. The processing system 3514 may be implemented with a bus architecture, represented generally by the bus 3524. The bus 3524 may include any number of interconnecting buses and bridges depending on the specific application of the processing system 3514 and the overall design constraints. The bus 3524 links together various circuits including one or more processors and/or hardware components, represented by the processor 3504, the components 3404, 3406, 3408, 3410, and 3412, and the computer-readable medium/memory 3506. The bus 3524 may also link various other circuits such as timing sources, peripherals, voltage regulators, and power management circuits, which are well known in the art, and therefore, will not be described any further.

The processing system 3514 may be coupled to a transceiver 3510. The transceiver 3510 is coupled to one or more antennas 3520. The transceiver 3510 provides a means for communicating with various other apparatus over a transmission medium. The transceiver 3510 receives a signal from the one or more antennas 3520, extracts information from the received signal, and provides the extracted information to the processing system 3514, specifically the reception component 3404. In addition, the transceiver 3510 receives information from the processing system 3514, specifically the transmission component 3412, and based on the received information, generates a signal to be applied to the one or more antennas 3520. The processing system 3514 includes a processor 3504 coupled to a computer-readable medium/memory 3506. The processor 3504 is responsible for general processing, including the execution of software stored on the computer-readable medium/memory 3506. The software, when executed by the processor 3504, causes the processing system 3514 to perform the various functions described supra for any particular apparatus. The computer-readable medium/memory 3506 may also be used for storing data that is manipulated by the processor 3504 when executing software. The processing system further includes at least one of the components 3404, 3406, 3408, 3410, and 3412. The components may be software components running in the processor 3504, resident/stored in the computer-readable medium/memory 3506, one or more hardware components coupled to the processor 3504, or some combination thereof. The processing system 3514 may be a component of the UE 650 and may include the memory 660 and/or at least one of the TX processor 668, the RX processor 656, and the controller/processor 659.

In one configuration, the apparatus 3402/3402' for wireless communication includes means for means for transmitting a first location of the announcing UE when the announcing UE is stationary, means for transmitting a first signal including a first expression code, the first expression code associated with first metadata stored in a server, the first metadata indicating the first location, means for determining a second location of the announcing UE when the announcing UE is moving, means for updating the first metadata stored in the server with second metadata, means for transmitting a second signal including a second expression code, the second expression code associated with the second metadata, means for broadcasting a third signal including a third expression code, the third expression code indicating the second location, wherein the second metadata is configured to enable decoding of the third expression code, means for determining a third location of the announcing UE when the announcing UE is no longer moving, means for updating the second metadata stored in the server with third metadata, the third metadata indicating the third location, and means for transmitting a fourth signal including a fourth expression code, the fourth expression code associated with the third metadata. The aforementioned means may be one or more of the aforementioned components of the apparatus 3402 and/or the processing system 3514 of the apparatus 3402' configured to perform the functions recited by the aforementioned means. As described supra, the processing system 3514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 36:
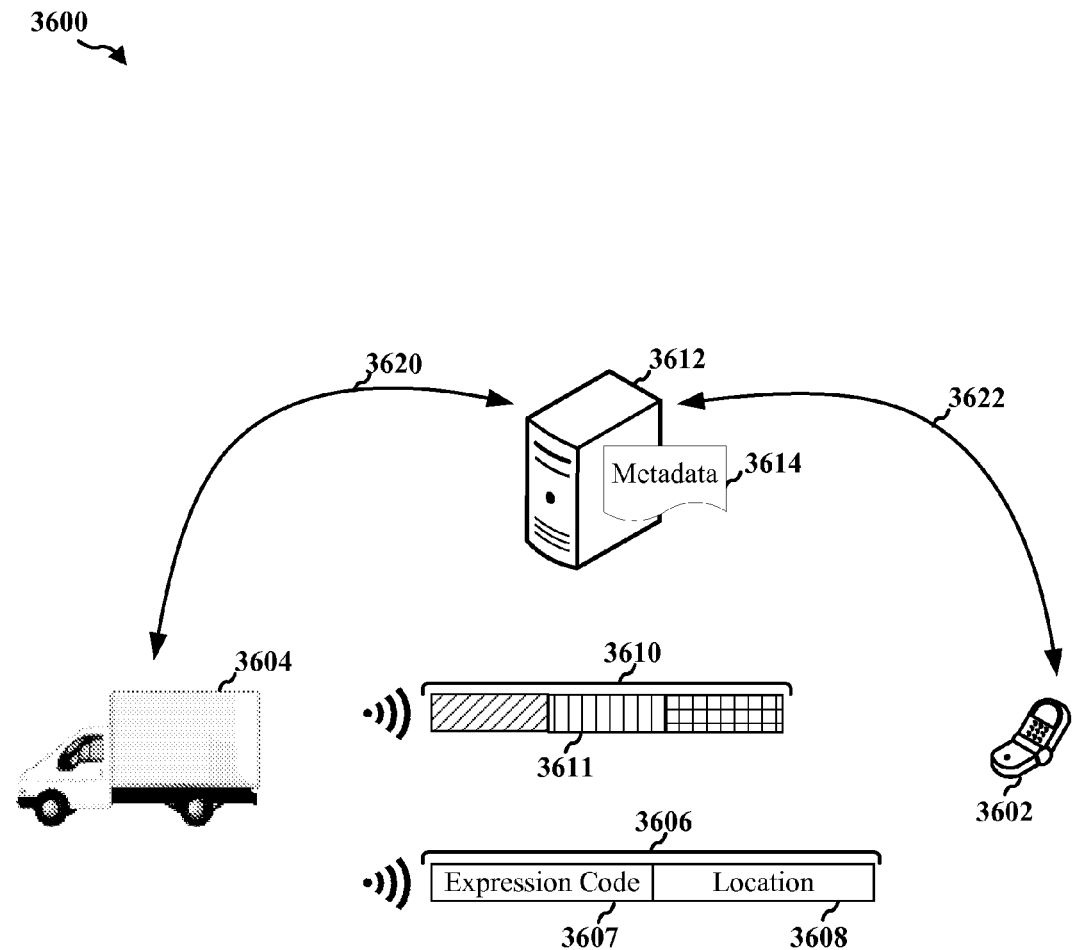
FIG. 36 is a diagram illustrating device discovery in a mobile network.

FIG. 36 is a diagram illustrating an embodiment of a mobile network 3600. In an aspect, the mobile network 3600 includes a number of users with ProSe-enabled UEs 3602, 3604. According to various aspects, a first UE 3602 may be configured to monitor for device discovery and a second UE 3604 may be configured to announce for device discovery. For example, the second UE 3604 may periodically broadcast (e.g., announce) a first signal 3610 that enables discovery by another UE (e.g., a first UE 3602). In such example, a first UE 3602 may discover a second UE 3604 in proximity that offers service and/or content of interest. However, the first UE 3602 performing discovery may not be able to determine the locations of discovered UEs. It is to be appreciated that either one or both of the UEs 3602, 3604 may perform both announcement and discovery.

The mobile network may further include a network device 3612. The network device 3612 may include a ProSe Function. In the present disclosure, a ProSe Function may refer to a logical function for proximity services implemented by a server or other network entity. The network device 3612 may be configured to allocate expression codes (e.g., ProSe application codes), look up expression codes (e.g., ProSe application identifiers and/or ProSe application names), and/or store metadata associated with expression codes ( ). The network device 3612 may be configured to communicate with UEs over various data paths—e.g., the network device 3612 may communicate with the second UE 3604 over a first data path 3620, and the network device 3612 may communicate with the first UE 3602 over the second data path 3622. The data paths 3620, 3622 may be wireless data paths, for example, in a WWAN.

According to an aspect, the network device 3612 includes metadata 3614 associated with location information of one or more UEs that are configured to announce their location. Metadata 3614 may be associated with a particular UE, a particular expression code, and/or a particular service or content. In various aspects, a UE may match a first expression code and may contact the network device 3612 to request metadata 3614 associated with the first expression code, such as another expression code (e.g., a dependent expression code) associated with the location information associated with the first expression code.

According to an aspect, a second UE 3604 may be configured to broadcast a first signal 3610. The first signal 3610 may be communicated on a discovery resource (e.g., a set of subcarriers in a subframe scheduled for device discovery). The first signal 3610 may include a first expression code 3611. The first expression code 3611 may be associated with a service and/or content that may be offered by the second UE 3604. In some aspects, the first expression code 3611 may include a Primary Code. In some aspects, the first expression code may be associated with a ProSe Application ID, which may otherwise be referred to herein as a ProSe Application Name and/or PAI. For example, the second UE 3604 may be an ice cream truck and the first expression code 3611 may indicate that the second UE 3604 is an ice cream truck (or provides such a service), for example, to an application of a monitoring UE (e.g., the first UE 3602).

In an aspect, the first expression code 3611 may be Code A 1316, as illustrated in FIG. 13 of the present disclosure. Accordingly, the first signal 3610 may be broadcast as discovery resource 1314. In another aspect, the first expression code 3611 may be of a format as illustrated in FIG. 14 of the present disclosure. For example, the first expression code 3611 may include a type 1412, a non-unique prefix 1414, and a unique discriminator.

Alternatively, the first expression code 3611 may be private. For example, the first expression code 3611 may include a restricted discovery type 1422, a unique prefix 1424 that may be an obfuscated identifier of an application, and a non-unique suffix 1426 that may be application specific information. The first expression code 3611 may be of another format in another aspect.

In an aspect, a private expression code may be shorter than a public expression code and so the second UE 3604 may be configured to broadcast two private expression codes, including the first expression code 3611, in a single discovery resource 1314, which may be broadcast as the first signal 3610. In such aspects, each private expression code may have different metadata associated therewith at the network device 3612, including metadata 3614.

In an aspect, the second UE 3604 may be configured to receive the first expression code 3611 from the network device 3612. The second UE 3604 may transmit an indication of a content and/or service to the network device 3612 over the data path 3620. For example, the second UE 3604 may transmit a ProSe Application ID to the network device 3612. In response, the network device 3612 may transmit the first expression code 3611 to the second UE 3604 over the data path 3620.

The second UE 3604 may broadcast the first expression code 3611 in association with location information for the second UE 3604. For example, the first expression code 3611 may be associated with a service and/or content for which location information is available for the second UE 3604. In one aspect, the first signal 3610 may include one or more bits (e.g., a flag or other bit sequence) that indicate location information is available for the second UE 3604. However, the location information for the second UE 3604 may be independently available from the first signal 3610—e.g., the size of the first expression code 3611 may consume an entire discovery resource (e.g., 160 bits) so that location information is to be made separately available and/or the location information may be separately available due to privacy concerns.

Independent of the first signal 3610, the second UE 3604 may broadcast (e.g., announce) a second signal 3606. The second signal 3606 may be communicated on another discovery resource (e.g., a set of subcarriers in a subframe scheduled for device discovery). In an aspect, the second signal 3606 may include a second expression code 3607. In an aspect, the second expression code 3607 may be Code B 1324, as illustrated in FIG. 13 of the present disclosure. Accordingly, the second signal 3606 may be communicated on the discovery resource 1322.

The second expression code 3607 may be associated with the first expression code 3611, for example, the second expression code 3607 may be referred to as a dependent expression code for the first expression code 3611. In another aspect, the second expression code 3607 may not be explicitly associated with the first expression code 3611 at the network device 3612 and/or at the second UE 3604.

In various aspects, the second UE 3604 may communicate with a network device 3612 in association with broadcasting the second expression code 3607. The second UE 3604 may be configured to determine the second expression code 3607. In one aspect, the second UE 3604 may generate the second expression code 3607. In an aspect, the second UE 3604 requests the network device 3612 to update metadata 3614 associated with the second UE 3604. For example, the second UE 3604 may request, over the data path 3620, that the network device 3612 update metadata 3614 associated with location information for the second UE 3604. The requested update to metadata 3614 may cause the network device 3612 to store metadata 3614 associated with the second expression code 3607 in connection with one or more of the second UE 3604, the first expression code 3611, and/or a service or content offered by the second UE 3604. According to an aspect, metadata 3614 may include the second expression code 3607.

According to another aspect, the second UE 3604 may receive the second expression code 3607 from the network device 3612. For example, the second UE 3604 may send a request for the second expression code 3607 to the network device 3612 over the data path 3620. In response, the network device 3612 may provide, over the data path 3620, the second expression code 3607 to the second UE 3604. In various aspects, the network device 3612 may generate the second expression code 3607, such as through application of a function to the first expression code 3611 or through random generation of a bit sequence that is suitable for wireless transmission. The network device 3612 may store the second expression code 3607 in metadata 3614 associated with the second UE 3604.

According to an aspect, the second UE 3604 may request that the network device 3612 update metadata 3614 in response to a change in location of the second UE 3604. For example, the second UE 3604 may detect that the second UE 3604 is moving and, based on the detected movement, may request that the network device 3612 update metadata 3614 to indicate that a monitoring UE (e.g., the first UE 3602) is to monitor for the second expression code 3607 based on metadata 3614. This configuration may reduce communication by a monitoring UE with the network device 3612, for example, when the second UE 3604 is frequently moving and/or location information associated with the second UE 3604 may need to be frequently accessed by the other UE.

According to an aspect, the first expression code 3611 and the second expression code 3607 may be linked at a discovery service layer, such as the discovery service layer 914 of the mobile device 902 illustrated in FIG. 9. This linking of the first expression code 3611 and the second expression code 3607 may appear at one or both of the second UE 3604 and the first UE 3602. This linking of the first expression code 3611 and the second expression code 3607 may occur below an application layer (e.g., below application 910 of FIG. 9) and may be transparent to an application of the second UE 3604 and/or first UE 3602 (e.g., transparent to an application 910 of a mobile device 902).

According to aspects, the second UE 3604 may be configured to determine location information associated with the second UE 3604. In various aspects, the location information may include one or more of geographic coordinates (e.g., coordinates based on latitude and longitude), GPS data, network-assisted positioning (e.g., via WiFi™ network scanning), and/or other location specific data that may be provided through a global navigation satellite system (GNSS).

The second UE 3604 may generate the second signal 3606 to include the location information 3608. Accordingly, the second signal 3606 may include both the second expression code 3607 and the location information 3608. In one aspect, the second expression code 3607 may be a "prefix" of a discovery resource, while the location information 3608 may be a "suffix" of that discovery resource. For example, the second expression code 3607 may include Code B 1324 of discovery resource 1322, and the location information 3608 may include Code C 1326 of the same discovery resource 1322. It will be appreciated that the second expression code may appear in a different order (e.g., the location information 3608 may precede the second expression code 3607 in a discovery resource). In one aspect, the second UE 3604 may encode and/or compress the location information 3608.

In one aspect, the second UE 3604 may broadcast a plurality of expression codes, including the first expression code 3611, in association with availability of location information for the second UE 3604, such as where the second UE 3604 offers a plurality of content and/or services. However, because the location information for the second UE 3604 may be the same for all of the plurality, the second UE 3604 may only need to broadcast the second expression code 3607 with the location information 3608 to provide location information in association with all broadcasted expression codes indicating content and/or services (e.g., primary expression codes), including the first expression code 3611.

In various aspects, the second UE 3604 may detect a change in location of the second UE 3604, such as where the second UE 3604 is moving. Based on a change in location, the second UE 3604 may request that the network device 3612 update metadata 3614 associated with the second UE 3604. In an aspect, the second UE 3604 may update the expression code broadcasted in connection with the updated location information. The second UE 3604 may then broadcast this updated expression code with updated location information, for example, in a third signal similar to the second signal 3606.

According to aspects, the first UE 3602 may monitor for signals from other UEs. For example, the first UE 3602 may monitor discovery resources and/or a discovery channel to discover other UEs that offer services and/or content that may be of interest to the first UE 3602. For example, the first UE 3602 may monitor for an ice cream truck that is proximate to the first UE 3602. According to an aspect, the service and/or content may be of interest to an application of the first UE 3602, such as an application 910 of FIG. 9. However, monitoring of a discovery channel and/or discovery resources may occur at a lower layer, such as a discovery service layer 914 of the mobile device 902 illustrated in FIG. 9.

According to some aspects in which the service and/or content provided by the second UE 3604 is private, the first UE 3602 may be informed of the first expression code 3611. For example, the first UE 3602 may determine the first expression code 3611 when the first UE 3602 is an authorized monitoring device, such as based on metadata that may be received out-of-band and/or from an application 910.

The first UE 3602 may detect the first signal 3610 broadcasted by the second UE 3604. From the first signal 3610, the first UE 3602 may decode the first expression code 3611. The first UE 3602 may determine that the first expression code 3611 is of interest to the first UE 3602. For example, the first UE 3602 may determine that the second UE 3604 offers services and/or content that is of interest to the first UE 3602—e.g., the first expression code 3611 may indicate that the second UE 3604 is an ice cream truck.

According to various aspects, the first expression code 3611 may be associated with availability of location information for the second UE 3604. In one aspect, the first signal 3610 may include one or more bits (e.g., a flag or bit sequence) that indicate location information is available for the second UE 3604. Detection of the one or more bits may indicate to the first UE 3602 that the first UE 3602 is to continue to monitor for location information for the second UE 3604. In another aspect, the first UE 3602 has stored therein information that detection of the first expression code 3611 indicates location information may be available for the second UE 3604.

In the context of FIG. 9, for example, a match on the first expression code 3611 may indicate to a discovery service layer 914 that the discovery service layer 914 is to monitor for another signal that indicates the location information for the second UE 3604—e.g., so that location information may be provided to an application 910. The discovery service layer 914 may detect this indication that the discovery service layer 914 is to monitor for the location information based on a flag in the first signal 3610 and/or other information, such as information stored at the first UE 3602 (e.g., at the discovery service layer 914 of the first UE 3602).

Based on the determination that the first expression code 3611 is of interest to the first UE 3602, the first UE 3602 may determine a second expression code 3607 associated with the location information. In various aspects, the first UE 3602 may request metadata associated with location information for the second UE 3604, for example, in response to a match on the first expression code 3611 and determination that location information is available. Accordingly, the first UE 3602 may transmit, to the network device 3612 over the data path 3622, a request for metadata 3614 associated with the location information for the second UE 3604.

In various aspects, the first UE 3602 may transmit a request for metadata 3614 that includes one or more of the first expression code 3611, an indication of the service and/or content, or other indication that the first UE 3602 detects a match based on the first expression code 3611. In one aspect, the request for metadata 3614 may include a match report, as described in various aspects of the present disclosure.

In response to the request, the network device 3612 may transmit, over the data path 3622, metadata 3614 associated with the location information for the second UE 3604. This metadata 3614 may include an indication of the second expression code 3607. In another aspect, this metadata 3614 may include information from which the first UE 3602 may determine the second expression code 3607. In such an aspect, the first UE 3602 may be configured to generate (e.g., derive) the second expression code 3607 from the received metadata 3614, for example, based on application of a function (e.g., a time varying hash function or other function associated with LTE-Direct and/or ProSe discovery). Accordingly, metadata 3614 may indicate to the first UE 3602 that the first UE 3602 is to monitor for the second expression code 3607 to detect the location information for the second UE 3604 and that the location information for the second UE 3604 is not available at the network device 3612, as may be the case when the second UE 3604 is currently and/or is frequently moving.

In aspects, the first UE 3602 may begin to monitor for the second expression code 3607. The first UE 3602 may receive the second signal 3606 and decode the second expression code 3607 included therein to determine that the second signal 3606 includes location information for the second UE 3604 and is of interest to the first UE 3602.

Based on receiving the second signal 3606 and decoding the second expression code 3607 to determine a match, the first UE 3602 may decode and/or extract the location information 3608 included in the second signal 3606. In various aspects, the location information may include one or more of geographic coordinates (e.g., coordinates based on latitude and longitude), GPS data, and/or other location specific data that may be provided through a GNSS.

In the context of FIG. 9, for example, decoding the second expression code 3607 may indicate to a discovery service layer 914 that the discovery service layer 914 is to decode and/or to extract a portion of the second signal 3606 that includes the location information for the second UE 3604. The discovery service layer 914 may provide this location information to an application 910. The discovery service layer 914 may detect this indication that the discovery service layer 914 is to monitor for the location information based on a flag in the first signal 3610 and/or other information, such as information stored at the first UE 3602 (e.g., at the discovery service layer 914 of the first UE 3602). Accordingly, the application 910 of the first UE 3602 may track, display, or otherwise process the location information for the second UE 3604.

In an aspect, the first UE 3602 may receive a plurality of signals, including the second signal 3606, during periods allocated for device discovery. The first UE 3602 may cache information from those signals, including the second expression code 3607 and the location information 3608, received during a device discovery period (although the first UE 3602 may not have decoded the second expression code 3607 and/or the location information 3608). Thus, when the first UE 3602 detects a match on a first expression code 3611 and communicates with the network device 3612 to receive metadata 3614 from which the first UE 3602 may determine the second expression code 3607, the first UE 3602 may access the cached information (including the received second expression code) to decode the location information 3608 without waiting for a subsequent device discovery period.

In the context of FIG. 13, for example, the first UE 3602 may receive Code A 1316 (e.g., the first expression code 3611) during device discovery period 1318, but may have cached Code B 1324 (e.g., the second expression code 3607) and location information (e.g., in subcarriers of the subframe allocated for Code C 1326) from a discovery resource 1322 received at a previous device discovery period 1304. When the first UE 3602 subsequently receives and matches on Code A 1316 (e.g., the first expression code 3611), the first UE 3602 may access the cached Code B 1324 (e.g., the second expression code 3607) and decode and/or extract the location information in association with the match without having to wait for a next device discovery period.

Figure 37:
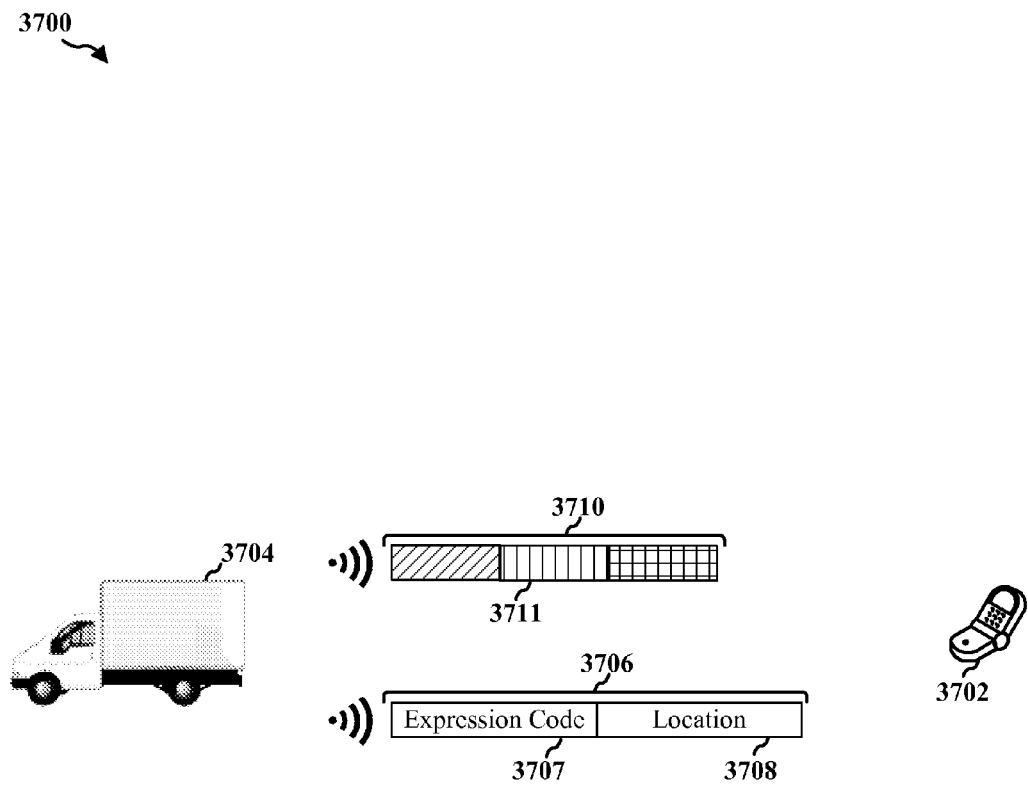
FIG. 37 is a diagram illustrating another aspect of device discovery in a mobile network.

FIG. 37 is a diagram illustrating an embodiment of a mobile network 3700. In an aspect, the mobile network 3700 includes a number of users with ProSe-enabled UEs 3702, 3704. According to various aspects, a first UE 3702 may be configured to monitor for device discovery and a second UE 3704 may be configured to announce for device discovery. For example, the second UE 3704 may periodically broadcast (e.g., announce) a first signal 3710 that enables discovery by another UE (e.g., the first UE 3702). In such example, the first UE 3702 may discover the other UE 3704 in proximity that offers a service or content of interest. However, the first UE 3702 performing discovery may not be able to accurately determine the locations of the discovered UEs. It is to be appreciated that either one or both of the UEs 3702, 3704 may perform both announcement and discovery.

According to an aspect, the second UE 3704 may be configured to broadcast a first signal 3710. The first signal 3710 may be communicated on a discovery resource (e.g., a set of subcarriers in a subframe scheduled for device discovery). The first signal 3710 may include a first expression code 3711. The first expression code 3711 may be associated with a service and/or content that may be offered by the second UE 3704. In some aspects, the first expression code 3711 may include a Primary Code. For example, the second UE 3704 may be an ice cream truck and the first expression code 3711 may correspond to a ProSe Application ID (e.g., an application ID and/or name for finding an ice cream truck).

In an aspect, the first expression code 3711 may be Code A 1316, as illustrated in FIG. 13 of the present disclosure. Accordingly, the first signal 3710 may be communicated on a discovery resource 1314. In another aspect, the first expression code 3711 may be of a format as illustrated in FIG. 14 of the present disclosure. For example, the first expression code 3711 may include a type 1412, a non-unique prefix 1414, and a unique discriminator.

Alternatively, the first expression code 3711 may be private. Accordingly, the first expression code 3711 may include a restricted discovery type 1422, a non-unique prefix 1424 that may be an obfuscated identifier of an application, and a non-unique suffix 1426 that may be application specific information. The first expression code 3711 may be of another format in another aspect. In an aspect, a private expression code may be shorter than a public expression code and so the second UE 3704 may be configured to broadcast two private expression codes, including the first expression code 3711, on a single discovery resource 1314.

The second UE 3704 may broadcast the first expression code 3711 in association with location information for the second UE 3704. For example, the first expression code 3711 may be associated with a service and/or content for which location information is available for the second UE 3704. In one aspect, the first signal 3710 may include one or more bits (e.g., a flag or bit sequence) that indicate location information is available for the second UE 3704. In an aspect, the one or more bits may indicate that location information is available for the second UE 3604.

However, the location information for the second UE 3704 may be independently available from the first signal 3710—e.g., the size of the first expression code 3711 may consume an entire discovery resource (e.g., 160 bits) so that location information must be made separately available and/or the location information may be separately available due to privacy concerns.

In various aspects, the second UE 3704 may broadcast a second expression code 3707. The second expression code 3707 may be associated with the first expression code 3711, for example, the second expression code 3707 may be referred to as a dependent expression code for the first expression code 3711.

The second UE 3704 may be configured to determine the second expression code 3707. In one aspect, the second UE 3704 may generate the second expression code 3707 based on the first expression code 3711. For example, the second UE 3704 may generate the second expression code 3707 based on application of a function to the first expression code 3711. The function may be a well-known hash function, such as a Secure Hash Algorithm (SHA) hash function or Message Digest (MD) hash function (e.g., MD5 hash function). In another aspect, the function may be associated with LTE-Direct and/or ProSe discovery, such as a time varying hash function.

According to an aspect, the first expression code 3711 and the second expression code 3707 may be linked at a discovery service layer, such as the discovery service layer 914 of the mobile device 902 illustrated in FIG. 9. This linking of the first expression code 3711 and the second expression code 3707 may appear at one or both of the second UE 3704 and the first UE 3702. This linking of the first expression code 3711 and the second expression code 3707 may occur below an application layer (e.g., below application 910 of FIG. 9) and may be transparent to an application of the second UE 3704 and/or first UE 3702 (e.g., transparent to an application 910 of a mobile device 902).

Independent of the first signal 3710, the second UE 3704 may broadcast (e.g., announce) a second signal 3706. The second signal 3706 may be communicated on another discovery resource (e.g., a set of subcarriers in a subframe scheduled for device discovery). In an aspect, the second signal 3706 may include the second expression code 3707. In an aspect, the second expression code 3707 may be Code B 1324, as illustrated in FIG. 13 of the present disclosure. Accordingly, the second signal 3706 may be communicated on discovery resource 1322.

According to aspects, the second UE 3704 may be configured to determine location information associated with the second UE 3704. In various aspects, the location information may include one or more of geographic coordinates (e.g., coordinates based on latitude and longitude), GPS data, network-assisted positioning (e.g., via WiFi™ network scanning), and/or other location specific data that may be provided through a GNSS.

The second UE 3704 may generate the second signal 3706 to include the location information 3708. Accordingly, the second signal 3706 may include both the second expression code 3707 and the location information 3708. The second UE 3704 may generate the second signal 3706 to include the location information 3708. Accordingly, the second signal 3706 may include both the second expression code 3707 and the location information 3708. In one aspect, the second expression code 3707 may be a "prefix" of a discovery resource, while the location information 3708 may be a "suffix" of that discovery resource.

In one aspect, the second UE 3704 may encode and/or compress the location information 3708. According to such an aspect, the encoded and/or compressed location information 3708 may be Code C 1326 of discovery resource 1322, as illustrated in FIG. 13 of the present disclosure. However, it will be appreciated that the second expression code 3707 and the location information 3708 may appear in any order on a discovery resource.

In one aspect, the second UE 3704 may broadcast a plurality of first expression codes, including the first expression code 3711, for example, to indicate a plurality of services and/or content available at the second UE 3704 and in association with availability of location information for the second UE 3704. The second UE 3704 may be configured to generate a respective second expression code based on a respective first expression code and broadcast the respective second expression code with location information for the second UE 3704.

In various aspects, the second UE 3704 may detect a change in location of the second UE 3704, such as where the second UE 3704 is moving. Thus, the second UE 3704 may continually and/or periodically broadcast the second signal 3706 to include the second expression code 3707 and changed (e.g., updated) location information. In broadcasting a second expression code 3707 that may be determined from the first expression code 3711, a monitoring UE (e.g., the first UE 3702) may reduce or eliminate communication with other devices (e.g., a network device or ProSe Function) when determining the location information of the second UE 3704. This approach may be advantageous when the second UE 3704 is moving and/or frequently changing locations, in that a monitoring UE may determine the location information of the second UE 3704 without overhead costs (e.g., time) commensurate with communicating with another device to determine the location information of the second UE 3704.

According to aspects, the first UE 3702 may monitor for signals from other UEs. For example, the first UE 3702 may monitor a discovery channel to discover other UEs that offer services and/or content that may be of interest to the first UE 3702. For example, the first UE 3702 may monitor for an ice cream truck that is proximate to the first UE 3702. According to an aspect, the service and/or content may be of interest to an application of the first UE 3702, such as an application 910 of FIG. 9. However, monitoring of a discovery channel may occur at a lower layer, such as a discovery service layer 914 of the mobile device 902 illustrated in FIG. 9.

The first UE 3702 may detect the first signal 3710 broadcast by the second UE 3704. From the first signal 3710, the first UE 3702 may decode the first expression code 3711. The first UE 3702 may determine that the first expression code 3711 is of interest to the first UE 3702. For example, the first UE 3702 may determine that the second UE 3704 offers services and/or content that is of interest to the first UE 3702—e.g., the first expression code 3711 may indicate that the second UE 3704 is an ice cream truck.

According to various aspects, the first expression code 3711 may be associated with availability of location information for the second UE 3704. In one aspect, the first signal 3710 may include one or more bits (e.g., a flag or bit sequence) that indicate location information is available for the second UE 3704. In an aspect, the one or more bits may indicate that the second UE 3704 is to broadcast location information. Detection of the one or more bits may indicate to the first UE 3702 that the first UE 3702 is to monitor for location information for the second UE 3704. In another aspect, the first UE 3702 has stored therein information that detection of the first expression code 3711 indicates location information may be available for the second UE 3704.

In the context of FIG. 9, for example, a match on the first expression code 3711 may indicate to a discovery service layer 914 that the discovery service layer 914 is to monitor for another signal that indicates the location information for the second UE 3704—e.g., so that location information may be provided to an application 910. The discovery service layer 914 may detect this indication that the discovery service layer 914 is to monitor for the location information based on a flag in the first signal 3710 and/or other information, such as information stored at the first UE 3702 (e.g., at the discovery service layer 914 of the first UE 3702).

Based on a determination that location information is available for the second UE 3704 in connection with the first expression code 3711, the first UE 3702 may determine a second expression code 3707 associated with the location information. In various aspects, the first UE 3702 may determine a second expression code 3707 based on the first expression code 3711. For example, the first UE 3702 may generate the second expression code 3707 based on application of a function to the first expression code 3711. The function may be a well-known hash function, such as a SHA hash function or MD hash function (e.g., MD5 hash function). In another aspect, the function may be associated with LTE-Direct and/or ProSe discovery, such as a time varying hash function. The function may be known to both the second UE 3704 and the first UE 3702.

In aspects, the first UE 3702 may monitor for the second expression code 3707. The first UE 3702 may receive the second signal 3706 and decode the second expression code 3707 included therein to determine that the second signal 3706 includes location information for the second UE 3704 and is of interest to the first UE 3702.

In an aspect, the first UE 3702 may receive a plurality of signals, including the second signal 3706, during periods allocated for device discovery. The first UE 3702 may cache information from those signals, including the second expression code 3707 and the location information 3708, received during a device discovery period (although the first UE 3602 may not have decoded the second expression code 3607 and/or the location information 3608). Thus, when the first UE 3702 detects a match on a first expression code 3711, the first UE 3602 may access the cached information to decode the second expression code 3607 and the location information 3608 without waiting for another device discovery period.

In the context of FIG. 13, for example, the first UE 3702 may receive Code A 1316 (e.g., the first expression code 3711) during device discovery period 1318, but may have cached Code B 1324 (e.g., the second expression code 3707) and location information (e.g., in subcarriers of the subframe allocated for Code C 1326) from discovery resource 1322 received during a previous device discovery period 1304. When the first UE 3702 subsequently receives and matches on Code A 1316 (e.g., the first expression code 3611), the first UE 3602 may access the cached Code B 1324 (e.g., the second expression code 3707) and decode the location information 3708 in association with the match without having to wait for a subsequent device discovery period.

Based on receiving the second signal 3706 and decoding the second expression code 3707, the first UE 3702 may decode and/or extract the location information 3708 included in the second signal 3706. In various aspects, the location information 3708 may include one or more of geographic coordinates (e.g., coordinates based on latitude and longitude), GPS data, and/or other location specific data that may be provided through a GNSS.

In the context of FIG. 9, for example, decoding the second expression code 3707 may indicate to a discovery service layer 914 that the discovery service layer 914 is to decode and/or to extract a portion of the second signal 3706 that includes the location information 3708 for the second UE 3704. The discovery service layer 914 may provide this location information 3708 to an application 910. The discovery service layer 914 may detect this indication that the discovery service layer 914 is to monitor for the location information based on a flag or bit sequence of the first signal 3710 and/or other information, such as information stored at the first UE 3702 (e.g., at the discovery service layer 914 of the first UE 3702). Accordingly, the application 910 of the first UE 3702 may track, display, or otherwise process the location information 3708 for the second UE 3704.

According to an aspect, the second UE 3604 of FIG. 36 and the second UE 3704 of FIG. 37 may be a same or similar UE capable of at least a portion of operations described with respect to both FIG. 36 and FIG. 37. Similarly, the first UE 3602 of FIG. 36 and the first UE 3702 of FIG. 37 may be a same or similar UE capable of at least a portion of operations described with respect to both FIG. 36 and FIG. 37.

In an aspect, the mobile network of FIG. 37 may include a network device, such as the network device 3612 of FIG. 36. Thus, the first UE 3702 and the second UE 3704 may communicate with a network device (e.g., the network device 3612) according to various approaches described with respect to the first UE 3602 and the second UE 3604 of FIG. 36.

In some aspects, a second UE 3604/3704 may use metadata versioning to indicate that the second UE 3604/3704 is transitioning between stationary and moving states. For example, the second UE 3604/3704 may cause metadata 3614 to be stored at the network device 3612 indicating that the second UE 3604/3704 is stationary and a first UE 3602/3702 is to use metadata 3614 retrieved from the network device 3612 to decode the location information 3608 associated for the second UE 3604/3704. When the second UE 3604/3704 is moving, the second UE 3604/3704 may cause metadata 3614 to be stored in the network device 3612 to indicate that the first UE 3602/3702 should determine the second expression code 3707 based on the first expression code 3711 and monitor for the second expression code 3707 to decode the location information 3708. In one aspect, the second UE 3604/3704 may include an indication of whether the location information is broadcast or is stored in metadata 3614 in the first signal 3610/3710, such as in a flag or bit sequence.

In an aspect, the second UE 3704 may be configured to communicate with a network device, such as the network device 3612 of FIG. 36. The second UE 3704 may be configured to transmit an indication of a content and/or service to the network device 3612. For example, the second UE 3704 may transmit a ProSe Application ID to the network device 3612. In response, the network device 3612 may transmit the first expression code 3711 to the second UE 3704.

Figure 38A:
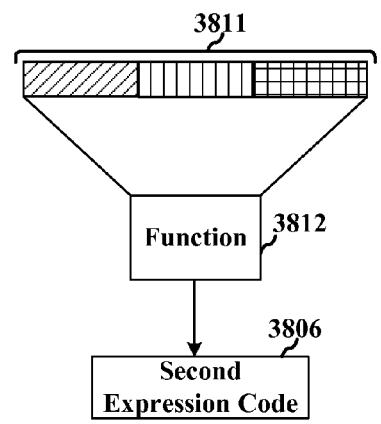
FIGS. 38A and 38B are diagrams illustrating generation of expression codes for device discovery in a mobile network.
Figure 38B:
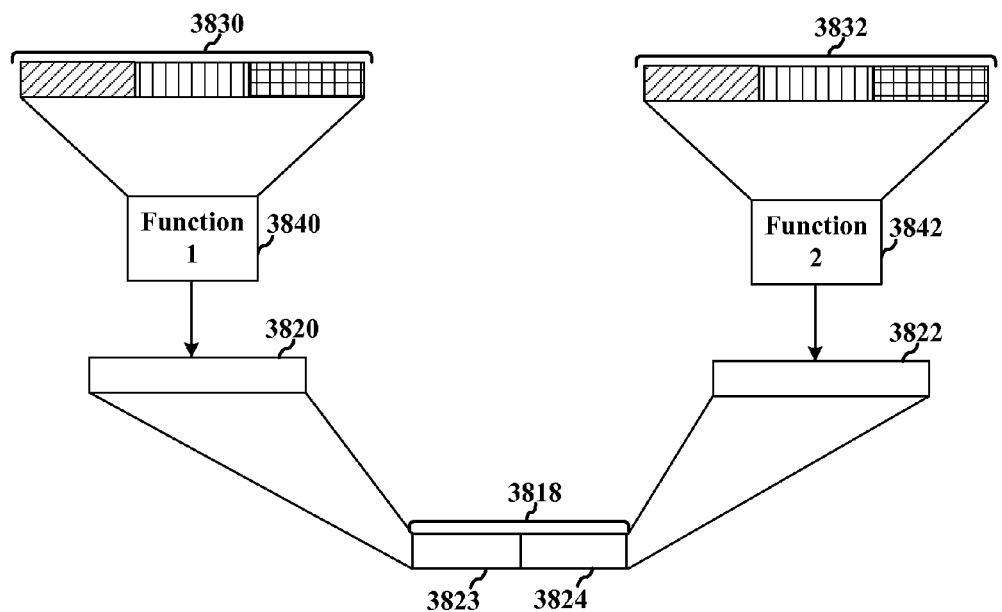

FIGS. 38A and 38B are diagrams illustrating generation of expression codes for device discovery in a network, in accordance with various aspects of the present disclosure. As shown in FIG. 38A, a first expression code 3811 (e.g., a primary expression code) may have applied thereto a function 3812. The function 3812 may be a well-known hash function, such as a SHA hash function or MD hash function (e.g., MD5 hash function). In another aspect, the function 3812 may be associated with LTE-Direct and/or ProSe discovery, such as a time varying hash function. Application of the function 3812 to the first expression code 3811 may generate a second expression code 3806.

In the context of FIG. 37, for example, a second UE 3704 may apply the function 3812 to the first expression code 3811 (e.g., the first expression code 3711) to generate another expression code 3806. In an aspect, the application of the function 3812 to the first expression code 3811 may generate a second expression code 3806, which may be the second expression code 3707 of FIG. 37. In an aspect, the function 3812 may truncate bits—e.g., from a result of application to a hash function to the first expression code 3811—so that the second expression code 3806 is of a size suitable to be included on a discovery resource with location information.

Like the second UE 3704, the first UE 3702 may apply the function 3812 to the first expression code 3811 (e.g., the first expression code 3711) to generate another expression code 3806, which may be truncated as described above. In aspects, the function 3812 may be known to both the first UE 3702 and the second UE 3704. Therefore, both the first UE 3702 and the second UE 3704 may generate a same second expression code 3806. Thus, when the first UE 3702 is monitoring for signals from the second UE 3704, the first UE 3702 may compare its own second expression code 3806 (generated at the first UE 3702) to a received second expression code 3707 broadcast by the second UE 3704 to determine a match. In aspects, when the first UE 3702 determines a match on the second expression code 3806, then the first UE 3702 may determine that the location information 3708 included in the second signal 3706 is associated with the first expression code 3811, which may be associated with an indication of content and/or services available at the second UE 3704.

With respect to FIG. 38B, a diagram illustrates generation of a dependent expression code when a device is to broadcast (e.g., announce) more than one expression code. For example, in the context of FIG. 37, the second UE 3704 may have available thereat a plurality of content and/or services and a respective content and/or service may be announced via a respective expression code, including the first expression code 3711.

As illustrated in FIG. 38B, two expression codes 3830, 3832 may be associated with content and/or services available at a UE. For example, one of the expression codes 3830 may be an embodiment of the first expression code 3711 of FIG. 37 and the other expression code 3832 may be similar thereto. A UE that is to broadcast (e.g., announce) both expression codes 3830, 3832 but consume only a single discovery resource for the second expression code (e.g., dependent expression code) and location information for the UE, may hash the expression codes 3830, 3832 and truncate the results.

According to aspects, a first function 3840 may be applied to an expression code 3830 and a second function 3842 may be applied to the other expression code 3832. The functions 3840, 3842 may be well-known hash functions, such as a SHA hash functions or MD hash functions (e.g., MD5 hash functions). In another aspect, the functions 3840, 3842 may be associated with LTE-Direct and/or ProSe discovery, such as time varying hash functions. In some aspects, the first function 3840 and the second function 3842 may be a same function.

Application of the first function 3840 to the expression code 3830 and the second function 3842 to the other expression code 3832 may generate two bit sequences 3820, 3822. These two bit sequences 3820, 3822 may be truncated and combined (e.g., concatenated) to form the second expression code 3818.

For example, in the context of FIG. 37, the second UE 3704 may apply the first function 3840 to the expression code 3830 (which may be the first expression code 3711) and apply the second function 3842 to the other expression code 3832 (which may be similar to the first expression code 3711). Application of respective functions 3840, 3842 to respective expression codes 3830, 3832 may cause the second UE 3704 to generate respective bit sequences 3820, 3822.

The second UE 3704 may truncate these generated bit sequences 3820, 3822. For example, the second UE 3704 may truncate these generated bit sequences 3820, 3822 to a size that is suitable for inclusion on a discovery resource with location information. For example, the second UE 3704 may truncate these generated bit sequences 3820, 3822 to thirty-two (32) bits. The second UE 3704 may combine (e.g., concatenate) the truncated bit sequences 3823, 3824 into the second expression code 3818. The second UE 3704 may then generate a signal that includes this second expression code 3818 (which may be the second expression code 3707) and location information for the second UE 3704 (which may be the location information 3708).

Continuing in the context of FIG. 37, the first UE 3702 may apply one of the functions 3840 to one of the expression codes 3830 (e.g., the first expression code 3711) that is of interest to the first UE 3702. In aspects, the function 3840 used by the first UE 3702 may be known to both the first UE 3702 and the second UE 3704. Therefore, both the first UE 3702 and the second UE 3704 may generate a same bit sequence 3820. Similar to the second UE 3704, the first UE

3702 may truncate the generated bit sequence 3820 to determine the truncated bit sequence 3823. Thus, when the first UE 3702 is monitoring for signals from the second UE 3704, the first UE 3702 may compare its own truncated bit sequence 3823 (generated at the first UE 3702) to bit sequences of a received second expression code 3707 broadcast by the second UE 3704 to determine a match, such as by comparing the bit sequence 3823 to the first portion and/or the second portion of the second expression code 3707. In aspects, when the first UE 3702 determines a match on at least a portion of the second expression code 3818, then the first UE 3702 may determine that the location information 3708 included in the second signal 3706 is associated with the first expression code 3830, which may be associated with an indication of content and/or services available at the second UE 3704.

Figure 39:
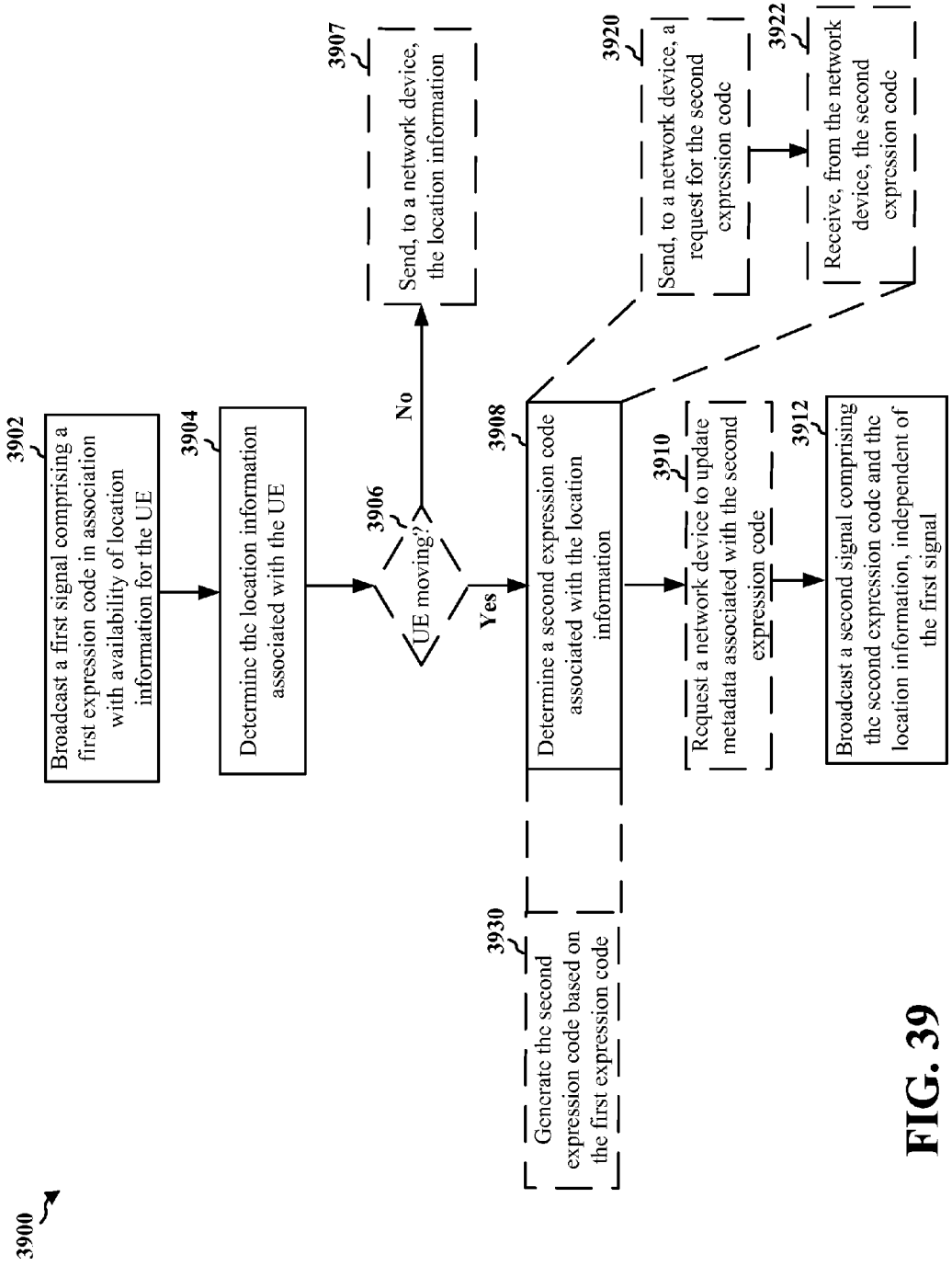
FIG. 39 is a flow diagram of a method of wireless communication.

FIG. 39 is a flow diagram illustrating a method 3900 for device discovery in a mobile network, according to various aspects. The method 3900 may be performed by a UE, such as the second UE 3604 of FIG. 36 or the second UE 3704 of FIG. 37. It should be understood that the operations represented with dotted lines in FIG. 39 represent optional operations.

The method 3900 may begin with an operation 3902, where a UE may broadcast a first signal that includes a first expression code in association with availability of location information for the UE. In an aspect, the first expression code may indicate a service and/or content available at the UE. The first expression code may include a ProSe Expression Code that corresponds to a ProSe Application ID. In an aspect, the first expression code may include a public code, whereas the first expression code may include a private code in another aspect.

In one aspect, the first signal may include a flag and/or other bit sequence to indicate the availability of location information. In one aspect, such a flag and/or bit sequence may be included in the first expression code.

In the context of FIG. 36, for example, the second UE 3604 may broadcast the first signal 3610 that includes the first expression code 3611. In the context of FIG. 37, for example, the second UE 3704 may broadcast the first signal 3710 that includes the first expression code 3711.

At operation 3904, the UE may determine the location information associated with the UE. The UE may determine the location information based on various techniques discussed in the present disclosure, such as GPS data, network-assisted positioning (e.g., via WiFi™ network scanning), and/or other location specific data that may be provided through a GNSS. In the context of FIG. 36, for example, the second UE 3604 may determine its current location. In the context of FIG. 37, for example, the second UE 3704 may determine its current location.

In an aspect, the method 3900 may include an operation 3906 at which the UE may determine that the UE is moving. If the UE determines that it is not moving, the UE may proceed to operation 3907. At operation 3907, the UE may send the determined location information to a network device to be stored in association with the UE. However, if the UE is determined to be moving, the UE may proceed to operation 3908.

For example, in the context of FIG. 36, the second UE 3604 may send the location information 3608 to the network device 3612. In response, the network device 3612 may store the location information 3608 in metadata 3614.

At operation 3908, the UE may determine a second expression code associated with the location information. In an aspect, operation 3908 may include operations 3920, 3922. At operation 3920, the UE may send, to a network device, a request for the second expression code. At operation 3922, the UE may receive, from the network device, the second expression code. In the context of FIG. 36, for example, the second UE 3604 determine the second expression code 3607, such as by generation of the second expression code 3607. In an aspect of operation 3920, the second UE 3604 may request the second expression code from a network device 3612 and, at operation 3922, the second UE 3604 may receive the second expression code 3607 from the network device 3612.

In an aspect, operation 3908 may include operation 3930. At operation 3930, the UE may determine the second expression code by generating the second expression code. Considering operation 3906 in the context of FIG. 37, for example, the second UE 3704 may determine the second expression code 3707 by generating the second expression code 3707 based on the first expression code 3711. In an aspect, the second UE 3704 may generate the second expression code 3707 based on application of a hash function (e.g., function 3812 of FIG. 38A or function 1 3840 or function 2 3842 of FIG. 38B) to the first expression code 3711.

The method 3900 may include an operation 3910. At operation 3910, the UE may request the network device to update metadata associated with the second expression code. For example, the UE may send the second expression code and/or metadata associated therewith to a network device. In the context of FIG. 36, the second UE 3604 may request the network device 3612 to update metadata 3614 associated with the second UE 3604 (and/or associated with the first expression code 3611) in association with the second expression code 3607. In an aspect, the metadata 3614 may include the second expression code 3607. In an aspect, the second UE 3604 may request that the network device 3612 update metadata associated with the second UE 3604 (and/or associated with the first expression code 3611) based on detecting that the second UE 3604 is moving (as determined at operation 3906).

At operation 3912, the UE may broadcast a second signal that is to include the second expression code and the location information. The UE is to broadcast the second signal independent of the first signal. In an aspect, the location information may include one or more of geographic coordinates, GPS data, network-assisted positioning data, and/or other location specific data that may be provided through a GNSS.

In the context of FIG. 36, for example, the second UE 3604 may broadcast the second signal 3606 that includes the second expression code 3607 and the location information 3608. In the context of FIG. 37, for example, the second UE 3704 may broadcast the second signal 3706 that includes the second expression code 3707 and the location information 3708.

Figure 40:
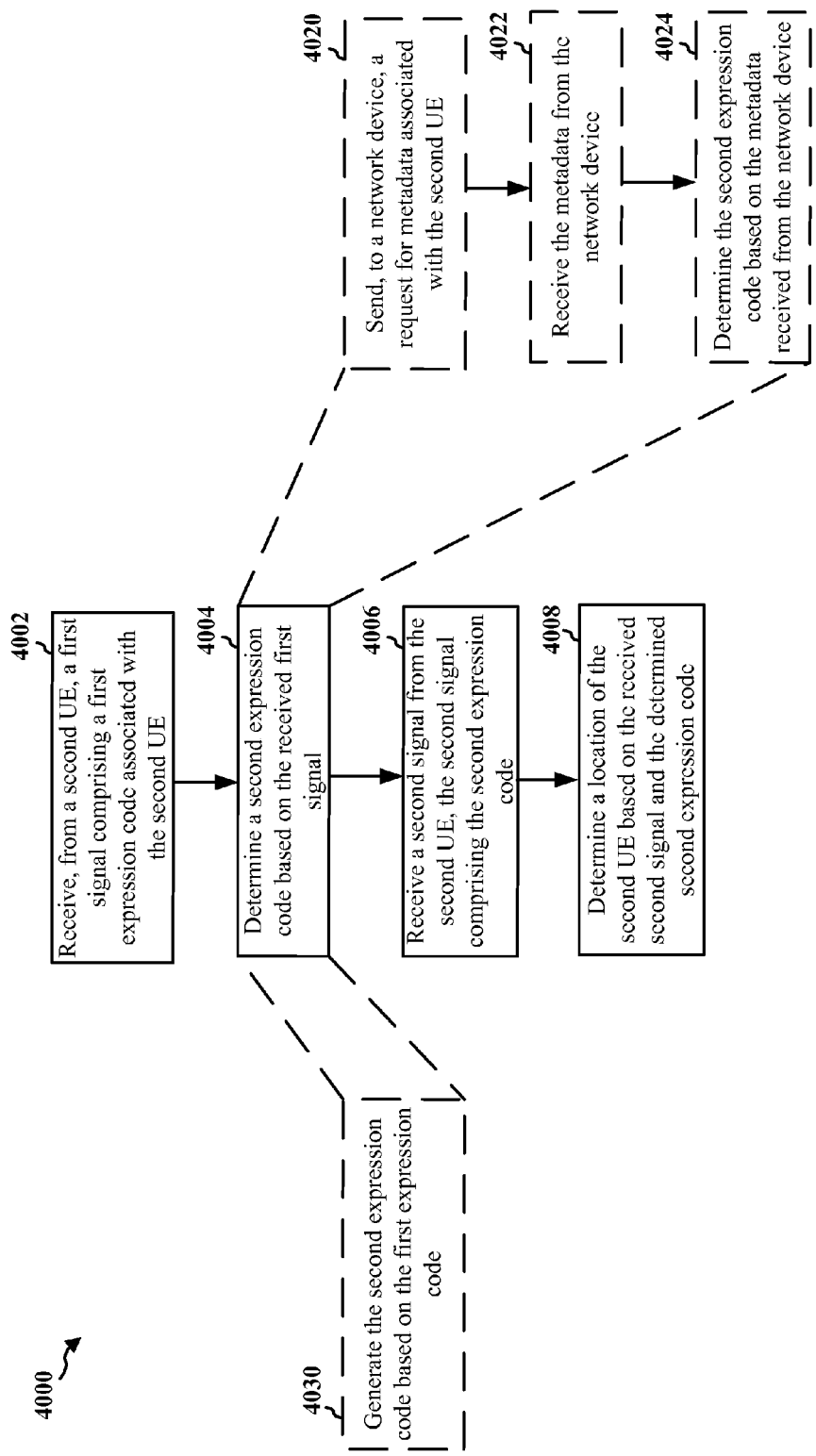
FIG. 40 is a flow diagram of a method of wireless communication.

FIG. 40 is a flow diagram illustrating a method 4000 for device discovery in a mobile network, according to various aspects. The method 4000 may be performed by a UE, such as the first UE 3602 of FIG. 36 or the first UE 3702 of FIG. 37.

The method 4000 may begin with an operation 4002, where a UE may receive, from another UE, a first signal that includes a first expression code in association the other UE. In an aspect, the first expression code may indicate a service and/or content available at the UE. The first expression code may include a ProSe Expression Code that corresponds to a ProSe Application ID. In an aspect, the first expression code may include a public code, though the first expression code may include a private code in another aspect.

In one aspect, the first signal may include a flag and/or other bit sequence to indicate the availability of location information. In one aspect, such a flag and/or bit sequence may be included in the first expression code.

In the context of FIG. 36, for example, the first UE 3602 may receive, from the second UE 3604, the first signal 3610 that includes the first expression code 3611. In the context of FIG. 37, for example, the first UE 3602 may receive, from the second UE 3704, the first signal 3710 that includes the first expression code 3711.

At operation 4004, the UE may determine a second expression code based on the received first signal. In an aspect, operation 4004 may include operations 4020, 4022, 4024. At operation 4020, the UE may send, to a network device, a request for metadata associated with the second UE. In the context of FIG. 36, for example, the first UE 3602 may send, to the network device 3612, a request for metadata associated with the second UE 3604, for example, based on a determination that the first expression code 3611 is of interest to the first UE 3602.

At operation 4022, the UE may receive the metadata from the network device. For example, based on the request, the first UE 3602 may receive, from the network device 3612, metadata 3614 associated with the second UE 3604. At operation 4024, the UE may determine the second expression code based on the metadata received from the network device. For example, the first UE 3602 may determine the second expression code 3607 from metadata 3614 received from the network device 3612.

In another aspect, operation 4004 may include operation 4030. At operation 4030, the UE may generate the second expression code based on the first expression code. Considering operation 4030 in the context of FIG. 37, for example, the first UE 3702 may determine the second expression code 3707 by generating the second expression code 3707 based on the first expression code 3711. In an aspect, the first UE 3702 may generate the second expression code 3707 based on application of a hash function (e.g., function 3812 of FIG. 38A or function 1 3840 or function 2 3842 of FIG. 38B) to the first expression code 3711.

At operation 4006, the UE may receive, from the other UE, a second signal that includes the second expression code. In an aspect, the UE may receive the second signal before the first signal and may have cached information from that second signal, including the second expression code. In the context of FIG. 36, for example, the first UE 3602 may receive, from the second UE 3604, the second signal 3606. In the context of FIG. 37, for example, the first UE 3702 may receive, from the second UE 3704, the second signal 3706.

Proceeding to operation 4008, the UE may determine a location of the other UE based on the received second signal and the determined second expression code.

In the context of FIG. 36, for example, the first UE 3602 may compare the determined second expression code (e.g., the second expression code determined at operation 4004)—that is, the second expression code determined by the first UE 3602 from metadata 3614 received from the network device—to the received second expression code 3607—that is, the second expression code received from the second UE 3604 in the second signal 3606. Where the first UE 3602 determines a match on the determined second expression code to the received second expression code, the first UE 3602 may determine that the location information in the second signal 3606 is for the second UE 3604.

In the context of FIG. 37, for example, the first UE 3702 may compare the determined second expression code (e.g., the second expression code determined at operation 4004)—that is, the second expression code determined by the first UE 3702 based on application of a function to the first expression code 3711—to the received second expression code 3607—that is, the second expression code received from the second UE 3704 in the second signal 3706. Where the first UE 3702 determines a match on the determined second expression code and the received first expression code, the first UE 3702 may determine that the location information in the second signal 3706 is for the second UE 3704.

Figure 41:
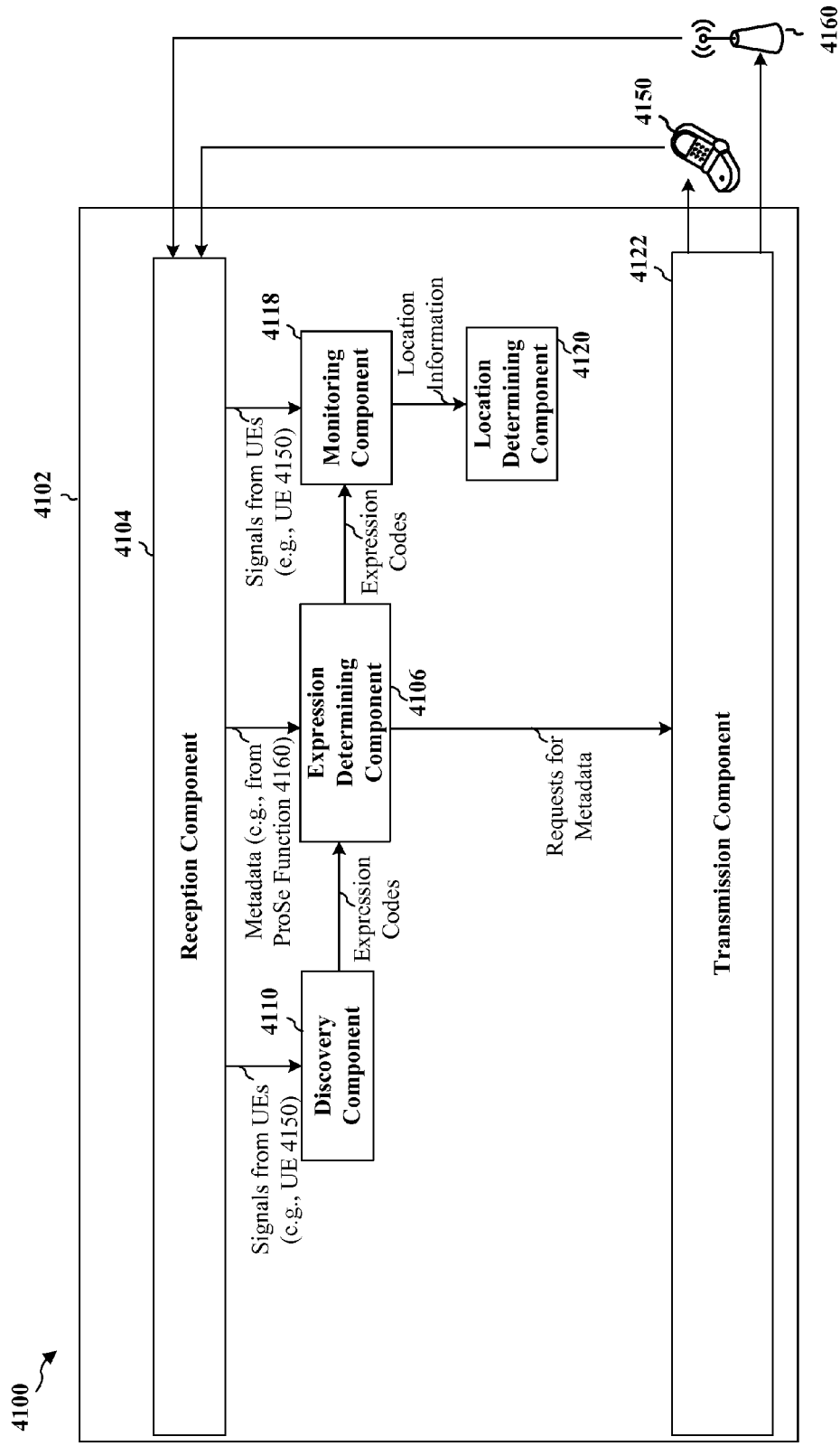
FIG. 41 is a conceptual data flow diagram illustrating the data flow between different modules/means/components in an exemplary apparatus.

FIG. 41 is a conceptual data flow diagram 4100 illustrating the data flow between different modules/means/components in an exemplary apparatus 4102. The apparatus may be a first UE (e.g., the first UE 3602 and/or the first UE 3702). The apparatus 4302 depicts exemplary connections and/or data between different modules/means/components. It is to be understood that such connections and/or data flow are to be regarded in as illustrative and, therefore, different and/or additional connections and/or data flow may be present in different aspects.

The apparatus 4102 includes a reception component 4104 that receives, from a second UE (e.g., the UE 4150), a first signal including a first expression code that is associated is the second UE and may be associated with availability of location information for the second UE. The reception component 4104 further may receive, from the network device (e.g., the ProSe Function 416), metadata associated with the second UE, such as metadata associated with location information for the second UE. The reception component 4104 further receives, from the second UE, a second signal including a second expression code and location information when associated with the second UE.

The apparatus 4102 further includes a discovery component 4110 that detects a first expression code in the first signal from the second UE. The discovery component 4110 may determine that the second UE provides a service and/or content that is of interest to the apparatus 4102. The apparatus 4102 further includes an expression determining component 4106 that determines at least a second expression code based on the received first signal, the at least a second expression code associated with the second UE. The apparatus further includes a monitoring component 4118 that monitors for a second signal from the second UE, the second signal to include the second expression code and location information associated with the second UE. The apparatus further includes a location determining component 4120 that determines a location of the second UE from the second expression code based on the received second signal and the determined expression code.

The apparatus may include additional components that perform each of the operations of the algorithm in the aforementioned flow charts of FIG. 40. As such, each operation in the aforementioned flow chart of FIG. 40 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 42:
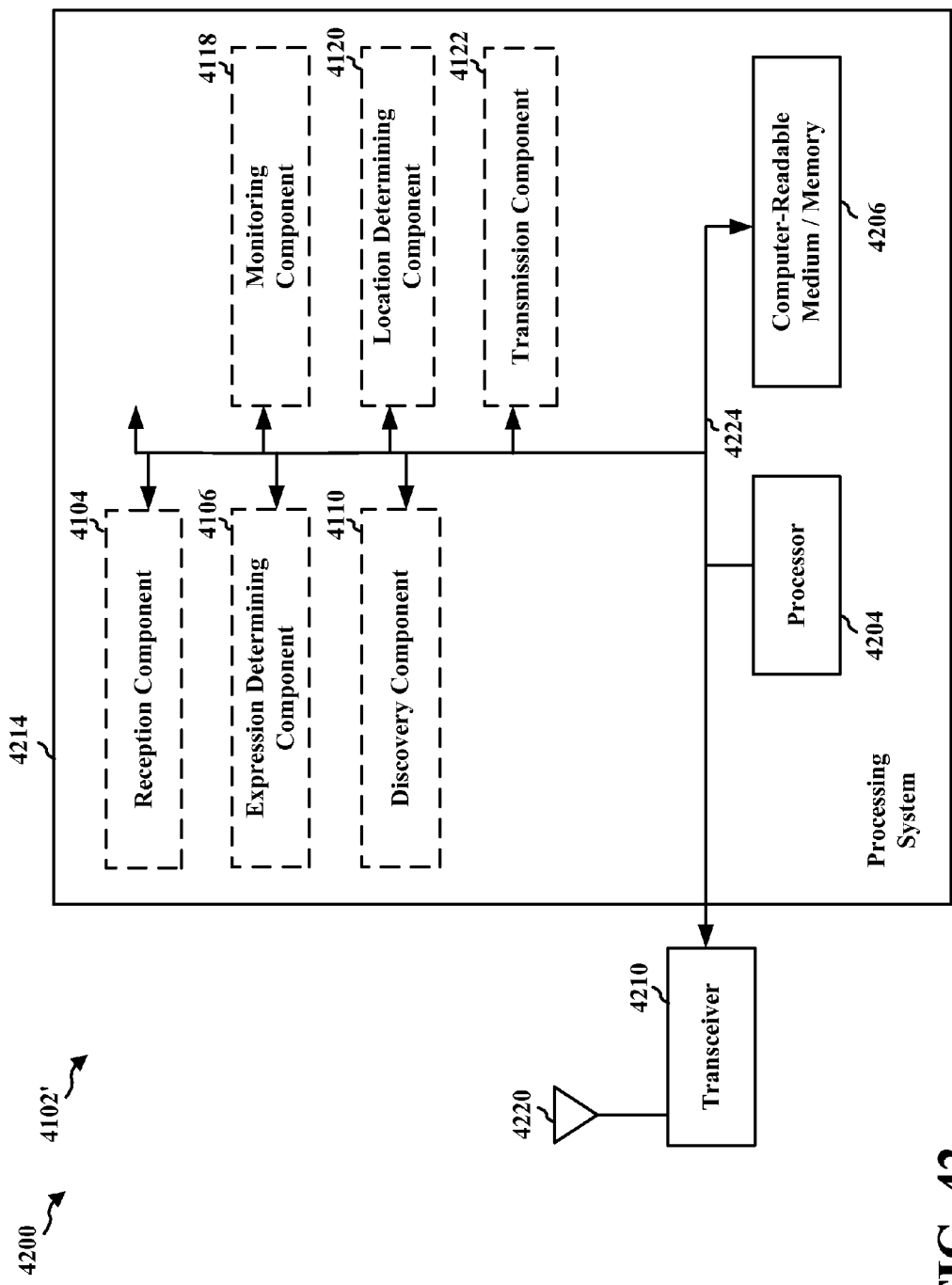
FIG. 42 is a diagram illustrating an example of a hardware implementation for an apparatus employing a processing system.

FIG. 42 is a diagram 4200 illustrating an example of a hardware implementation for an apparatus 4102' employing a processing system 4214. The processing system 4214 may be implemented with a bus architecture, represented generally by the bus 4224. The bus 4224 may include any number of interconnecting buses and bridges depending on the specific application of the processing system 4214 and the overall design constraints. The bus 4224 links together various circuits including one or more processors and/or hardware components, represented by the processor 4204, the components 4104, 4106, 4110, 4118, 4120, 4122 and the computer-readable medium/memory 4206. The bus 4224 may also link various other circuits such as timing sources, peripherals, voltage regulators, and power management circuits, which are well known in the art, and therefore, will not be described any further.

The processing system 4214 may be coupled to a transceiver 4210. The transceiver 4210 is coupled to one or more antennas 4220. The transceiver 4210 provides a means for communicating with various other apparatus over a transmission medium. The transceiver 4210 receives a signal from the one or more antennas 4220, extracts information from the received signal, and provides the extracted information to the processing system 4214, specifically the reception component 4104. In addition, the transceiver 4210 receives information from the processing system 4214, specifically the transmission component 4122, and based on the received information, generates a signal to be applied to the one or more antennas 4220. The processing system 4214 includes a processor 4204 coupled to a computer-readable medium/memory 4206. The processor 4204 is responsible for general processing, including the execution of software stored on the computer-readable medium/memory 4206. The software, when executed by the processor 4204, causes the processing system 4214 to perform the various functions described supra for any particular apparatus. The computer-readable medium/memory 4206 may also be used for storing data that is manipulated by the processor 4204 when executing software. The processing system further includes at least one of the components 4104, 4106, 4110, 4118, 4120, and/or 4122. The components may be software components running in the processor 4204, resident/stored in the computer-readable medium/memory 4206, one or more hardware components coupled to the processor 4204, or some combination thereof. The processing system 4214 may be a component of the UE 650 and may include the memory 660 and/or at least one of the TX processor 668, the RX processor 656, and the controller/processor 659.

In one configuration, the apparatus 4200/4102' for wireless communication includes means for receiving, from a second UE, a first signal comprising a first expression code associated with the second UE. In an aspect, the apparatus 4200/4102' includes means for determining a second expression code based on the received first signal. In an aspect, the apparatus 4200/4102' includes means for receiving a second signal from the second UE, the second signal comprising the second expression code. In an aspect, the apparatus 4200/4102' includes means for determining a location of the second UE based on the received second signal and the determined second expression code.

In an aspect of the apparatus 4200/4102', the first signal further comprises at least one bit to indicate availability of the location of the second UE. In an aspect, the first expression code comprises a Proximity Services (ProSe) Expression Code that corresponds to a ProSe Application Identifier (ID). In an aspect, the location information of the second UE is included in the second signal and includes at least one of geographic coordinates or Global Positioning System (GPS) data.

In an aspect of the apparatus 4200/4102', the means for determining the second expression code based on the received first signal is configured to send, to a network device, a request for metadata associated with the second UE. In an aspect, the means for determining the second expression code based on first received first signal is further configured to receive the metadata from the network device. In an aspect, the means for determining the second expression code based on first received first signal is further configured to determine the second expression code based on the metadata received from the network device.

In an aspect of the apparatus 4200/4102', the metadata comprises the second expression code. In an aspect, the means for determining the second expression code based on the received first signal is configured to generate the second expression code based on the first expression code. In an aspect, the second expression code is generated based on application of a hash function to the first expression code.

In an aspect of the apparatus 4200/4102', the means for determining the location of the second UE based on the received second signal and the determined second expression code is configured to determine that the generated second expression code matches the received second expression code of the second signal. In an aspect, the means for determining the location of the second UE based on the received second signal and the determined second expression code is further configured to determine the location of the second UE based on location information included in the second signal based on the determining that the generated second expression code matches the received second expression code of the second signal.

In an aspect of the apparatus 4200/4102', the means for determining the location of the second UE based on the received second signal and the determined second expression code is configured to cache information from the second signal, including the second expression code. In an aspect, the means for determining the location of the second UE based on the received second signal and the determined second expression code is further configured to determine that the determined second expression code matches the cached second expression code. In an aspect, the means for determining the location of the second UE based on the received second signal and the determined second expression code is further configured to determine the location of the second UE based on the determining that the determined second expression code matches the cached second expression code.

The aforementioned means may be one or more of the aforementioned components of the apparatus 4102 and/or the processing system 4214 of the apparatus 4102' configured to perform the functions recited by the aforementioned means. As described supra, the processing system 4214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 43:
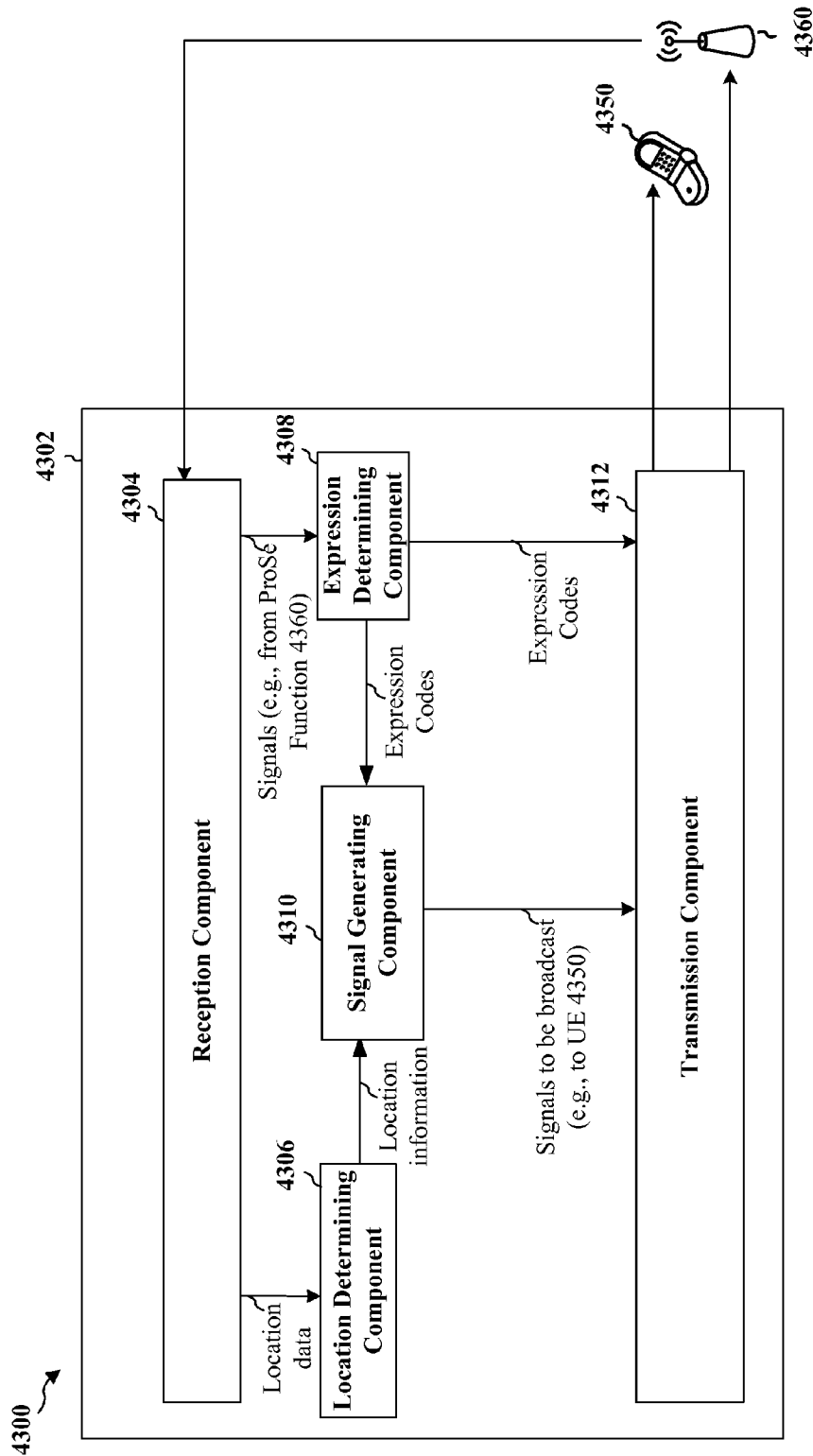
FIG. 43 is a conceptual data flow diagram illustrating another aspect of data flow between different modules/means/components in an exemplary apparatus.

FIG. 43 is a conceptual data flow diagram 4300 illustrating the data flow between different modules/means/components in an exemplary apparatus 4302. The apparatus may be an announcing UE (e.g., second UE 3604 and/or second UE 3704). The apparatus 4302 depicts exemplary connections and/or data between different modules/means/components. It is to be understood that such connections and/or data flow are to be regarded in as illustrative and, therefore, different and/or additional connections and/or data flow may be present in different aspects.

The apparatus 4302 includes a reception component 4304 that receives transmissions from a network device (e.g., ProSe Function 4360). The reception component 4304 may further receive transmission from another UE, such as a monitoring UE 4350, although the apparatus 4302 may only transmit to the monitoring UE 4350 in some aspects. The apparatus 4302 may include an expression determining component 4308. The expression determining component 4302 may be configured to determine a first expression code associated with content and/or services available at the apparatus 4302. The expression determining component 4302 may generate the first expression code to include an indication of available of location information for the apparatus 4302. The apparatus 4302 may further include a signal generation component 4310 configured to generate a signal that includes expression codes determined by the expression determining component 4308. The signal generating component 4310 may provide such signals to the transmission component 4312 for broadcast to another UE (e.g., the monitoring UE 4350).

The apparatus 4302 may include a location determining component 4306 that determines location information associated with the apparatus 4302. The expression determining component 4308 may determine a second expression code that is associated with location information of the apparatus 4302. The signal generating component 4310 may generate a second signal that includes the second expression code that the location information.

The apparatus may include additional components that perform each of the blocks of the algorithm in the aforementioned flow chart of FIG. 39. As such, each block in the aforementioned flow chart of FIG. 39 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 44:
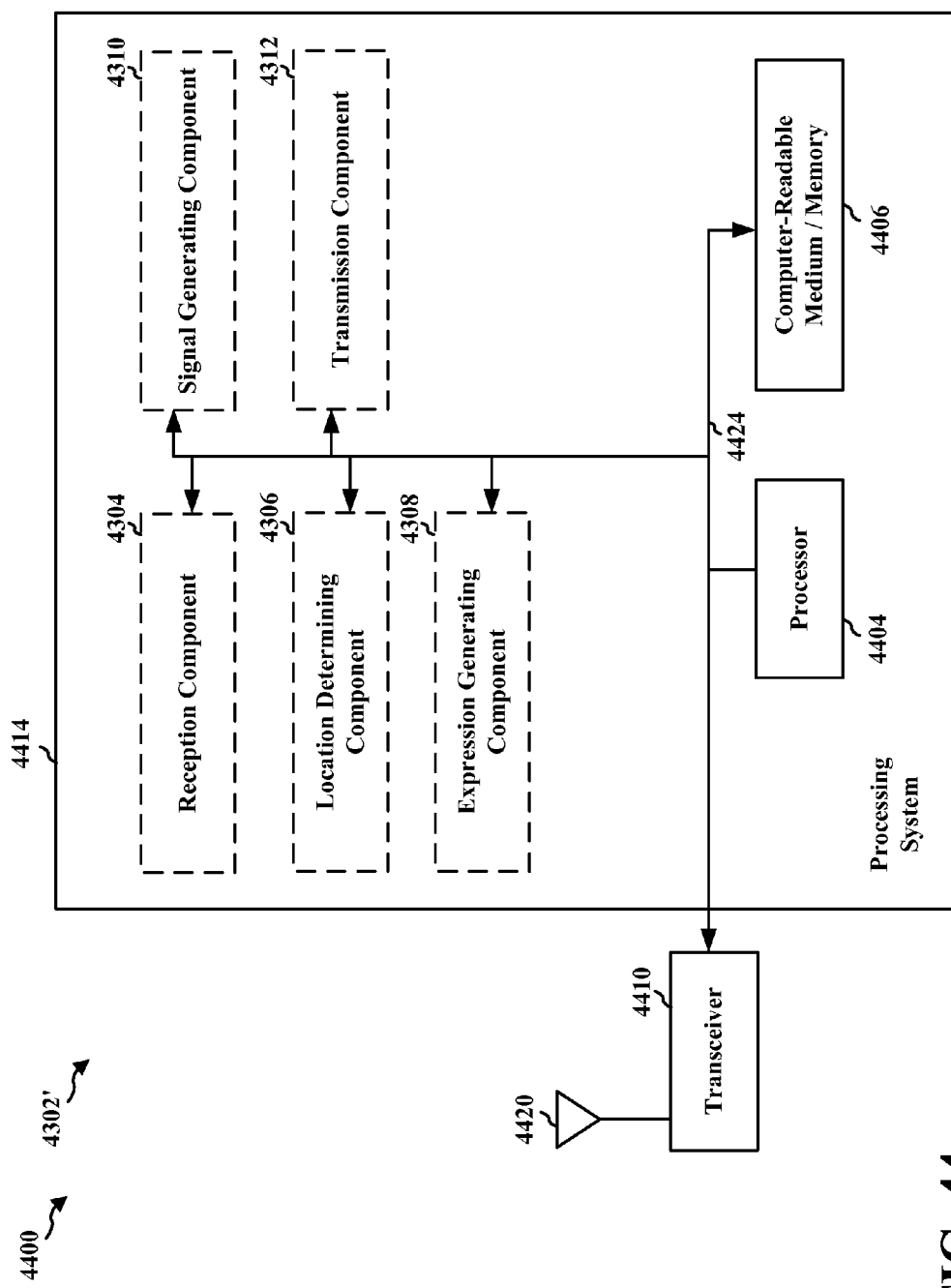
FIG. 44 is a diagram illustrating another aspect of a hardware implementation for an apparatus employing a processing system.

FIG. 44 is a diagram 4400 illustrating an example of a hardware implementation for an apparatus 4302' employing a processing system 4414. The processing system 4414 may be implemented with a bus architecture, represented generally by the bus 4424. The bus 4424 may include any number of interconnecting buses and bridges depending on the specific application of the processing system 4314 and the overall design constraints. The bus 4424 links together various circuits including one or more processors and/or hardware components, represented by the processor 4404, the components 4304, 4306, 4308, 4310, 4312, and the computer-readable medium/memory 4406. The bus 4424 may also link various other circuits such as timing sources, peripherals, voltage regulators, and power management circuits, which are well known in the art, and therefore, will not be described any further.

The processing system 4414 may be coupled to a transceiver 4410. The transceiver 4410 is coupled to one or more antennas 4420. The transceiver 4410 provides a means for communicating with various other apparatus over a transmission medium. The transceiver 4410 receives a signal from the one or more antennas 4420, extracts information from the received signal, and provides the extracted information to the processing system 4414, specifically the reception component 4304. In addition, the transceiver 4410 receives information from the processing system 4414, specifically the transmission component 4312, and based on the received information, generates a signal to be applied to the one or more antennas 4420. The processing system 4414 includes a processor 4404 coupled to a computer-readable medium/memory 4406. The processor 4404 is responsible for general processing, including the execution of software stored on the computer-readable medium/memory 4406. The software, when executed by the processor 4404, causes the processing system 4414 to perform the various functions described supra for any particular apparatus. The computer-readable medium/memory 4406 may also be used for storing data that is manipulated by the processor 4404 when executing software. The processing system further includes at least one of the components 4304, 4306, 4308, 4310, and/or 4312. The components may be software components running in the processor 4404, resident/stored in the computer-readable medium/memory 4406, one or more hardware components coupled to the processor 4404, or some combination thereof. The processing system 4414 may be a component of the UE 650 and may include the memory 660 and/or at least one of the TX processor 668, the RX processor 656, and the controller/processor 659.

In one configuration, the apparatus 4400/4302' for wireless communication includes means for broadcasting a first signal comprising a first expression code in association with availability of location information of a UE. In an aspect, the apparatus 4400/4302' further includes means for determining the location information associated with the UE. In an aspect, the apparatus 4400/4302' further includes means for determining a second expression code associated with the location information. In an aspect, the apparatus 4400/4302' further includes means for broadcasting a second signal comprising the second expression code and the location information, independent of the first signal.

In an aspect of the apparatus 4400/4302', the first signal further comprises at least one bit to indicate the availability of the location information. In an aspect, the apparatus 4400/4302' further includes means for requesting a network device to update metadata stored in the network device, the metadata to be associated with the second expression code. In an aspect, the means for the requesting the network device to update the metadata is configured to update the metadata based on detecting that the UE is moving, and the apparatus 4400/4302' further includes means for detecting that the UE is moving.

In an aspect of the apparatus 4400/4302', the means for determining the second expression code is configured to send, to a network device, a request for the second expression code. In an aspect of the apparatus 4400/4302', the means for determining the second expression code is further configured to receive, from the network device, the second expression code based on the request. In an aspect of the apparatus 4400/4302', the means for determining the second expression code associated with the location information is configured to generate the second expression code based on the first expression code. In an aspect of the apparatus 4400/4302', the means for determining the second expression code is configured to generate the second expression code based on application of a hash function to the first expression code.

In an aspect of the apparatus 4400/4302', the location information comprises at least one of geographic coordinates or Global Positioning System (GPS) data. In an aspect of the apparatus 4400/4302', the first expression code comprises a Proximity Services (ProSe) Expression Code that corresponds to a ProSe Application Identifier (ID).

The aforementioned means may be one or more of the aforementioned components of the apparatus 4302 and/or the processing system 4414 of the apparatus 4400/4302' configured to perform the functions recited by the aforementioned means. As described supra, the processing system 4414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of operations in the processes/flow charts disclosed is an illustration of exemplary approaches. Based upon design preferences, it is understood that the specific order or hierarchy of operations in the processes/flow charts may be rearranged. Further, some operations may be combined or omitted. The accompanying method claims present elements of the various operations in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a user equipment (UE), the method comprising:
    broadcasting a first signal comprising a first expression code in association with availability of location information of the UE;
    determining the location information associated with the UE;
    determining a second expression code associated with the location information; and
    broadcasting a second signal comprising the second expression code and the location information, independent of the first signal.

2. The method of claim 1, wherein the first signal further comprises at least one bit to indicate the availability of the location information.

3. The method of claim 1, further comprising:
    requesting a network device to update metadata stored in the network device, the metadata to be associated with the second expression code.

4. The method of claim 3, wherein the requesting of the network device to update the metadata is based on detecting that the first UE is moving, the method further comprising:
    detecting that the first UE is moving.

5. The method of claim 1, wherein the determining the second expression code comprises:
    sending, to a network device, a request for the second expression code; and
    receiving, from the network device, the second expression code based on the request.

6. The method of claim 1, wherein the determining the second expression code associated with the location information comprises:
    generating the second expression code based on the first expression code.

7. The method of claim 6, wherein the second expression code is generated based on application of a hash function to the first expression code.

8. The method of claim 1, wherein the location information comprises at least one of geographic coordinates or Global Positioning System (GPS) data.

9. The method of claim 1, wherein the first expression code comprises a Proximity Services (ProSe) Expression Code that corresponds to a ProSe Application Identifier (ID).

10. An apparatus for wireless communication of user equipment (UE), the apparatus comprising:
    a memory; and
    at least one processor coupled to the memory and configured to:
        broadcast a first signal comprising a first expression code in association with availability of location information of the UE;
        determine the location information associated with the UE;
        determine a second expression code associated with the location information; and
        broadcast a second signal comprising the second expression code and the location information, independent of the first signal.

11. The apparatus of claim 10, wherein the first signal further comprises at least one bit to indicate the availability of the location information.

12. The apparatus of claim 10, wherein the at least one processor is further configured to request a network device to update metadata stored in the network device, the metadata to be associated with the second expression code.

13. The apparatus of claim 10, wherein the at least one processor is configured to determine the second expression code by sending, to a network device, a request for the second expression code, and receiving, from the network device, the second expression code based on the request.

14. The apparatus of claim 10, wherein the at least one processor is configured to determine the second expression code associated with the location information by generating the second expression code based on the first expression code.

* * * * *